(12) United States Patent
Kennedy et al.

(10) Patent No.: US 8,747,956 B2
(45) Date of Patent: Jun. 10, 2014

(54) PROCESSES, SYSTEMS, AND APPARATUS FOR FORMING PRODUCTS FROM ATOMIZED METALS AND ALLOYS

(75) Inventors: Richard L. Kennedy, Monroe, NC (US); Robin M. Forbes Jones, Charlotte, NC (US)

(73) Assignee: ATI Properties, Inc., Albany, OR (US)

( * ) Notice: Subject to any disclaimer, the term of this patent is extended or adjusted under 35 U.S.C. 154(b) by 74 days.

(21) Appl. No.: 13/207,629

(22) Filed: Aug. 11, 2011

(65) Prior Publication Data

US 2013/0040067 A1    Feb. 14, 2013

(51) Int. Cl.
| | |
|---|---|
| *B82Y 30/00* | (2011.01) |
| *B05D 1/06* | (2006.01) |
| *C23C 4/12* | (2006.01) |
| *C23C 4/02* | (2006.01) |
| *B05D 1/02* | (2006.01) |

(52) U.S. Cl.
USPC ........... 427/458; 427/475; 427/455; 427/456; 427/426; 427/427

(58) Field of Classification Search
CPC ............ B82Y 30/00; B05D 1/06; B05D 1/02; C23C 4/12; C23C 4/02; C04B 2111/00155
USPC ......... 427/474, 459, 595, 576, 475, 458, 455, 427/456, 426, 427; 118/627
See application file for complete search history.

(56) References Cited

U.S. PATENT DOCUMENTS

| | | | |
|---|---|---|---|
| 3,005,246 A | 10/1961 | Murphy et al. | |
| 3,072,982 A | 1/1963 | Gordon et al. | |
| 3,101,515 A | 8/1963 | Hanks | |
| 3,105,275 A | 10/1963 | Hanks | |
| 3,157,922 A | 11/1964 | Helmut | |

(Continued)

FOREIGN PATENT DOCUMENTS

| | | |
|---|---|---|
| CA | 2048836 A1 | 4/1992 |
| DE | 3810294 | 10/1988 |

(Continued)

OTHER PUBLICATIONS

Bhatia, "Thermal Spraying Technology and Applications", Continuing Education and Development, Inc., Jan. 29, 1999, p. 3.*

(Continued)

*Primary Examiner* — Frederick Parker
*Assistant Examiner* — Ann Disarro
(74) *Attorney, Agent, or Firm* — K & L Gates LLP; John E. Grosselin, III

(57) ABSTRACT

Processes, systems, and apparatuses are disclosed for forming products from atomized metals and alloys. A stream of molten alloy and/or a series of droplets of molten alloy are produced. The molten alloy is atomized to produce electrically-charged particles of the molten alloy by impinging electrons on the stream of molten alloy and/or the series of droplets of molten alloy. The electrically-charged molten alloy particles are accelerated with at least one of an electrostatic field and an electromagnetic field. The accelerating molten alloy particles are cooled to a temperature that is less than a solidus temperature of the molten alloy particles so that the molten alloy particles solidify while accelerating. The solid alloy particles are impacted onto a substrate and the impacting particles deform and metallurgically bond to the substrate to produce a solid alloy preform.

19 Claims, 25 Drawing Sheets

(56) References Cited

U.S. PATENT DOCUMENTS

| | | |
|---|---|---|
| 3,177,535 A | 4/1965 | Hanks |
| 3,288,593 A | 11/1966 | Smith, Jr. et al. |
| 3,342,250 A | 9/1967 | Treppschuh et al. |
| 3,343,828 A | 9/1967 | Hunt |
| 3,389,208 A | 6/1968 | Roberts et al. |
| 3,420,977 A | 1/1969 | Hanks et al. |
| 3,519,059 A | 7/1970 | Voskoboinikov et al. |
| 3,547,622 A | 12/1970 | Hutchinson |
| 3,576,207 A | 4/1971 | Grenfell et al. |
| 3,627,293 A | 12/1971 | Sperner |
| 3,690,635 A | 9/1972 | Harker et al. |
| 3,702,630 A | 11/1972 | Peytavin et al. |
| 3,737,305 A | 6/1973 | Blayden et al. |
| 3,786,853 A | 1/1974 | Cooper |
| 3,817,503 A | 6/1974 | Lafferty et al. |
| 3,825,415 A | 7/1974 | Johnston et al. |
| 3,826,301 A | 7/1974 | Brooks |
| 3,868,987 A | 3/1975 | Galey et al. |
| 3,896,258 A | 7/1975 | Hanks |
| 3,909,921 A | 10/1975 | Brooks |
| 3,970,892 A | 7/1976 | Wakalopulos |
| 3,972,713 A | 8/1976 | Muzyka et al. |
| 3,985,177 A | 10/1976 | Buehler |
| 3,988,084 A | 10/1976 | Esposito et al. |
| 3,989,091 A | 11/1976 | Medovar et al. |
| 4,025,818 A | 5/1977 | Giguere et al. |
| 4,058,697 A | 11/1977 | Sokolov et al. |
| 4,061,944 A | 12/1977 | Gay |
| 4,062,700 A | 12/1977 | Hayami et al. |
| 4,066,117 A | 1/1978 | Clark et al. |
| 4,136,527 A | 1/1979 | Kading |
| 4,190,404 A | 2/1980 | Drs et al. |
| 4,221,587 A | 9/1980 | Ray |
| 4,264,641 A * | 4/1981 | Mahoney et al. ............ 427/483 |
| 4,272,463 A | 6/1981 | Clark et al. |
| 4,305,451 A | 12/1981 | Ksendzyk et al. |
| 4,343,433 A | 8/1982 | Sickles |
| 4,426,141 A | 1/1984 | Holcomb |
| 4,441,542 A | 4/1984 | Pryor et al. |
| 4,449,568 A | 5/1984 | Narasimham |
| 4,471,831 A | 9/1984 | Ray |
| 4,482,376 A | 11/1984 | Tarasescu et al. |
| 4,544,404 A | 10/1985 | Yolton et al. |
| 4,575,325 A | 3/1986 | Duerig et al. |
| 4,596,945 A | 6/1986 | Schumacher et al. |
| 4,619,597 A | 10/1986 | Miller |
| 4,619,845 A | 10/1986 | Ayers et al. |
| 4,631,013 A | 12/1986 | Miller |
| 4,642,522 A | 2/1987 | Harvey et al. |
| 4,645,978 A | 2/1987 | Harvey et al. |
| 4,689,074 A | 8/1987 | Seaman et al. |
| 4,694,222 A | 9/1987 | Wakalopulos |
| 4,697,631 A | 10/1987 | Bungeroth et al. |
| 4,730,661 A | 3/1988 | Stephan |
| 4,738,713 A | 4/1988 | Stickle |
| 4,755,722 A | 7/1988 | Wakalopulos |
| 4,762,553 A | 8/1988 | Savage et al. |
| 4,762,975 A | 8/1988 | Mahoney et al. |
| 4,769,064 A | 9/1988 | Buss et al. |
| 4,779,802 A | 10/1988 | Coombs |
| 4,786,844 A | 11/1988 | Farrell et al. |
| 4,788,016 A | 11/1988 | Colclough et al. |
| 4,801,411 A | 1/1989 | Wellinghoff et al. |
| 4,801,412 A | 1/1989 | Miller |
| 4,838,340 A | 6/1989 | Entrekin et al. |
| 4,842,170 A | 6/1989 | Del Vecchio et al. |
| 4,842,704 A | 6/1989 | Collins et al. |
| 4,910,435 A | 3/1990 | Wakalopulos |
| 4,916,198 A | 4/1990 | Scheve et al. |
| 4,916,361 A | 4/1990 | Schumacher et al. |
| 4,919,335 A | 4/1990 | Hobson et al. |
| 4,926,923 A | 5/1990 | Brooks et al. |
| 4,931,091 A | 6/1990 | Waite et al. |
| 4,932,635 A | 6/1990 | Harker |
| 4,936,375 A | 6/1990 | Harker |
| 4,938,275 A | 7/1990 | Leatham et al. |
| 4,955,045 A | 9/1990 | Friede et al. |
| 4,961,776 A | 10/1990 | Harker |
| 5,004,153 A | 4/1991 | Sawyer |
| 5,074,933 A | 12/1991 | Ashok et al. |
| 5,084,091 A | 1/1992 | Yolton |
| 5,100,463 A | 3/1992 | Harker |
| 5,102,449 A | 4/1992 | Ducrocq et al. |
| 5,102,620 A | 4/1992 | Watson et al. |
| 5,104,634 A | 4/1992 | Calcote |
| 5,142,549 A | 8/1992 | Bremer |
| 5,160,532 A | 11/1992 | Benz et al. |
| 5,167,915 A | 12/1992 | Yamashita et al. |
| 5,176,874 A | 1/1993 | Mourer et al. |
| 5,222,547 A | 6/1993 | Harker |
| 5,226,946 A | 7/1993 | Diehm et al. |
| 5,240,067 A | 8/1993 | Hatch |
| 5,263,044 A | 11/1993 | Bremer |
| 5,266,098 A | 11/1993 | Chun et al. |
| 5,268,018 A | 12/1993 | Mourer et al. |
| 5,272,718 A | 12/1993 | Stenzel et al. |
| 5,291,940 A | 3/1994 | Borofka et al. |
| 5,296,274 A | 3/1994 | Movchan et al. |
| 5,302,881 A | 4/1994 | O'Loughlin |
| 5,310,165 A | 5/1994 | Benz et al. |
| 5,325,906 A | 7/1994 | Benz et al. |
| 5,332,197 A | 7/1994 | Benz et al. |
| 5,346,184 A | 9/1994 | Ghosh |
| 5,348,566 A | 9/1994 | Sawyer et al. |
| 5,366,206 A | 11/1994 | Sawyer et al. |
| 5,368,897 A | 11/1994 | Kurihara et al. |
| 5,377,961 A | 1/1995 | Smith et al. |
| 5,378,957 A | 1/1995 | Kelly |
| 5,381,847 A * | 1/1995 | Ashok et al. .................... 164/46 |
| 5,384,821 A | 1/1995 | Jedlitschka et al. |
| 5,460,851 A | 10/1995 | Jenkins |
| 5,472,177 A | 12/1995 | Benz et al. |
| 5,480,097 A | 1/1996 | Carter, Jr. et al. |
| 5,489,820 A | 2/1996 | Ivanov et al. |
| 5,503,655 A | 4/1996 | Joseph |
| 5,527,381 A | 6/1996 | Waite et al. |
| 5,649,992 A | 7/1997 | Carter, Jr. et al. |
| 5,649,993 A | 7/1997 | Carter, Jr. et al. |
| 5,683,653 A | 11/1997 | Benz et al. |
| 5,699,850 A | 12/1997 | Beitelman et al. |
| 5,722,479 A | 3/1998 | Oeftering |
| 5,749,938 A | 5/1998 | Coombs |
| 5,749,989 A | 5/1998 | Linman et al. |
| 5,769,151 A | 6/1998 | Carter, Jr. et al. |
| 5,809,057 A | 9/1998 | Benz et al. |
| 5,810,066 A | 9/1998 | Knudsen et al. |
| 5,841,235 A | 11/1998 | Engelko et al. |
| 5,894,980 A | 4/1999 | Orme-Marmarelis et al. |
| 5,954,112 A | 9/1999 | Forbes Jones et al. |
| 5,972,282 A | 10/1999 | Aguirre et al. |
| 5,985,206 A | 11/1999 | Zabala et al. |
| 5,992,503 A | 11/1999 | Knudsen et al. |
| 6,043,451 A | 3/2000 | Julien et al. |
| 6,068,043 A | 5/2000 | Clark |
| 6,103,182 A | 8/2000 | Campbell |
| 6,135,194 A | 10/2000 | Flinn et al. |
| 6,156,667 A | 12/2000 | Jewett |
| 6,162,377 A | 12/2000 | Ghosh et al. |
| 6,168,666 B1 | 1/2001 | Sun |
| 6,264,717 B1 | 7/2001 | Carter, Jr. et al. |
| 6,350,293 B1 | 2/2002 | Carter, Jr. et al. |
| 6,407,399 B1 | 6/2002 | Livesay |
| 6,416,564 B1 | 7/2002 | Bond |
| 6,427,752 B1 | 8/2002 | Carter, Jr. et al. |
| 6,460,595 B1 | 10/2002 | Benz et al. |
| 6,491,737 B2 | 12/2002 | Orme-Marmerelis et al. |
| 6,496,529 B1 | 12/2002 | Jones et al. |
| 6,562,099 B2 | 5/2003 | Orme-Marmerelis et al. |
| 6,613,266 B2 | 9/2003 | McDonald |
| 6,631,753 B1 | 10/2003 | Carter, Jr. et al. |
| 6,772,961 B2 | 8/2004 | Forbes Jones et al. |
| 6,904,955 B2 | 6/2005 | Jackson et al. |
| 6,975,073 B2 | 12/2005 | Wakalopulos |
| 7,152,432 B2 | 1/2006 | Forbes Jones et al. |

(56) References Cited

U.S. PATENT DOCUMENTS

| | | | |
|---|---|---|---|
| 7,033,444 | B1 | 4/2006 | Komino et al. |
| 7,114,548 | B2 | 10/2006 | Forbes Jones |
| 7,150,412 | B2 | 12/2006 | Wang et al. |
| 7,154,932 | B2 | 12/2006 | Forbes Jones et al. |
| 7,337,745 | B1 | 3/2008 | Komino et al. |
| 7,374,598 | B2 | 5/2008 | Forbes Jones et al. |
| 7,425,716 | B2 | 9/2008 | Demos et al. |
| 7,439,188 | B2 | 10/2008 | DeOrnellas et al. |
| 7,578,960 | B2 * | 8/2009 | Forbes Jones et al. ........ 266/202 |
| 7,798,199 | B2 | 9/2010 | Forbes Jones et al. |
| 7,803,211 | B2 | 9/2010 | Forbes Jones |
| 7,803,212 | B2 | 9/2010 | Forbes Jones et al. |
| 7,963,314 | B2 | 6/2011 | Forbes Jones et al. |
| 8,156,996 | B2 | 4/2012 | Forbes Jones et al. |
| 8,216,339 | B2 | 7/2012 | Forbes Jones et al. |
| 8,221,676 | B2 | 7/2012 | Forbes Jones et al. |
| 8,226,884 | B2 | 7/2012 | Forbes Jones |
| 8,302,661 | B2 | 11/2012 | Forbes Jones et al. |
| 2004/0065171 | A1 | 4/2004 | Hearley et al. |
| 2005/0173847 | A1 | 8/2005 | Blackburn et al. |
| 2007/0151695 | A1 | 7/2007 | Forbes Jones et al. |
| 2008/0072707 | A1 | 3/2008 | Forbes Jones et al. |
| 2008/0115905 | A1 | 5/2008 | Forbes Jones et al. |
| 2008/0179033 | A1 | 7/2008 | Forbes Jones et al. |
| 2008/0179034 | A1 | 7/2008 | Forbes Jones et al. |
| 2008/0223174 | A1 * | 9/2008 | Forbes Jones et al. .......... 75/336 |
| 2008/0237200 | A1 | 10/2008 | Forbes Jones et al. |
| 2009/0139682 | A1 | 6/2009 | Forbes Jones et al. |
| 2010/0012629 | A1 | 1/2010 | Forbes Jones et al. |
| 2013/0279533 | A1 | 10/2013 | Forbes Jones et al. |

FOREIGN PATENT DOCUMENTS

| | | |
|---|---|---|
| DE | 4011392 B4 | 4/2004 |
| EP | 0073585 A1 | 3/1983 |
| EP | 0095298 A1 | 11/1983 |
| EP | 0225732 B1 | 1/1992 |
| EP | 0486830 A2 | 5/1992 |
| EP | 0518536 A1 | 12/1992 |
| EP | 0400089 B1 | 6/1993 |
| EP | 0428527 B1 | 8/1996 |
| EP | 1101552 A2 | 5/2001 |
| GB | 2203889 A | 10/1988 |
| JP | S63-128134 A | 5/1988 |
| JP | 01-313181 A | 12/1989 |
| JP | 01-313182 A | 12/1989 |
| JP | 3-36205 A | 2/1991 |
| JP | 6-246425 | 9/1994 |
| JP | 8-506382 A | 7/1996 |
| JP | 2001-6572 A | 1/2001 |
| JP | 2001-212662 A | 8/2001 |
| JP | 2001-279340 A | 10/2001 |
| JP | 2001-335854 A | 12/2001 |
| JP | 2002-311877 A | 10/2002 |
| JP | 2004-108696 A | 4/2004 |
| JP | 2006-207838 A | 8/2006 |
| RU | 2089633 C1 | 9/1997 |
| WO | WO 85/05489 A1 | 12/1985 |
| WO | WO 86/00466 A1 | 1/1986 |
| WO | WO 90/01250 A1 | 2/1990 |
| WO | WO 97/49837 A1 | 12/1997 |
| WO | WO 01/96028 A1 | 12/2001 |
| WO | WO 02/40197 A2 | 5/2002 |
| WO | WO 2008/121630 A1 | 10/2008 |

OTHER PUBLICATIONS

"Electron-Beam Melting of Titanium," printed from http://www.antares.com.ua, Internet site, website accessed on Apr. 4, 2007, 6 pages.

A. J. Cohen, "Anomalous Diffusion in a Plasma Formed from the Exhaust Beam of an Electron-Bombardment Ion Thruster," published Aug. 1968.

A. Vizir, et al., "Recent Development and Application of Electron, Ion and Plasma Sources Basen on Vacuum Arc and Low Pressure Glow," IEEE Int. Conf. Plasma Sci., Jul. 2004, p. 286.

Alan Leathem, "Spray Forming: Alloys, Products, and Markets", JOM-e, Apr. 1999, vol. 51, No. 4, 13 pages.

ALD Vacuum Technologies AG, "Electron Beam Melting (EB), Electron Beam Melting Processes and Furnaces," created May 7, 2003, modified Aug. 25, 2003, accessed Sep. 17, 2008, 6 pages.

ALD Vacuum Technologies: Electron Beam Melting (EB), printed from http://web.ald-vt.de/cms/vakuum-technolgie/anlagen/electron-beam-melting-eb, website accessed on Aug. 25, 2009, 4 pages.

Knyazev, et al., "Pulsed Plasma Sources for the Production of Intense Ion Beams Based on "Catalytic" Resonance Ionization," Aug. 1994, 23 pages.

Fontaine, et al., "Performance Characteristics of a Long Pulse and High Average Power XeCl Discharge Laser," SPIE vol. 801, High Power Lasers, Sep. 1987, pp. 100-105.

B.Q. Li, "Solidification Processing of Materials in Magnetic Fields", JOM-e, Feb. 1998, vol. 50, No. 2, copyright held by *The Minerals, Metals & Materials Society*, 1998, 11 pages.

Bakish, R., "The Substance of Technology: Electron Beam Melting and Refining", JOM, Nov. 1998, pp. 28-30.

Cao, Wei-Di, "Solidification and Solid State Phase Transformation of Allvac ® 718Plus ™ Alloy", Journal of the Minerals, Metals & Materials Society, Oct. 2005, pp. 165-177.

Cobine, James Dillon, "Gaseous Conductors: Theory and Engineering Applications", Dover Publications, Inc. New York, 1958, 6,pages.

D.E. Tyler and W.G. Watson, "Nucleated Casting", *Proceeding of the Third International Conference on Spray Forming,* Sep. 1996, 11 pages.

E. M. Oks, et al., "Development of Plasma Cathode Electron Guns," Physics of Plasmas, vol. 6, No. 5, pp. 1649-1654, May 1999.

E.J. Lavernia and Y. Wu, "Spray Atomization and Deposition", John Wiley & Sons, Feb. 25, 1996, pp. 311-314.

G. Sanchez, et al., "Thermal Effect of Ion Implantation with Ultra-Short Ion Beams," Surface and Coatings Technology, vol. 70. Jan. 1995, pp. 181-186.

G. Wakalopulos, "Pulsed WIP Electron Gun. Final Report—Fabrication Phase 1×40 cm and 1+70 cm Cooled WIP Electron Gun," Mar. 1979-Dec. 1980, 33 pages.

H. Duval, et al., "Theoretical and Experimental Approach of the Volatilization in Vacuum Metallurgy," pp. 83-97; Proceedings of the Conference on Electron Beam Melting and Refining-State of the Art 1997, R. Bakish ed., Bakish Materials Corporation (1997).

H. Tamura, et al. "A Plasma Ion Gun with Pierce Electrode," Japan J. Appl. Phys. 5, Oct. 1966, pp. 985-987.

Hasse, Rolf, "Thermodynamics of Irreversible Processes", Dover Publications, Inc., New York, Oct. 1990, 5 pages.

Kuiken, Gerard, "Thermodynamics of Irreversible Processes: Applications to Diffusion and Rheology", John Wiley & Sons, Oct. 1994, 10 pages.

L. Arif, et al., "Waves Behaviour in a High Repetition High Average Power Excimer Laser," SPIE vol. 1031 GCL—Seventh International Symposium on Gas Flow and Chemical Lasers, Aug. 1988, pp. 392-399.

L. E. Weddle, "Ion Gun Generated Electromagnetic Interference on the Scatha Satellite," published Dec. 1987, 78 pages.

L. M. Smith, et al., "Interferometric Investigation of a Cablegun Plasma Injector", IEEE Transactions on Plasma Science, vol. 28, No. 6, pp. 2272-2275, Dec. 2000.

L.A. Bertram et al., "Quantitative Simulations of a Superalloy VAR Ingot at the Macroscale", *Proceedings of the 1997 International Symposium on Liquid Metal Processing and Casting,* A. Mitchell and P. Auburtin, eds., Am. Vac. Soc., Feb. 1997, pp. 110-132.

M. L. Sentis, et al., "Parametric Studies of X-Ray Preionized Discharge XeCl Laser at Single Shot and at High Pulse Rate Frequency (1 kHz)," J. Appl. Phys., vol. 66, No. 5, Sep. 1,1989, pp. 1925-1930.

Macky, W.A., "Some Investigations on the Deformation and Breaking of Water Drops in Strong Electric Fields", Proc. Roy. Soc. London, Series A, Jul. 2, 1931, pp. 565-587.

N. N. Semashko, et al. "Sources of Gas-Ion Beams with Current up to 60 A for Controlled Thermonuclear Fusion and Technological Applications," Atomic Energy, vol. 82, No. 1, Jan. 1997, pp. 21-27.

(56) References Cited

OTHER PUBLICATIONS

P. F. McKay, "Development of a Twelve-Plasma Gun, Single-Pulser Combination for Use in the PBFA-1 Hybrid Ion Diode," published Oct. 1985, 30 pages.
R. C. Olsen, et al., "Plasma Wave Observations During Ion Gun Experiments," Journal of Geophysical Research, vol. 95, No. A6, Jun. 1, 1990, p. 7759-7771.
S. Humphries, Jr., et al., "Pulsed Plasma Guns for Intense Ion Beam Injectors," Rev. Sci. Instrum. vol. 52, No. 2, Feb. 1981, pp. 162-171.
S. Suckewer, "Spectral Measurements of Plasma Temperature in the Rod Plasma Injector (RPI)," Nukleonika, No. 1, 1970, 22 pages.
Sandia National Labs, "Particle Beam Fusion Progress Report, Jan.-Jun. 1980," published May 1981, 173 pages.
Sears, Francis Weston, An Introduction to Thermodynamics, The Kinetic Theory of Gases, and Statistical Mechanics, 2nd Edition, Addison-Wesley, 1953, pp. 335-337.
V. A. Chernov, "The Powerful High-Voltage Glow Discharge Electron Gun and Power Unit on Its Base," 1994 Intern. Conf. on Electron Beam Melting (Reno, Nevada), pp. 259-267.
V. M. Chicherov, "Density Distribution of Hydrogen in the Interior of a Coaxial Plasma Injector Prior to the Application of High Voltage to its Electrodes," Journal of Technical Physics, vol. 36, No. 6, pp. 1055-1057, 1966.
W. Clark, "Electron Gun Technology," Hughes Research Laboratories, Final Report No. N00014-72-C-0496, 92 pages, Dec. 1976.
W. M. Clark, et al., "Ion Plasma Electron Gun Research," Dec. 1977, 43 pages.
W.T. Carter, Jr. et al. "The CMSF Process: The Spray Forming of Clean Metal", *JOM*-e, Apr. 1999, vol. 51, No. 4, 7 pages.
William T. Carter, Jr. and Robin M. Forbes-Jones, "Nucleated Casting for Land-Based Gas Turbines", *Advanced Materials & Processes*, Jul. 2002, pp. 27-29.
William T. Carter, Jr. and Robin M. Forbes-Jones, "Nucleated Casting for the Production of Large Superalloy Ingots", *JOM*, Apr. 2005, pp. 52-57.
Y. Kiwamoto, "Small Barium Rail Gun for Plasma Injection," Rev. Sci. Instrum., vol. 51. No. 3,Mar. 1980, pp. 285-287.
Tien et al., "Superalloys, Supercomposites and Superceramics", Academic Press, Inc., Dec. 1989, pp. 49, 76-84.
Ausmus, S.L. and R.A. Beall, "Electroslag Melting of Titanium Slabs", Trans. Internat., Vacuum Metallurgy Conf., Dec. 1967, pp. 675-694.
Chronister et al., "Induction Skull Melting of Titanium and Other Reactive Alloys", Journal of Metals, Sep. 1986, pp. 51-54.
Office Action dated May 15, 2012 in U.S. Appl. No. 12/055,415.
Office Action dated Dec. 20, 2012 in U.S. Appl. No. 12/055,415.
Notice of Allowance dated Jun. 11, 2013 in U.S. Appl. No. 12/055,415.
Notice of Allowance dated Oct. 8, 2013 in U.S. Appl. No. 12/055,415.
Office Action dated Dec. 21, 2007 in U.S. Appl. No. 11/232,702.
Office Action dated Jul. 18, 2008 in Application No. U.S. Appl. No. 11/232,702.
Office Action dated Dec. 12, 2008 in Application No. 11/232,702.
Notice of Allowance dated Apr. 13, 2009 in U.S. Appl. No. 11/232,702.
Office Action dated Mar. 11, 2009 in U.S. Appl. No. 11/933,361.
Office Action dated Nov. 10, 2009 in U.S. Appl. No. 11/933,361.
Office Action dated Feb. 13, 2009 in U.S. Appl. No. 11/841,941.
Office Action dated Oct. 1, 2009 in U.S. Appl. No. 11/841,941.
Office Action dated Jul. 12, 2010 in U.S. Appl. No. 11/841,941.
Office Action dated Jun. 28, 2007 in U.S. Appl. No. 10/913,361.
Office Action dated Sep. 26, 2007 in U.S. Appl. No. 10/913,361.
Notice of Allowance dated Jan. 14, 2008 in U.S. Appl. No. 10/913,361.
Office Action dated Dec. 19, 2002 in U.S. Appl. No. 10/158,382.
Office Action dated Jun. 3, 2003 in U.S. Appl. No. 10/158,382.
Office Action dated Mar. 18, 2004 in U.S. Appl. No. 10/158,382.
Office Action dated Dec. 29, 2004 in U.S. Appl. No. 10/158,382.
Office Action dated Aug. 25, 2005 in U.S. Appl. No. 10/158,382.
Notice of Allowance dated May 2, 2006 in U.S. Appl. No. 10/158,382.
Supplemental Notice of Allowability dated Jun. 12, 2006 in U.S. Appl. No. 10/158,382.
Supplemental Notice of Allowability dated Jun. 29, 2006 in Application No. 10/158,382.
Office Action dated Nov. 20, 2002 in U.S. Appl. No. 09/882,248.
Office Action dated Jan. 21, 2003 in U.S. Appl. No. 09/882,248.
Office Action dated Jul. 8, 2003 in U.S. Appl. No. 09/882,248.
Notice of Allowance dated Oct. 22, 2003 in U.S. Appl. No. 09/882,248.
Office Action dated Dec. 6, 2001 in U.S. Appl. No. 09/726,720.
Notice of Allowance dated Apr. 23, 2002 in U.S. Appl. No. 09/726,720.
Office Action dated Aug. 29, 2005 in U.S. Appl. No. 11/008,048.
Office Action dated Nov. 8, 2005 in U.S. Appl. No. 11/008,048.
Response to Rule 312 Communication dated Aug. 16, 2006 in U.S. Appl. No. 11/008,048.
Notice of Allowance dated Jun. 27, 2006 in U.S. Appl. No. 11/008,048.
Office Action dated Nov. 27, 2009 in U.S. Appl. No. 12/053,238.
Office Action dated Jun. 3. 2010 in U.S. Appl. No. 12/053,238.
Notice of Allowance dated Jul. 2, 2010 in U.S. Appl. No. 12/053,238.
Office Action dated Dec. 9, 2009 in U.S. Appl. No. 12/053,245.
Notice of Allowance dated Jun. 9, 2010 in U.S. Appl. No. 12/053,245.
Office Action dated Apr. 27, 2010 in U.S. Appl. No, 11/564,021.
Office Action dated Nov. 9, 2010 in U.S. Appl. No. 11/564,021.
Office Action dated Jan. 21, 2011 in U.S. Appl. No. 11/564,021.
Office Action dated May 29, 2013 in U.S. Appl. No. 11/564,021.
Office Action dated Oct. 16, 2013 in U.S. Appl. No. 11/564,021.
Notice of Allowance dated Jun. 2, 2010 in U.S. Appl. No. 11/949,808.
Office Action dated Jun. 25, 2010 in U.S. Appl. No. 12/502,558.
Office Action dated Sep. 23, 2010 in U.S. Appl. No. 12/502,558.
Office Action dated May 2, 2011 in U.S. Appl. No. 12/502,558.
Notice of Allowance dated Jun. 22, 2011 in U.S. Appl. No. 12/502,558.
Notice of Allowance dated Feb. 13, 2012 in U.S. Appl. No. 12/502,558.
Corrected Notice of Allowability dated Jun. 12, 2012 in U.S. Appl. No. 12/502,558.
Notice of Allowance dated Jan. 3, 2011 in U.S. Appl. No. 12/861,033.
Notice of Allowance dated Feb. 17, 2011 in U.S. Appl. No. 12/861,033.
Office Action dated Jul. 14, 2011 in U.S. Appl. No. 11/978,923.
Office Action dated Oct. 20, 2011 in U.S. Appl. No. 11/978,923.
Office Action dated May 4, 2012 in U.S. Appl. No. 11/978,923.
Office Action dated Aug. 3, 2011 in U.S. Appl. No. 13/108,402.
Notice of Allowance dated Dec. 21, 2011 in U.S. Appl. No. 13/108,402.
Office Action dated Dec. 14, 2001 in U.S. Appl. No. 12/831,669.
Notice of Allowance dated Mar. 9, 2012 in U.S. Appl. No. 12/831,669.
Notice of Allowability dated Jun. 22, 2012 in U.S. Appl. No. 12/831,669.
Office Action dated Jun. 18, 2012 in U.S. Appl. No. 13/420,910.
Notice of Allowance dated Sep. 10, 2012 in U.S. Appl. No. 13/420,910.
Notice of Allowance dated Apr. 12, 2012 in U.S. Appl. No. 12/821,480.
Notice of Allowability dated Jun. 26, 2012 in U.S. Appl. No. 12/821,480.
Office Action dated Oct. 10, 2012 in U.S. Appl. No. 12/546,785.
Office Action dated Jan. 24, 2013 in U.S. Appl. No. 12/546,785.
Office Action dated Sep. 30, 2013 in U.S. Appl. No. 12/546,785.

\* cited by examiner

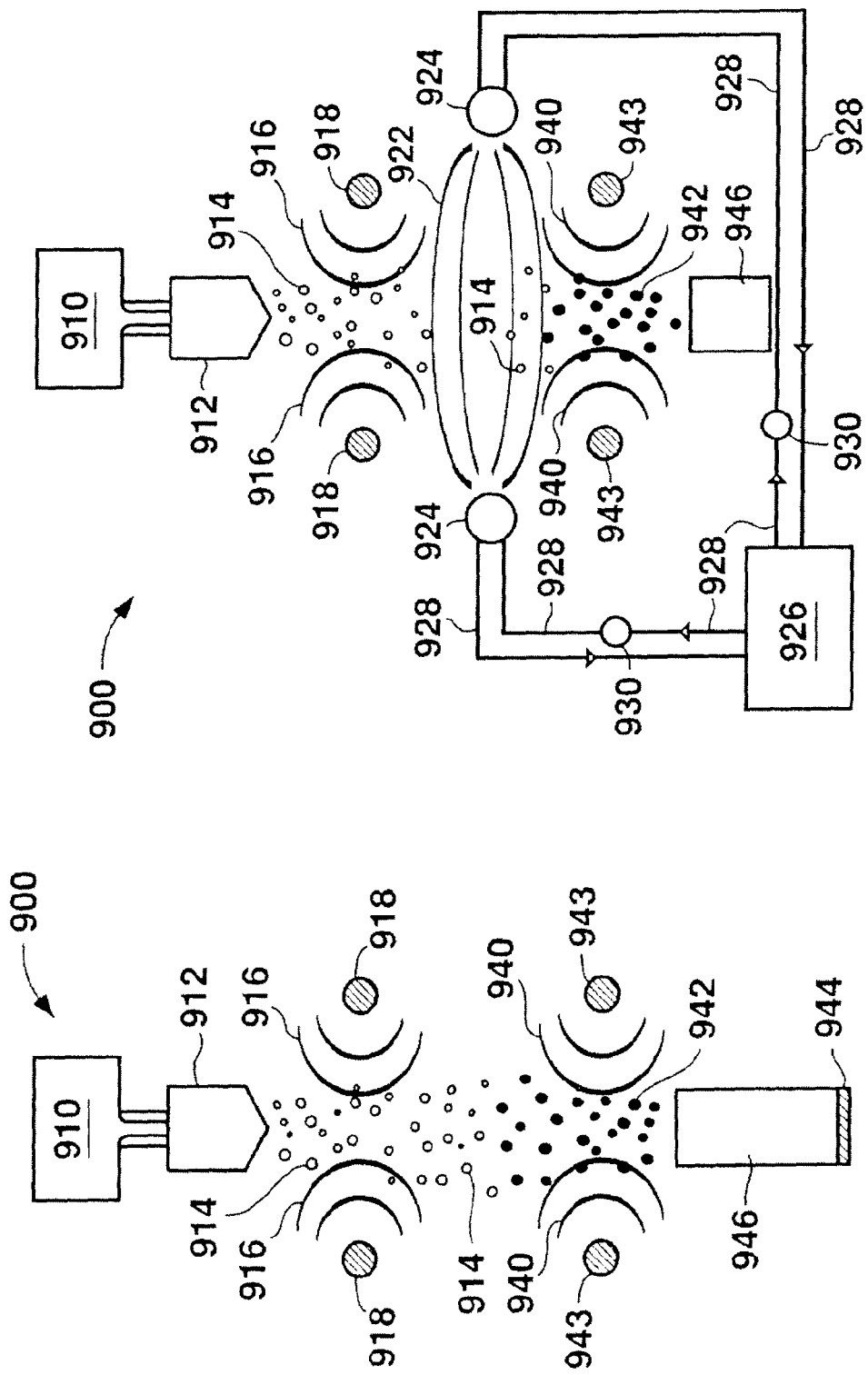

PROCESSES, SYSTEMS, AND APPARATUS FOR FORMING PRODUCTS FROM ATOMIZED METALS AND ALLOYS

TECHNICAL FIELD

This disclosure relates to melting, atomizing, and processing metals and alloys, and to forming metal and alloy products using atomized metals and alloys.

BACKGROUND

Metals and alloys, such as, for example, iron, nickel, titanium, cobalt, and alloys based on these metals, are often used in critical engineering applications in which fine-grained microstructures, homogeneity, and/or substantially defect free compositions are advantageous or necessary. Problems such as undesired grain growth and segregation in metal and alloy castings and ingots may be detrimental to end-use applications and can significantly increase the costs associated with high quality alloy production. Conventional alloy production techniques, such as vacuum induction melting, electroslag refining, and vacuum arc remelting, may be used to reduce the amount of impurities and contaminants in alloy castings. However, in various instances, conventional cast-and-wrought alloy production processes cannot be used to produce alloys having the fine-grained microstructures, homogeneity, and/or substantially defect free compositions desired or required for various critical engineering applications.

Powder metallurgy processes can allow for the production of metals and alloys having fine-grained microstructures that cannot be achieved with cast-and-wrought alloy production processes. However, powder metallurgy processes are more complex than cast-and-wrought alloy production processes and may produce metals and alloys having relatively high levels of voids and porosity. Powder metallurgy processes also have the potential to introduce impurities and contaminants into metal and alloy products during the production, handling, and processing of the powder feed stocks used to form the products.

SUMMARY

In a non-limiting embodiment, a process according to the present disclosure comprises producing at least one of a stream of molten alloy and a series of droplets of molten alloy. Electrically-charged particles of the molten alloy are produced by impinging electrons on at least one of the stream of molten alloy and the series of droplets of molten alloy to atomize the molten alloy. The electrically-charged molten alloy particles are accelerated with at least one of an electrostatic field and an electromagnetic field. The molten alloy particles are cooled to a temperature less than a solidus temperature of the molten alloy particles so that the molten alloy particles solidify while accelerating. The solid alloy particles are impacted onto a substrate, wherein the impacting particles deform and metallurgically bond to the substrate to produce a solid alloy preform.

It is understood that the invention disclosed and described in this specification is not limited to the embodiments summarized in this summary.

BRIEF DESCRIPTION OF THE DRAWINGS

Various features and characteristics of the non-limiting and non-exhaustive embodiments disclosed and described in this specification may be better understood by reference to the accompanying figures, in which:

FIGS. 6, 7, 7A, 8, 8A, 9, and 9A are schematic diagrams of systems and apparatus configured to form an alloy preform by a solid-spray-forming process;

Figure 1:
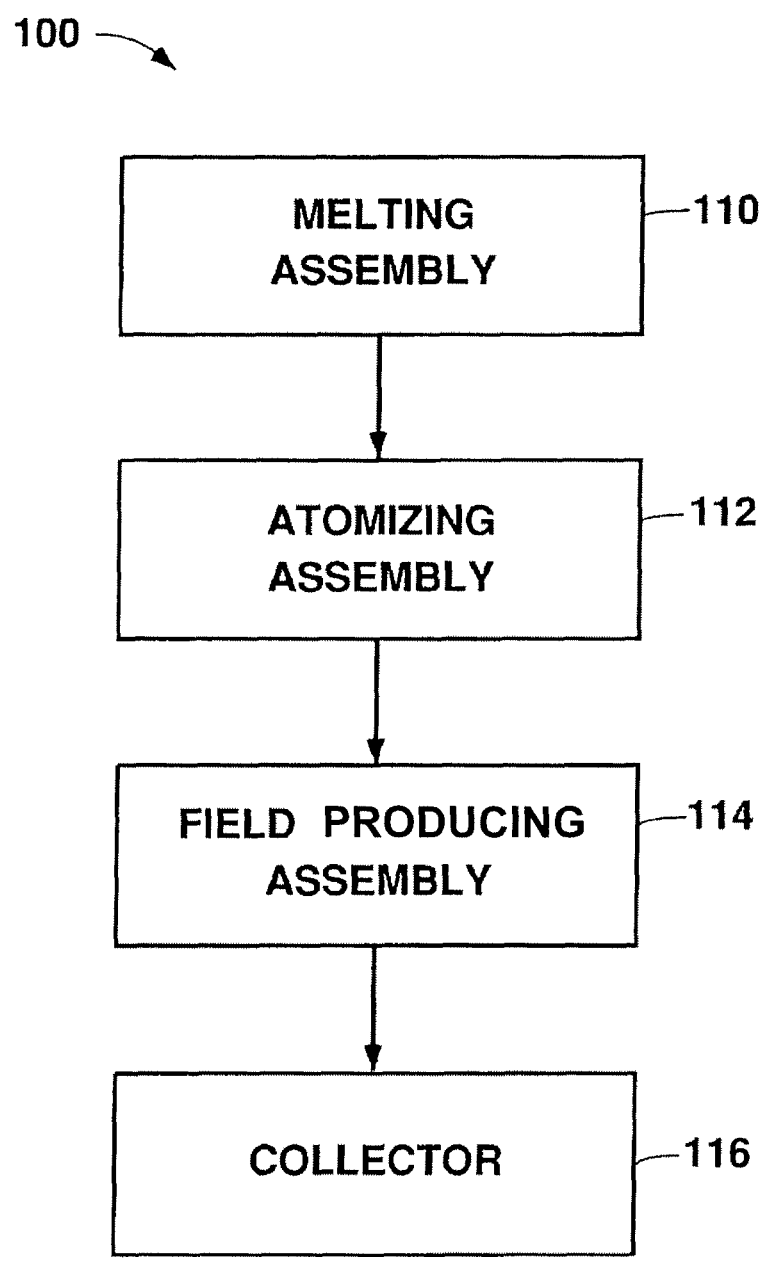
FIG. 1 is a schematic illustration of an alloy processing system.

The reader will appreciate the foregoing details, as well as others, upon considering the following detailed description of various non-limiting and non-exhaustive embodiments according to the present disclosure.

Description

Various embodiments are described and illustrated in this specification to provide an overall understanding of the structure, function, operation, manufacture, and use of the disclosed processes and products. It is understood that the various embodiments described and illustrated in this specification are non-limiting and non-exhaustive. Thus, the invention is not limited by the description of the various non-limiting and non-exhaustive embodiments disclosed in this specification. Rather, the invention is defined solely by the claims. The features and characteristics illustrated and/or described in connection with various embodiments may be combined with the features and characteristics of other embodiments. Such modifications and variations are intended to be included within the scope of this specification.

As such, the claims may be amended to recite any features or characteristics expressly or inherently described in, or otherwise expressly or inherently supported by, this specification. Further, Applicant reserves the right to amend the claims to affirmatively disclaim features or characteristics that may be present in the prior art. Therefore, any such amendments comply with the requirements of 35 U.S.C. §112, first paragraph, and 35 U.S.C. §132(a). The various embodiments disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference herein.

Reference throughout this specification to "various non-limiting embodiments," or the like, means that a particular feature or characteristic may be included in an embodiment. Thus, use of the phrase "in various non-limiting embodiments," or the like, in this specification does not necessarily refer to a common embodiment, and may refer to different embodiments. Further, the particular features or characteristics may be combined in any suitable manner in one or more embodiments. Thus, the particular features or characteristics illustrated or described in connection with various embodiments may be combined, in whole or in part, with the features or characteristics of one or more other embodiments without limitation. Such modifications and variations are intended to be included within the scope of the present specification.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. §112, first paragraph, and 35 U.S.C. §132(a).

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

In various critical applications, components must be manufactured from alloys, such as, for example, nickel-base superalloys, in the form of large diameter ingots that lack significant segregation. Such ingots should be substantially free of positive and negative segregation. "Freckles" are a common manifestation of positive segregation and are metallographically observable as dark etched regions enriched in solute elements. Freckles result from the flow of solute-rich interdendritic liquid in the mushy zone of a cast ingot during solidification. Freckles in Alloy 718, for example, are enriched in niobium compared to the overall alloy matrix, have a high density of carbides, and usually contain Laves phase. As such, freckles are particularly disadvantageous in alloys to be used in critical applications.

"White spots" are a common type of negative segregation. White spots are metallographically observable as light etched regions, which are depleted in hardener solute elements, such as niobium. White spots are typically classified into dendritic, discrete, and solidification white spots. While there may be some tolerance for dendritic and solidification white spots, discrete white spots are of major concern because they frequently are associated with a cluster of oxides and nitrides that can act as crack initiation sites in cast alloy articles.

Ingots and preforms substantially lacking positive and negative segregation and that are also free of freckles may be referred to as "premium quality" ingots and preforms. Premium quality nickel-base superalloy ingots and preforms are required in various critical applications including, for example, rotating components in aeronautical or land-based power generation turbines and in other applications in which segregation-related metallurgical defects may result in catastrophic failure of the component during operation. As used herein, an ingot or preform "substantially lacks" positive and negative segregation when such types of segregation are wholly absent or are present only to an extent that does not make the ingot or preform unsuitable for use in critical applications, such as use for fabrication into rotating components for aeronautical and land-based turbine applications.

Nickel-base superalloys subject to significant positive and negative segregation during casting include, for example, Alloy 718 (UNS N07718) and Alloy 706 (UNS N09706). In order to minimize segregation when casting these alloys for use in critical applications, and to better ensure that the cast alloy is free of deleterious non-metallic inclusions, the molten metallic material is appropriately refined before being finally cast. A technique for refining Alloy 718, as well as various other segregation-prone nickel-base superalloys such as Alloy 706, is the "triple melt" technique, which combines, sequentially, vacuum induction melting (VIM), electroslag refining/remelting (ESR), and vacuum arc remelting (VAR). Premium quality ingots of these segregation-prone materials, however, are difficult to produce in large diameters by VAR melting, the last step in the triple melt sequence. In some cases, large diameter ingots are fabricated into single components, in which case areas of unacceptable segregation in VAR-cast ingots cannot be selectively removed prior to component fabrication. Consequently, the entire ingot or a portion of the ingot may need to be scrapped.

Ingots of Alloy 718, Alloy 706, and other nickel-base superalloys such as Alloy 600 (UNS N06600), Alloy 625 (UNS N06625), Alloy 720, and Waspaloy® (UNS N07001) are increasingly required in larger weights and correspondingly larger diameters for various emerging applications. Such applications include, for example, rotating components for larger land-based and aeronautical turbines. Larger ingots are needed not only to achieve the final component weight economically, but also to facilitate sufficient thermomechanical working to adequately break down the ingot structure and achieve all final mechanical and structural requirements.

The melting and casting of large diameter superalloy ingots accentuates a number of basic metallurgical and processing related issues. For example, heat extraction during melt solidification becomes more difficult with increasing ingot diameter, resulting in longer solidification times and deeper molten pools. This increases the tendency towards positive and negative segregation. Also, larger ingots and ESR/VAR electrodes can generate higher thermal stresses during heating and cooling. Alloy 718 is particularly prone to these problems. To allow for the production of large diameter VAR ingots of acceptable metallurgical quality from Alloy 718 and various other segregation-prone nickel-base superalloys, specialized melting and heat treatment sequences have been developed. One such specialized melting and heat treatment sequence is described in U.S. Pat. No. 6,416,564, which is hereby incorporated by reference into this specification.

Notwithstanding, powder metallurgy techniques may be used to produce premium quality alloy products such as large diameter nickel-base superalloy ingots. Spray forming is one powder metallurgy technique for producing large diameter superalloy ingots. During spray forming, a stream of molten alloy is atomized to form a spray of fine molten alloy droplets or particles. The molten particles are then directed to a collector where they coalesce and solidify into a coherent, near-fully-dense preform. In various applications, controlled movement of the collector and atomizer, along with control of the molten metal transport process, allows high quality large preforms to be produced. The spray forming process is capable of producing fine-grained homogeneous microstructures with equiaxed grains and more than 98 percent theoretical density for a wide range of alloys. However, conventional spray forming generally employs fluid impingement atomization techniques, which present a number of drawbacks.

In fluid impingement atomization techniques, either a gas or a liquid is impinged on a stream of a molten metallic material. Impingement using liquid or gases may introduce contaminants into the atomized material. Given that fluid impingement does not occur in a vacuum environment, even impingement techniques using inert gases can introduce significant levels of impurities into the atomized material. Various non-fluid impingement atomization techniques that may be conducted in a vacuum environment have been developed. These techniques include, for example, the atomization techniques described in U.S. Pat. No. 6,772,961 (referred to is this specification as "U.S. Pat. No. 6,722,961"), which is hereby incorporated by reference into this specification.

U.S. Pat. No. 6,722,961 describes techniques wherein molten alloy droplets or a molten alloy stream produced by a melting device coupled with a controlled dispensing device are rapidly electrostatically charged by applying a high voltage to the droplets at a high rise rate. The electrostatic forces set up within the charged droplets cause the droplets to break up or atomize into smaller secondary particles. In one technique described in U.S. Pat. No. 6,722,961, primary molten droplets produced by the nozzle of a dispensing device are treated by an electric field from a ring-shaped electrode adjacent to and downstream of the nozzle. Electrostatic forces developed within the primary droplets exceed the surface tension forces of the particles and result in formation of smaller secondary particles. Additional ring-shaped field-producing electrodes may be provided downstream to treat the secondary particles in the same way, producing yet smaller molten particles.

Electron beam atomization is another non-fluid impingement technique for atomizing molten material that is conducted in a vacuum. In general, the technique involves using an electron beam to inject a charge into a region of a molten alloy stream and/or a series of molten alloy droplets. Once the region or droplet accumulates sufficient charge exceeding the Rayleigh limit, the region or droplet becomes unstable and is disrupted into fine particles (i.e., atomizes). An electron beam atomization technique is described in U.S. Pat. Nos. 6,772,961; 7,578,960; 7,803,212; and 7,803,211; which are hereby incorporated by reference into this specification.

U.S. Pat. No. 6,722,961 also discloses techniques using electrostatic and/or electromagnetic fields to control the acceleration, speed, and/or direction of molten alloy particles formed by atomization in the process of producing spray formed preforms or powders. As described in U.S. Pat. No. 6,722,961, such techniques provide substantial downstream control of atomized molten material and can reduce overspray and other material wastage, improve quality, and enhance the density of solid preforms made by spray forming techniques.

Methods of collecting atomized molten materials as unitary preforms include spray forming and nucleated casting. With respect to nucleated casting, specific reference is drawn to U.S. Pat. Nos. 5,381,847; 6,264,717; and 6,496,529, which are hereby incorporated by reference into this specification. In general, nucleated casting involves atomizing a molten alloy stream and then directing the resultant molten alloy particles into a casting mold having a desired shape. The droplets coalesce and solidify as a unitary article shaped by the mold, and the casting may be further processed into a desired component. In general, spray forming involves directing atomized molten material onto a surface of, for example, a platen or a cylinder to coalesce, solidify, and form a free-standing preform that may be further processed into a desired component.

As noted, many of the techniques for melting, atomizing, and processing metals and alloys to produce solid preforms are deficient in one or more respects. Such deficiencies include, for example, process complexity and cost; the existence of high residual stresses, voids, porosity, oxides, and other contaminants in the preform; yield losses due to overspray; limitations on applicable metals and alloys; and inherent size limitations. These deficiencies are particularly problematic in the production of various alloys such as nickel-base superalloys. The various non-limiting embodiments disclosed and described in this specification are directed, in part, to processes, systems, and apparatus that overcome at least some of these deficiencies, among others, and provide improved techniques for the production of metal and alloy products such as, for example, large diameter ingots and other premium quality preforms.

The various non-limiting embodiments disclosed and described in this specification are directed, in part, to processes, systems, and apparatus for melting and atomizing metals and metallic (i.e., metal-containing) alloys to produce atomized molten materials that may be at least partially solidified into alloy particles used to produce unitary and monolithic alloy preforms and other articles. As used herein, the term "alloy" refers to both metals and metallic alloys such as, for example, iron, nickel, titanium, cobalt, and alloys based on these metals.

The various non-limiting embodiments disclosed herein may employ equipment and techniques that utilize electrons to melt alloys and/or atomize molten alloys to produce molten alloy particles that are solidified and solid-spray-formed to produce unitary and monolithic preforms and other alloy articles. In various non-limiting embodiments, the processes, systems, and apparatus disclosed herein may be useful in nickel-base superalloy preform and article production, where cast-and-wrought metallurgy, triple melt, and powder metallurgy techniques have attendant disadvantages as discussed above.

In various non-limiting embodiments, a solid-spray-forming process comprises producing at least one of a stream of molten alloy and a series of droplets of molten alloy. Electrically-charged particles of the molten alloy are produced by impinging electrons on at least one of the stream of molten alloy and the series of droplets of molten alloy to atomize the molten alloy. The electrically-charged molten alloy particles are accelerated with at least one of an electrostatic field and an electromagnetic field. The molten alloy particles are cooled to a temperature less than a solidus temperature of the molten alloy particles so that the molten alloy particles solidify while accelerating. The solidified alloy particles are impacted onto a substrate, wherein the impacting particles deform and metallurgically bond to the substrate and to each other to produce a solid alloy preform.

Referring to FIG. 1, various non-limiting embodiments of a system 100, configured to perform a solid-spray-forming process as described in this specification, includes: a melting assembly 110 (also referred to herein as a "melting apparatus" or "melting device") that produces at least one of a stream and a series of droplets of molten alloy; an electron beam atomizing assembly 112 (also referred to herein as an "atomizing apparatus" or "atomizing device") that atomizes molten alloy received from the melting assembly 110 and produces relatively small molten alloy particles; a field producing assembly 114 (also referred to herein as a "field producing apparatus" or "field producing device") that produces at least one of an electrostatic field and an electromagnetic field that influences at least one of the acceleration, speed, and direction of one or more of the alloy particles produced by the atomizing assembly 112; and a collector 116 onto which solidified alloy particles impact, deform, and metallurgically bond to form a preform.

In various non-limiting embodiments, a solid-spray-forming process comprises: producing a stream of molten alloy and/or a series of droplets of molten alloy in a melting assembly, which may be substantially free from ceramic in regions of the melting assembly contacted by the molten alloy; producing molten alloy particles in an atomizing assembly by impinging electrons on molten alloy received from the melting assembly; producing at least one of an electrostatic field and an electromagnetic field, wherein molten alloy particles from the atomizing assembly interact with the field, and the field influences at least one of the acceleration, speed, and direction of the molten alloy particles; cooling the molten alloy particles during the transport of the particles from the atomizing assembly to form solid alloy particles; and collecting the solid alloy particles in a collector as a solid preform.

As used herein, the term "melting assembly" and the like refer to a source of a stream and/or a series of droplets of a molten alloy, which may be produced from a charge of starting materials, scrap, an ingot, a consumable electrode, and/or another source of the alloy. The melting assembly is in fluid communication with and feeds molten alloy to an atomizing assembly. The melting assembly may substantially lack ceramic material in regions of the assembly that are contacted by molten material. As used herein, the phrase "substantially lacks ceramic" and the like means that ceramic either is absent in regions of the melting assembly that the molten material contacts during operation of the assembly, or is present in regions of the melting assembly that do contact the molten alloy during normal operation but in a way that does not result in the inclusion of problematic amounts or sizes of ceramic particles or inclusions in the molten alloy.

In various non-limiting embodiments, it may be important to prevent or substantially limit contact between molten alloy material and ceramic material in the melting assembly and other components of the systems and apparatus described herein. This may be so because ceramic particles can "wash out" of ceramic linings and mix with molten alloy. Ceramic particles generally have a higher melting point temperature than molten alloy material and may be incorporated into subsequently formed preforms. Once incorporated into a solid product, the ceramic particles can fracture and initiate cracks in the product during low cycle fatigue, for example. Once initiated, cracks can grow and result in product failure. Thus, depending on the intended application for the preform material, for example, there may be little or no allowance for the presence of ceramic particles in the material.

In cast-and-wrought metallurgy, ceramic particles from a vacuum induction melting (VIM) step can be removed during a subsequent vacuum arc remelting (VAR) step or, when using triple-melt practice, during electroslag refining/remelting (ESR) plus VAR steps. Therefore, in various non-limiting embodiments, a melting assembly may comprise VAR or ESR equipment. Oxide ceramic cleanliness achieved using various practices may be evaluated using a semi-quantitative test known as an "EB button" test, wherein a sample electrode of the material to be evaluated is electron beam melted in a crucible and the resulting floating raft of oxide is measured for the largest oxide present.

In powder metallurgy, alloy powder is consolidated into product after final solidification and there is no means of further refining the product to remove oxides. Instead, the powder is sieved and the largest fraction of powder that is made into product is that which is equivalent to the smallest defect that part designers use in their design criteria. In the design of the most critical aircraft engine parts from consolidated metallic powders, for example, the smallest modeled defect is approximately 44 microns and, thus, powders having a sieve size no larger than this are used. For less critical aircraft engine parts, the smallest modeled defect could be as large as approximately 149 microns and, thus, powders having a sieve size no larger than this are used.

Examples of melting techniques that do not introduce ceramic inclusions and that may be included in an apparatus or system configured to perform a solid-spray-forming process as described in this specification include, but are not limited: melting devices comprising vacuum double-electrode remelting devices; melting devices comprising a combination of a cold induction guide and either an electroslag refining/remelting device or a vacuum arc remelting device; plasma arc melting devices; electron beam melting devices; and electron beam cold hearth melting devices.

As used herein, the term "atomizing assembly" and the like refers to an apparatus that impinges at least one stream of electrons (i.e., an electron beam) or a field of electrons on molten alloy received from the melting assembly. As used herein, "impinges" means to bring into contact. In this manner, the electrons impart a net negative charge to the impinged region of the stream and/or to the impinged individual molten alloy droplets. As discussed in U.S. Pat. No. 6,772,961 and below, once the charge in a droplet or a particular region of a stream reaches a sufficient magnitude, the region or droplet becomes unstable and is disrupted (i.e., atomized) into smaller molten alloy particles. As used herein, "molten alloy particles" refers to particles that include some content of molten material, but which are not necessarily entirely molten. As used herein, "solid alloy particles" refers to particles that are at a temperature below the solidus temperature of the material and, therefore, are entirely solid.

In various embodiments, an atomizing assembly may comprise an electron beam atomizing assembly, apparatus, device, or the like. As discussed in U.S. Pat. No. 6,772,961, an electron beam atomizing apparatus may rapidly apply an electrostatic charge to a stream or droplets of molten alloy. An electron beam atomizing apparatus may be configured so that the electrostatic charge imparted to a molten alloy physically disrupts the stream or droplet and produces one or more smaller molten alloy particles from the molten alloy, thereby atomizing the material. Atomization of molten alloy material using rapid electrostatic charging through impingement by electrons may result in the rapid breakup of the alloy into relatively small particles due to electrostatic repulsion forces imparted within the material. More specifically, a region or droplet of molten alloy is rapidly electrostatically charged beyond the "Rayleigh limit," such that the electrostatic forces within the region or droplet exceed the surface tension of the molten alloy and the material breaks up into smaller particles.

The Rayleigh limit refers the maximum charge a material can sustain before the electrostatic repulsion forces within the material exceed the surface tension holding the material together. Advantages of an atomization technique utilizing the impingement of electrons on a material to set up electrostatic charge repulsion with the material include the capability to conduct the technique within a vacuum environment. In this manner, chemical reactions between molten alloy material and the atmosphere or an atomizing fluid can be limited or eliminated. This capability contrasts with conventional fluid atomization, wherein the material being atomized necessarily contacts an atomizing gas or liquid and is typically conducted in ambient air or in inert gas atmosphere.

A stream or droplets of molten alloy atomized by an atomizing assembly is produced by an upstream melting assembly. A melting assembly may include, for example, a dispenser that forms a suitable stream or droplets of molten alloy. In various non-limiting embodiments, a dispenser may include a melt chamber having an orifice. An example of such a dispenser is shown in U.S. Pat. No. 6,772,961, hereby incorporated by reference into this specification. A stream and/or droplets of molten alloy are forced or otherwise emerge from an orifice and pass downstream to an atomizing assembly. In various non-limiting embodiments, a molten alloy stream or droplets emerge from an orifice of a melt chamber under the influence of mechanical action or pressure. In various non-limiting embodiments, pressure may be applied to the molten alloy in a dispenser of a melting assembly at a magnitude greater than the pressure at the outside of the dispenser orifice to produce molten alloy droplets at the orifice in the dispenser. The pressure may be cycled or otherwise varied so as to selectively interrupt the flow of molten alloy streams and/or droplets.

Various non-limiting embodiments of a melting assembly may be designed to "pre-charge" a molten alloy stream or droplets that travel to an atomizing assembly with a net negative charge. Pre-charging a stream or droplets may reduce the amount of negative charge required from an electron beam atomizing assembly to exceed the Rayleigh limit and atomize the stream or droplets into smaller particles. A non-limiting technique for pre-charging a molten alloy stream or droplets is to maintain a melting assembly at a high negative potential relative to other elements of the overall apparatus. This may be accomplished, for example, by electrically isolating a melting assembly from other elements of the apparatus, and then raising the negative potential of the melting assembly to a high level using a power supply electrically coupled to the melting assembly. Another non-limiting pre-charging technique is to position an induction ring or plates upstream of an atomizing assembly in a position close to an outlet orifice of a melting assembly. The ring or plates may be configured to induce a negative charge in the droplets or stream passing downstream to an atomizing assembly. An atomizing assembly may then impinge electrons on the pre-charged material to further negatively charge and atomize the material.

In various non-limiting embodiments, an atomizing assembly may comprise a thermo-ionic electron beam emitter or a like device. The thermo-ionic emission phenomenon, also known as the "Edison effect," refers to the flow of electrons (referred to as "thermions") from a metallic surface when thermal vibrational energy overcomes the electrostatic forces holding electrons to the surface. The effect increases dramatically with increasing temperature, but is always present to some degree at temperatures above absolute zero. A thermo-ionic electron beam emitter utilizes the thermo-ionic emission phenomenon to produce a stream of electrons with a defined kinetic energy.

Thermo-ionic electron beam emitters generally comprise: (i) a heated electron-producing filament; and (ii) an electron accelerating region, which is bounded by a cathode and an anode. The filament typically consists of a length of refractory material wire, which is heated by passing an electric current through the filament. Suitable thermo-ionic electron beam emitter filament materials generally have the following properties: low potential barrier (work function); high melting point; stability at high temperatures; low vapor pressure; and chemical stability. Various non-limiting embodiments of thermo-ionic electron beam emitters include, for example, tungsten, lanthanum hexaboride ($LaB_6$), or cerium hexaboride ($CeB_6$) filaments.

In a thermo-ionic electron beam emitter, electrons "boil away" from the surface of the filament upon application of sufficient thermal energy produced by the applied current. The electrons produced at the filament drift through a hole in a cathode, and the electric field in the region between the positively-charged anode and the negatively-charged cathode accelerates the electrons across the gap to the anode, where the electrons pass through a hole in the anode with a final energy corresponding to the applied voltage between the electrodes.

In order to negatively charge a molten alloy stream or droplets to a level necessary to overcome surface tension and atomize the material, the droplets or stream must be subjected to a flow or field of electrons of sufficient energy and intensity for a finite period of time. An atomizing assembly may produce a three-dimensional electron field, which extends a suitable distance along the path traveled by the droplets or stream through the atomizing assembly. A three-dimensional electron field, wherein the electrons are spatially distributed, may be contrasted with a point source electron beam emitter, wherein the electrons are focused in a narrow essentially two-dimensional beam. A three-dimensional spatial distribution of impinging electrons increases the impingement and charging efficiency and effectiveness of molten alloy traveling through an atomizing assembly under the influence of gravity, for example.

Without intending to be bound by any particular theory, it is believed that electron beam-atomized alloy particles may be formed from a molten droplet or stream by one or both of the following mechanisms. In a first non-limiting mechanism, atomized particles are sequentially stripped from the surface of a droplet or stream as negative charge is added to the droplet or stream. In a second non-limiting mechanism, atomized particles are formed by a cascading effect in which the initial molten stream or droplet breaks up into small particles, the particles are recharged to negative potential and break up into yet smaller particles, and the process repeats during the time in which electrons are added to the successively smaller atomized particles. Regardless of the physical atomization mechanism, molten alloy must be exposed to an electron field for a sufficient time so that sufficient negative charge accumulates in and disrupts the material.

A non-limiting spatial distribution of electrons within an electron field produced in an atomizing assembly is in the form of a cylinder of electrons. The longitudinal axis of the cylinder may be oriented in the general direction of travel of molten alloy material through the atomizing assembly. The minimum length of the cylinder (along the longitudinal axis) required for complete atomization will depend on the velocity of the molten alloy material traveling through the atomization assembly and the energy and intensity of the electron field within the assembly. Non-cylindrical electron field shapes also may be used, such as, for example, fields having a transverse cross-section (transverse to the molten alloy material's general direction of travel through the atomizing assembly) that is rectangular, triangular, or some other polygonal or otherwise bounded shape. More generally, fields of any combination of energy, intensity, and three-dimensional shape capable of suitably atomizing molten alloy material may be used. Various non-limiting embodiments of an electron beam atomizing assembly for an apparatus constructed according to the present disclosure are discussed below.

In various non-limiting embodiments, an atomizing assembly may comprise a heated tungsten filament electron source. Electrons thermo-ionically emitted from a heated tungsten filament may be manipulated using electrostatic and/or electromagnetic fields to form a rectangular-shaped beam of electrons. The rectangular-shaped beam may be projected into an atomizing chamber as a generally block-shaped three-dimensional field across the path of travel of molten alloy material through the atomizing assembly. FIG. 2 schematically illustrates an atomizing assembly 210 including a tungsten filament 212 that is heated by flow of current from a power supply 214. The heated filament 212 produces free electrons 216. The electrons 216 may be produced, for example, by a thermo-ionic electron beam emitter.

The electrons 216 are shaped by an electrostatic field produced by plates 220 to form a three-dimensional electron beam 222 having a generally rectangular-shaped cross-section. The electron beam 222 is projected into the interior of the atomizing assembly 210 to produce a generally block-shaped three-dimensional electron field 226. Molten alloy droplets 230 dispensed an the upstream melting assembly 232 travel through the electron field 226 and are atomized to smaller particles 238 through disruption by accumulation of negative charge. The atomized particles 238 pass in the direction of arrow A toward a collector (not shown).

In various embodiments, atomizing assemblies may comprise electron-producing devices other than or in addition to thermo-ionic electron beam emitters. For example, in various embodiments, an atomizing assembly may comprise a wire-discharge ion plasma electron emitter, also known as a cold cathode wire ion generator and/or a plasma ion emitter. Wire-discharge ion plasma electron emitters produce an electron field having a generally rectangular cross-section. One advantage of a wire-discharge ion plasma electron emitter is that it produces an electron emission at temperatures lower than a thermo-ionic electron emitter. Electrons produced by a particular electron-producing device or devices within an atomizing assembly may be suitably manipulated, for example, using electromagnetic and/or electrostatic fields, to form a beam of electrons having a suitable cross-section. The electron beam may then be projected into an atomizing chamber across the path of travel of molten alloy material to be atomized.

FIG. 3 illustrates another non-limiting embodiment of an atomizing assembly 310. One or more tungsten filaments 312 are heated by power supply 314 and produce electrons 316 having sufficient energy to atomize molten alloy when impinged on the molten alloy. The electrons may be produced, for example, by a thermo-ionic electron beam emitter. The electrons 316 may be manipulated by structures such as, for example, plates 320 to form a diffuse spot 322. A rastering apparatus 324 rasters the electron spot 322 at a high raster rate within the region of the atomizing assembly through which molten alloy material travels, for example, under the influence of gravity. The effect of the high raster rate is to provide a three-dimensional electron field 326 having a controlled shape in the atomizing chamber of the atomizing assembly 310 that is configured to atomize the molten alloy droplets 330 received from a melting assembly 332 to smaller atomized particles 338. The atomized particles 338 pass in the direction of arrow A toward a collector (not shown).

Referring to FIG. 4, an atomizing assembly 410 produces an electron field having a generally rectangular cross-section. The electrons are produced from the surface of a generally straight length of tungsten filament 412 heated by power supply 414. This method of producing electrons contrasts with the technique of producing electrons from a point source, as is typically done in electron beam guns. The electrons 416 emanating from the surface of the filament 412 may be manipulated using electrostatic and/or electromagnetic fields, such as, for example, a field produced by plates 420, to form a beam 422 having a generally rectangular cross-section. The rectangular electron beam 422 may be rastered at a high raster rate by a rastering apparatus into the atomizing assembly 410 to form an electron field through which molten alloy material 430 travels when received from a melting assembly 432.

Alternatively, as shown in FIG. 4, the rectangular electron beam 422 may be projected into the atomizing assembly 410 by a projecting device 424 to form an electron field 426, having a generally rectangular cross section, through which molten alloy material 430 travels when received from the melting assembly 432. The alloy material 430 is disrupted by accumulation of negative charge into atomized particles 438, which pass toward a collector (not shown) in the direction of arrow A.

In various embodiments, an atomizing assembly may comprise multiple sources of electrons. An atomizing assembly may also comprise multiple electron manipulating and projecting/rastering devices to produce and control a suitable electron field. For example, a number of thermo-ionic or non-thermo-ionic electron beam emitters or other electron sources may be oriented at specific angular positions (for example, three emitters/sources at 120 degrees to one another) about the pathway of molten alloy material in an atomizing chamber and produce a three-dimensional field of electrons by projecting the electrons from the multiple sources into the pathway.

Figure 3:
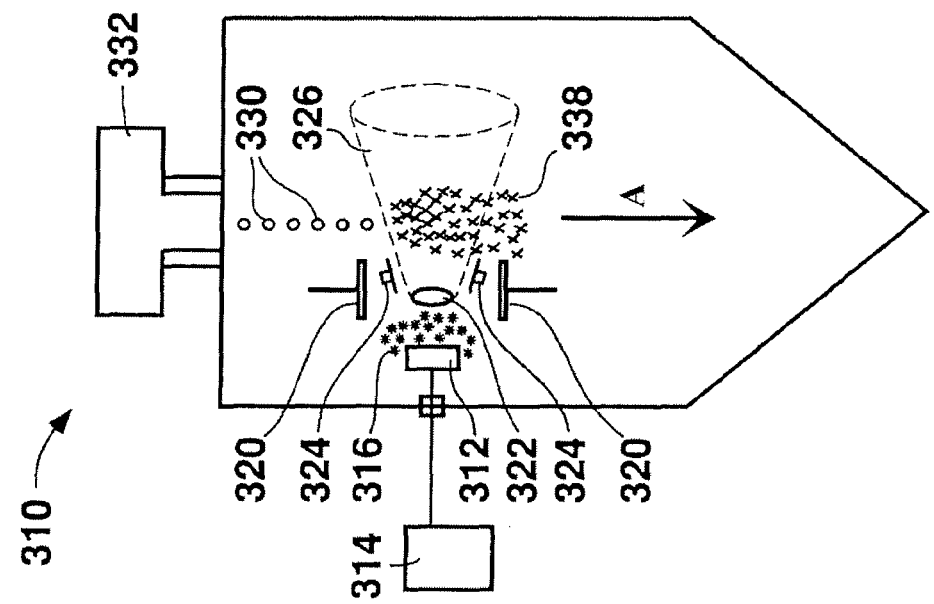
FIG. 3 is a schematic diagram of an atomizing assembly, wherein a rastering apparatus produces a field of electrons in the pathway of molten alloy passing through the atomizing assembly.
Figure 2:
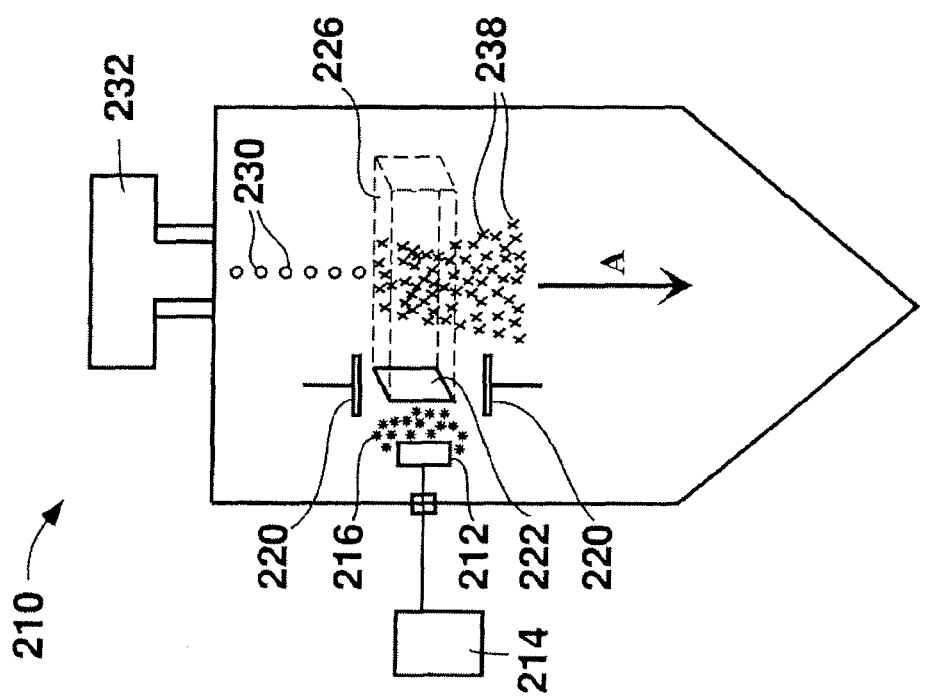
FIG. 2 is a schematic diagram of an atomizing assembly, wherein a generally rectangular-shaped field of electrons is produced in the pathway of molten alloy passing through the atomizing assembly.

In various embodiments, components and features of the several atomizing assembly embodiments described above may be combined. For example, with reference to FIGS. 2 and 3, the rectangular beam 222 of the atomizing assembly 210 may be rastered using the rastering apparatus 324 in atomizing assembly 310 to produce an electron field to atomize the molten alloy material. Relative to electron spot 322, rastering the relatively high aspect ratio rectangular electron beam 222 may provide a larger three-dimensional field disposed along the path of the molten alloy material in the atomizing chamber.

In various non-limiting embodiments of an electron beam atomizing assembly, a first flow or stream of electrons may be impinged on molten alloy material emerging from a melting assembly, thereby atomizing the alloy material to primary molten alloy particles having a first average size. Impinging a second stream of electrons on the primary particles may further atomize the particles to a smaller average particle size. Further reductions in average size may be achieved by impinging additional electron flows or streams on the successively atomized particles. In this manner, several size refinements are possible using rapid electrostatic charging by impingement of electrons.

In various non-limiting embodiments, rapid electrostatic charging by an electron beam is applied two, three, or more times along a pathway to achieve a final desired average molten alloy particle size. In this manner, the original size of molten alloy droplets produced by the melting assembly need not limit the size of the final atomized particles produced in the atomizing assembly. The multiple electron sources in such an arrangement may be, for example, individual thermo-ionic electron beam emitters, cold cathode wire ion generators, and/or plasma ion emitters.

Figure 5:
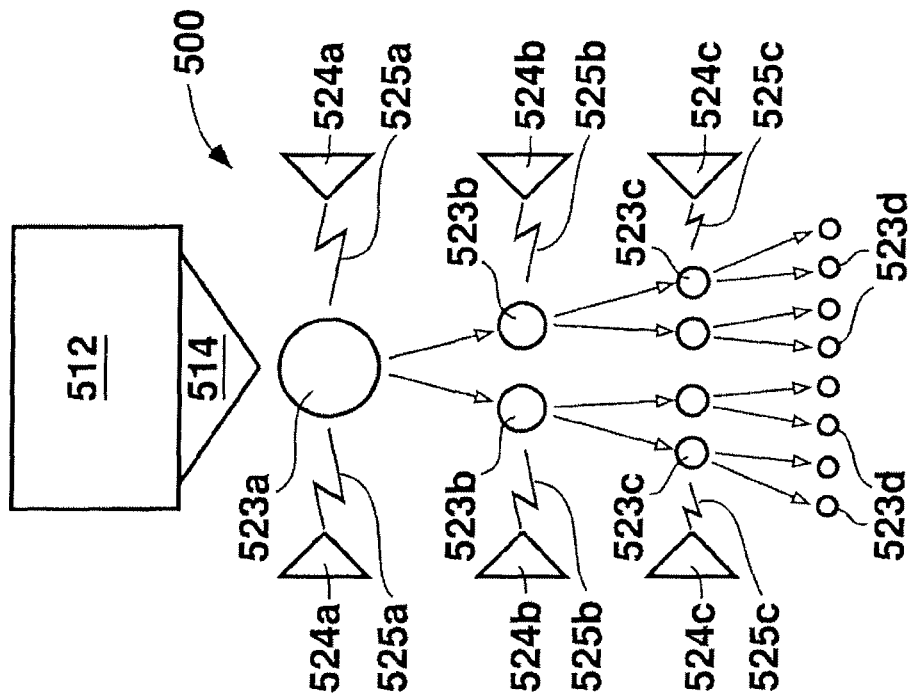
FIG. 5 is a schematic diagram of the atomization of a molten alloy droplet in an electron beam atomizing assembly.
Figure 4:
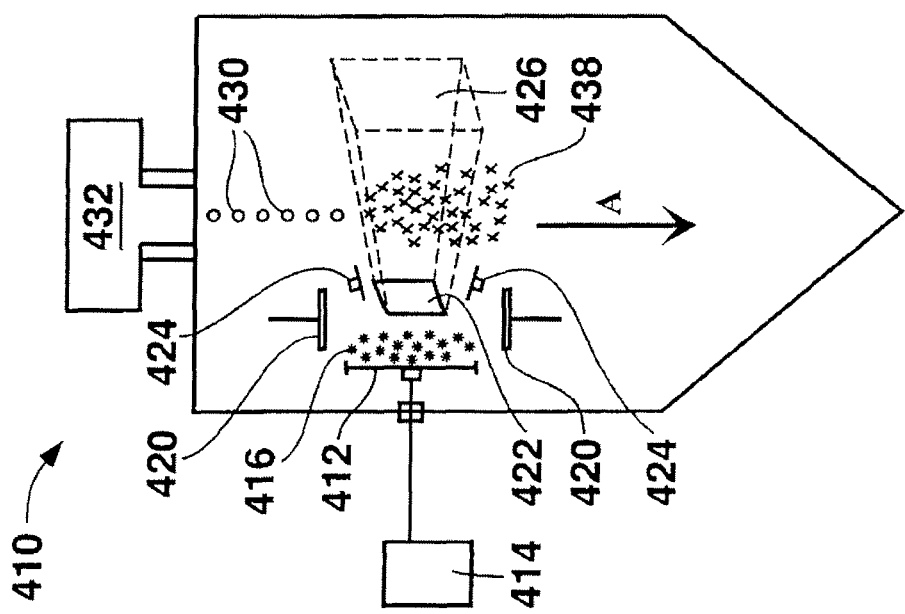
FIG. 4 is a schematic diagram of an atomizing assembly, wherein electrons used to produce an electron field in the pathway of molten alloy passing through the atomizing assembly are produced from the outer surface of a filament.

In various non-limiting embodiments of an atomizing assembly, a droplet or a portion of a stream of molten alloy undergoes two or more stages of atomization to successively reduce the average the size of the resulting atomized particles. This may be accomplished, for example, by appropriately positioning two or more electron guns or other sources of flows or streams of electrons along a pathway in a region between the atomizing assembly and the collector. An atomizing assembly having this general construction is schematically illustrated as assembly 500 in FIG. 5. A melting assembly 512 includes a dispenser 514 that produces a molten alloy droplet 523a. The dispenser 514 may use, for example, mechanical devices, pressure, or gravity to produce the molten alloy droplet 523a from molten material produced from an ingot, charge, scrap, and/or other source in the melting assembly 512.

Primary electron beam guns 524a produce streams of electrons 525a that impinge on droplet 523a and impart a negative charge to the droplet. The electrostatic forces set up within the droplet 523a eventually exceed the droplet's surface tension, disrupting the droplet and forming primary molten alloy particles 523b. Secondary electron beam guns 524b focus streams of electrons 525b on primary molten alloy particles 523b, similarly imparting negative charge to the particles and disrupting them into smaller secondary molten alloy particles 523c. Tertiary electron beam guns 524c focus streams of electrons 525c on secondary molten alloy particles 523c, also imparting negative charge to the particles and disrupting them into yet smaller tertiary molten alloy particles 523d. In a non-limiting embodiment of this arrangement, the several electron beam guns are thermo-ionic electron beam guns, although any other suitable device for producing suitable streams of electrons may be used, such as, for example, a cold cathode wire ion generator and/or a plasma ion emitter.

As discussed in U.S. Pat. No. 6,772,961, incorporated by reference herein, "rapid" electrostatic charging refers to charging to a desired magnitude within 1 to 1000 microseconds, or any sub-range subsumed therein, such as, for example, 1 to 500 microseconds, 1 to 100 microseconds, or 1 to 50 microseconds. The rapid electrostatic charging of molten alloy produced by a melting assembly produces charges exceeding the Rayleigh limit of the material, and thereby produces a plurality of smaller molten alloy particles. The particles may have a generally uniform diameter of, for example, 5 to 5000 microns, or any sub-range subsumed therein, such as, for example 5 to 2500 microns or 5 to 250 microns.

An atomizing assembly produces molten alloy particles, which are further processed to form a unitary and monolithic (i.e., one-piece) preform. As used herein, the term "preform" refers to a workpiece, ingot, or other article that is formed by collecting together metallurgically bonded solid alloy particles produced from atomized molten alloy particles. In the processes, systems, and apparatus described herein, all or a portion of the molten alloy particles produced by the atomizing assembly are controlled and solidified downstream of the atomizing assembly and collected as a preform in a collector. For example, in various non-limiting embodiments, a system or apparatus may include at least one field producing assembly that produces an electrostatic field and/or an electromagnetic field that is at least partially present in a region downstream of the atomizing assembly. The electrostatic field and/or electromagnetic field produced by the field producing assembly may be structured and/or manipulated so as to influence at least one of the acceleration, speed, and direction of the molten alloy particles that interact with the field.

As used herein, the term "field producing assembly" refers to a system or apparatus that produces and, optionally, manipulates, one or more electrostatic and/or electromagnetic fields that may be used to control at least one of the acceleration, speed, and direction of molten and solidified alloy particles in a region downstream of the atomizing assembly. Examples of field producing assemblies suitable for use in the processes, systems, and apparatus described herein are described in U.S. Pat. No. 6,772,961, which is incorporated by reference into this specification.

As used herein, the term "electrostatic field" can refer to a single electrostatic field or a plurality of (two or more) electrostatic fields. An electrostatic field may be produced, for example, by charging a point, plate, or other source to high potential. Also as used herein, the term "electromagnetic field" can refer to a single electromagnetic field or a plurality of electromagnetic fields. An electromagnetic field may be created by, for example, passing electric current through a conductor, such as, for example, a conductor coil.

In various non-limiting embodiments, a field producing assembly produces one or more electrostatic and/or electromagnetic fields that interact with and direct solid alloy particles to various regions of a developing preform at various times during a forming process. The electrostatic and/or electromagnetic fields may also be used to direct solid alloy particles to areas of a developing preform where it is desired to add or remove heat, thereby influencing the macrostructure of the preform. In conducting solid-spray-forming, the shape of the one or more electrostatic and/or electromagnetic fields can also be manipulated to produce near-net shape preforms by directing particles to predetermined regions on the developing preform at various times during the forming process. By employing one or more electrostatic and/or electromagnetic fields using the field producing assembly, it is possible to enhance the yield of the forming process, as well as improve (and control) the density of the resulting preform.

In various non-limiting embodiments, a field producing assembly produces an electrostatic field in a region between an atomizing assembly and a collector by electrically coupling the collector to a high voltage DC power supply and grounding the atomizing assembly. Given that electron beam atomization may be used in the processes, systems, and apparatus described herein, and given that the atomized particles will be negatively charged, a negative polarity is used so that the negatively charged atomized and solidified particles are repelled from the atomizing assembly and attracted to the collector. An electrostatic field may interact with negatively charged alloy particles produced by an atomizing assembly and the particles may be directed under the influence of the field to move in the general direction of the electrostatic field lines. This interaction may be used to control one or more of the acceleration, speed, and direction of the molten and solidified alloy particles toward the collector.

In addition to a high voltage DC power supply, a field producing assembly may comprise one or more electrodes located at suitable positions and in suitable orientations so as to produce suitable field(s) between an atomizing assembly and a collector. The electrodes may be positioned and configured to shape an electrostatic field between an atomizing assembly and a collector in a desired manner. An electrostatic field provided under the influence of the one or more electrodes can have a shape that directs molten and solidified alloy particles in a desired manner to a collector.

A field producing assembly may also comprise a plurality of high voltage DC power supplies, each operatively connected to one or more electrodes disposed at suitable positions and in suitable orientations between an atomizing assembly and a collector, and that influence the shape of an electrostatic field produced by the field producing assembly between the atomizing assembly and the collector in a time-dependent manner. In this manner, the field may be manipulated to suitably direct alloy particles produced by the atomizing assembly to specific areas or locations on the collector or on the developing preform over time.

For example, a field producing assembly including a plurality of electrodes and associated power supplies may be incorporated in a system or apparatus configured to solid-spray-form near net shape solid articles having high densities relative to preforms produced by conventional spray forming and nucleated casting processes. In such embodiments, the electrostatic field may be varied in terms of strength and/or shape to suitably direct the solidified alloy particles to the collector.

In various non-limiting embodiments, an electromagnetic field may be produced between an atomizing assembly and a collector by one or more magnetic coils positioned intermediate the atomizing assembly and the collector. The magnetic coils may be electrically connected to a power supply, which energizes the coils. Alloy particles produced by an atomizing assembly may be directed along the field lines of the electromagnetic field to the collector. The position and/or orientation of the one or more magnetic coils may be configured to direct the particles to specific areas or locations on a collector or a developing preform. In this manner, alloy particles may be directed to enhance the density of preforms or even produce near-net shape preforms during solid-spray-forming.

In various non-limiting embodiments, a plurality of magnetic coils may be positioned between an atomizing assembly and a collector. The electromagnetic fields produced by the plurality of magnetic coils, which may be singly or multiply energized to different magnetic field intensities, influence the direction of movement of the alloy particles produced by the atomizing assembly, directing the particles to specific predetermined areas or locations on the collector or on a developing preform. In this manner, the alloy particles can be directed in predetermined patterns to produce, for example, solid preforms having near-net shape and/or relatively high density.

In various non-limiting embodiments, the fields produced by a field producing assembly may be used to improve or refine the directional control already available through the use of translatable atomizing nozzles in an atomizing assembly. In various non-limiting embodiments, the substantial directional control attainable solely by appropriately manipulating field shape, direction, and/or intensity, can entirely replace the movement of atomizing nozzles in an atomizing assembly.

In various non-limiting embodiments, all or a portion of molten alloy particles produced by an atomizing assembly and passing within or through field(s) produced by a field producing assembly are collected on a collector as a solid preform. As used herein, the term "collector" refers to a substrate, apparatus, element, or portion or region of a substrate, apparatus, or element, or an assemblage of elements, that is configured to receive all or a portion of the solidified alloy particles produced by cooling of the molten alloy particles produced by an atomizing assembly. Non-limiting examples of a collector that may be incorporated into embodiments of a system or apparatus configured to perform a solid-spray-forming process include the entirety or a portion or region of a chamber, a mold, a platen, a mandrel, or other surface.

A collector may be held at ground potential or, in various non-limiting embodiments, at a high positive potential so as to attract the negatively charged atomized particles produced by the atomizing assembly. The system illustrated in FIG. 1, i.e., comprising a melting assembly, an atomizing assembly, a field producing assembly, and a collector, may be configured and operated to solid-spray-form an ingot or other solid preform on a surface of the collector, which in such case may be, for example, a platen or a mandrel. In various non-limiting embodiments, a system or apparatus configured to solid-spray-form an ingot or other preform may comprise a collector comprising a platen or a mandrel, which may be adapted to rotate or otherwise translate to suitably form a solid article of the desired geometry.

In various non-limiting embodiments, overspray of solid alloy particles is reduced or eliminated by suitably charging a collector. Atomizing a molten stream and/or molten particles using an electron beam produces particles that are negatively charged due to the excess of electrons within the atomized particles. By suitably charging a collector to a positive polarity, the collector will attract the particles and thereby significantly reduce or eliminate overspray. Overspray is a problematic drawback of conventional spray forming that can result in significantly compromised process yields.

Figure 6:
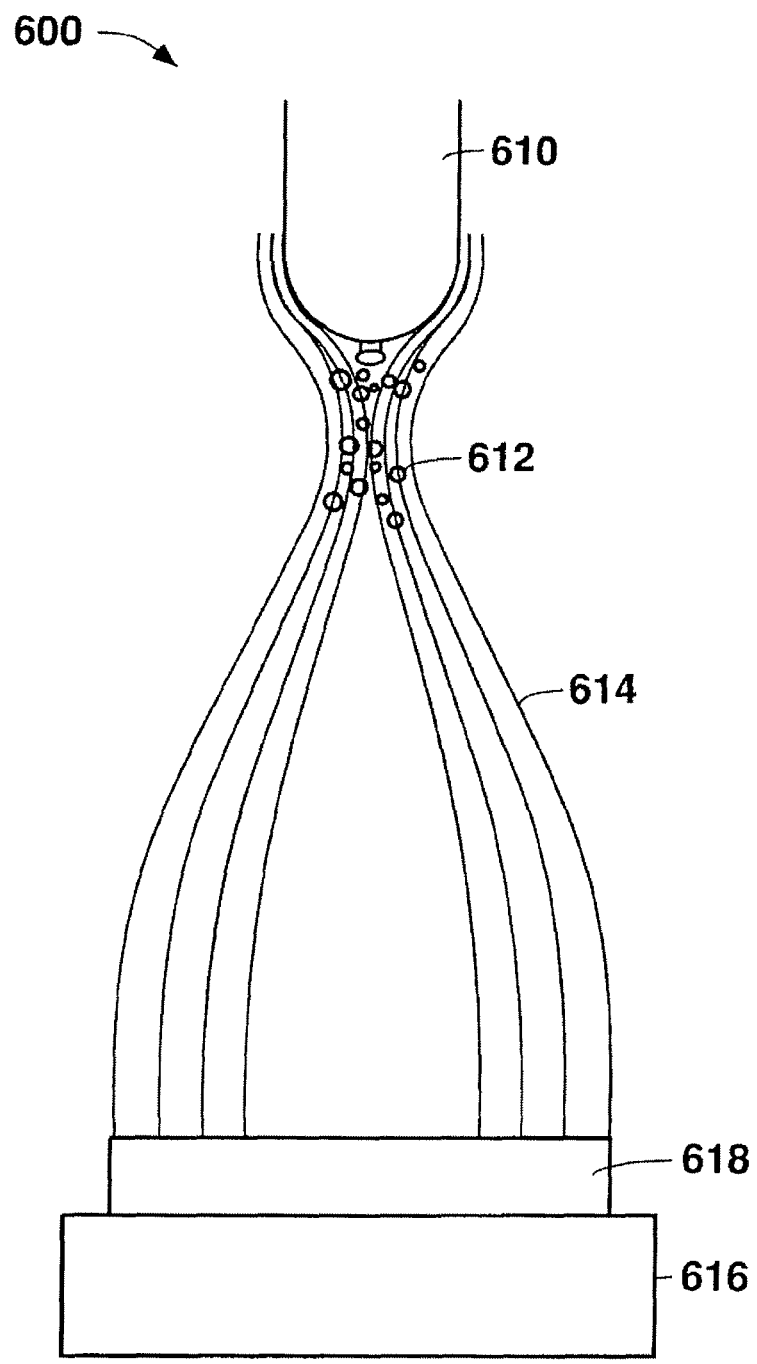

FIG. 6 schematically illustrates various elements of a non-limiting embodiment of an apparatus 600 configured to solidspray-form a solid preform. An electron beam atomizing assembly 610 produces negatively charged molten alloy particles 612. An electrostatic field 614 is produced between the atomizing assembly 610 and a collector 616. The atomizing assembly 610 receives at least one of a stream and a series of droplets of molten alloy from a melting assembly (not shown). The charged molten alloy particles interact with the electrostatic field 614, which accelerates the alloy particles 612 toward the collector 616. The molten alloy particles 612 are solidified to form solid alloy particles while traveling from the atomizing assembly 610 to the collector 616. The solid alloy particles impact the collector 616 and form a solid preform 618 on a surface of the collector 616. The field's influence on speed and/or direction of the molten alloy particles 612 and, in turn, the solidified alloy particles, may be used to reduce or eliminate over-spray from the preform 618, thereby enhancing the yield of the solid-spray-forming process, and possibly also increasing the density of the preform 618 relative to a density possible without the use of a field producing assembly.

Figure 7A:
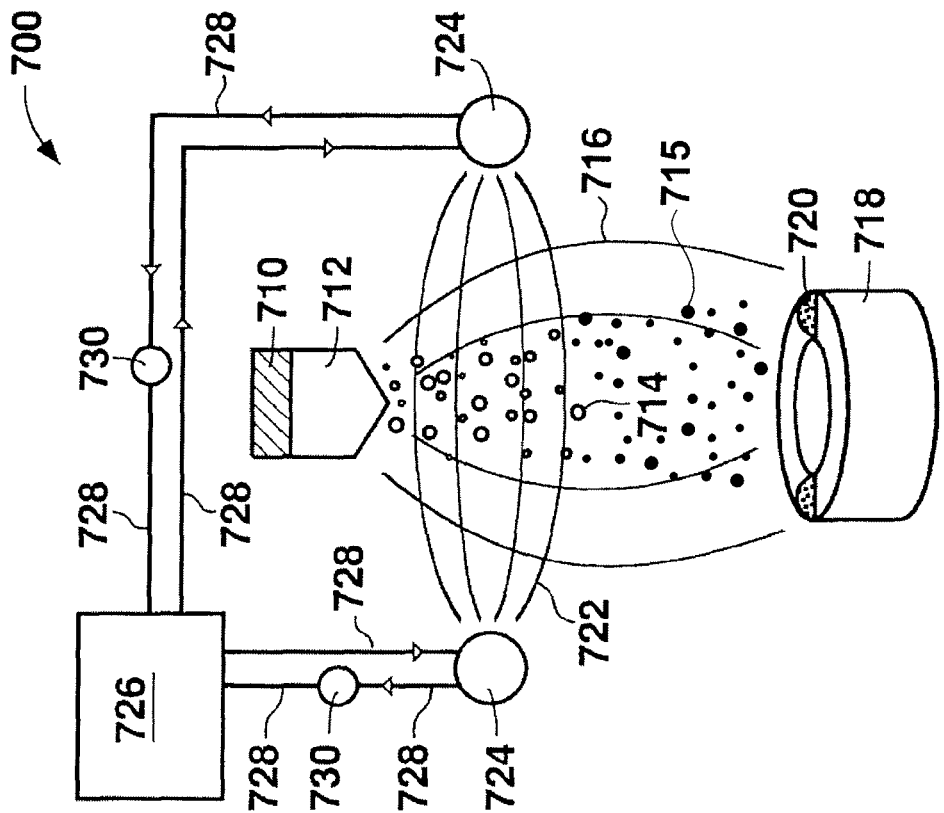
Figure 7:
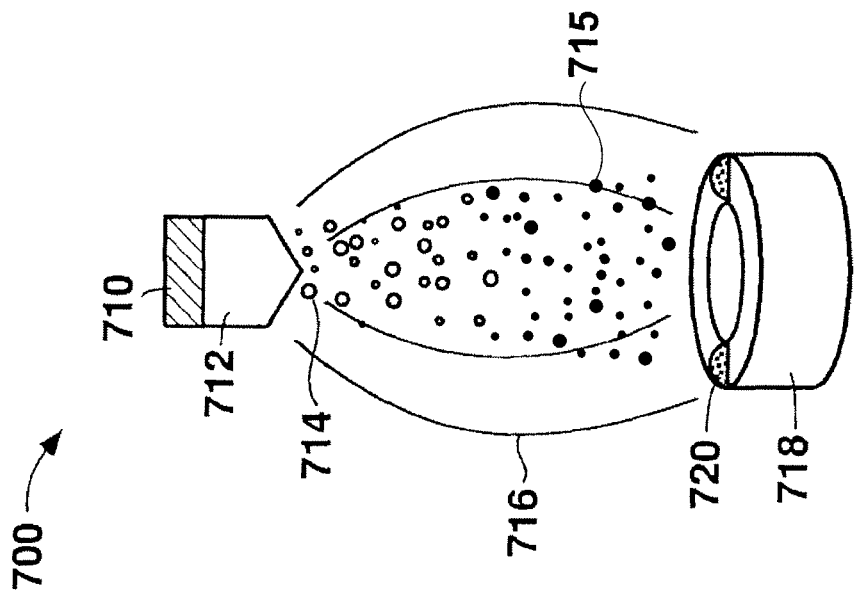

FIG. 7 schematically illustrates various elements of a non-limiting embodiment of an apparatus 700 configured to perform a solid-spray-forming process. Melting assembly 710 supplies at least one of a stream and a series of droplets of molten alloy to electron beam atomizing assembly 712, which produces a spray of negatively charged molten alloy particles 714. An electrostatic and/or electromagnetic field 716 is produced by a field producing assembly between the atomizing assembly 712 and a suitably shaped collector 718. The field 716 interacts with the charged molten alloy particles 714 to accelerate the particles 714 toward the collector 718. The molten alloy particles 714 solidify and form solid alloy particles 715 while traveling from the atomizing assembly 712 to the collector 718. The alloy particles 714/715 may be accelerated to a greater extent if the collector 718 is held at a high positive potential. The accelerating force and directional control exerted by the field 716 on the charged particles 714/715 may be used to enhance the density of the solid preform 720, and also may be utilized to produce a near-net shape preform 720. The collector 718 may be stationary, or may be adapted to rotate or otherwise suitably translate. The solid alloy particles 715 impact the collector 718 and the developing preform 720, deform upon impact, and metallurgically bond together to form the solid preform 720.

As shown in FIG. 7A, an alternative non-limiting embodiment of an apparatus 700 includes a non-equilibrium plasma-producing assembly configured to produce non-equilibrium plasma 722 in the path of the molten particles 714 between two heat sink electrodes 724. The electrodes 724 thermally communicate with an outside thermal mass 726 by way of a dielectric liquid which circulates through conduit 728 under the influence of pumps 730. The thermal coupling between the heat sink electrodes 724 and the outside thermal mass 726 by way of the dielectric fluid allows heat to be removed from the molten particles 714 and communicated to the thermal mass 726. The non-equilibrium plasma 722 between the heat sinks 724 may be produced, for example, by means of an AC glow discharge or a corona discharge. The non-equilibrium plasma 722 transfers heat from the molten particles 714 to the two heat sink electrodes 724, which transfer the heat to the outside thermal mass 726. The removal of heat from the molten alloy particles 714 allows the particles to solidify and form solid alloy particles 715.

Heat transfer systems and devices that produce non-equilibrium plasma to transfer heat to or from atomized molten alloy particles are described in U.S. Pat. No. 6,772,961, which is incorporated by reference into this specification.

Heat transfer systems and devices that produce non-equilibrium plasma to transfer heat to or from alloy materials are also described in U.S. Pat. No. 7,114,548, which is hereby incorporated by reference into this specification.

Figure 8A:
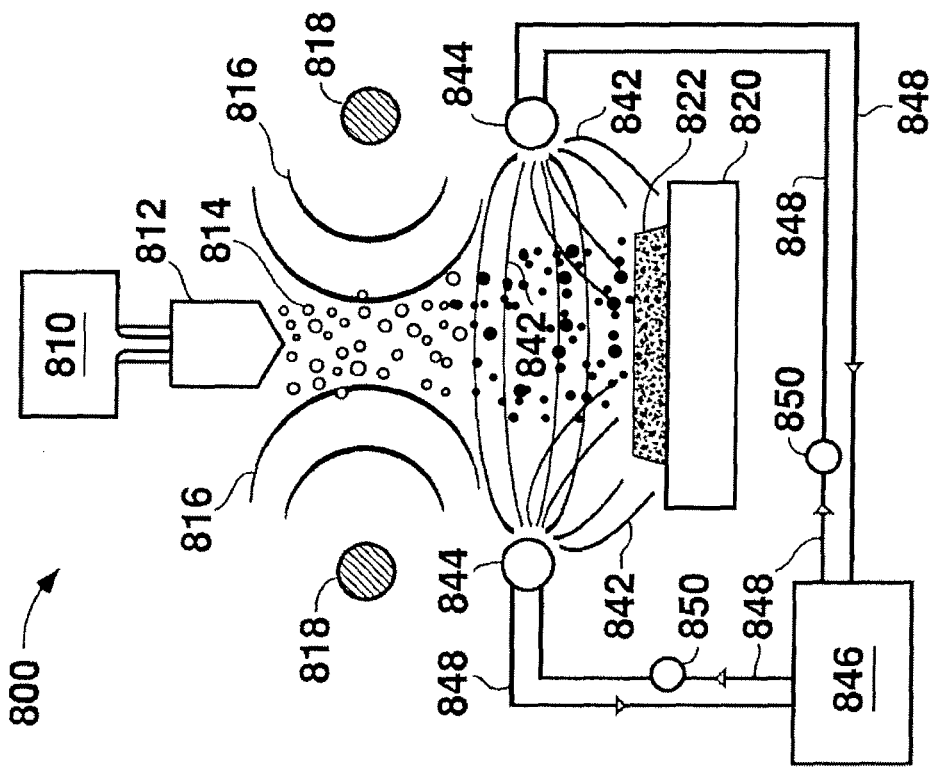
Figure 8:
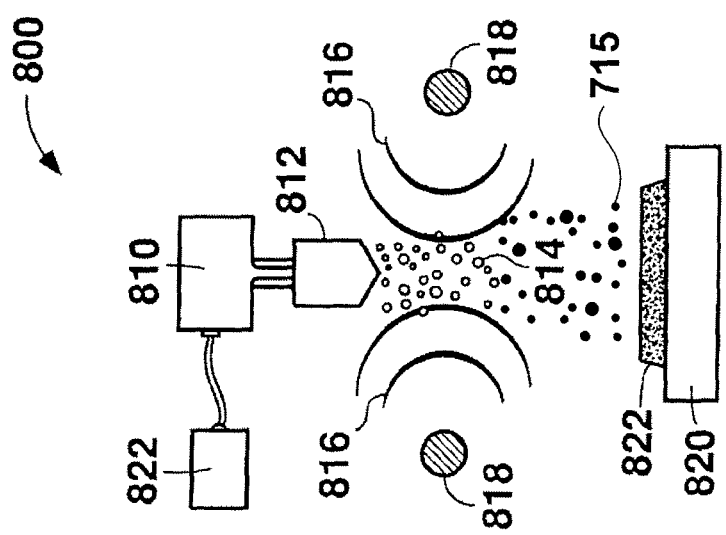

FIG. 8 schematically illustrates various elements of a non-limiting embodiment of an apparatus 800 configured to perform a solid-spray-forming process. Melting assembly 810 provides at least one of a flow and a series of droplets of a molten alloy to an electron beam atomizing assembly 812. The melting assembly 810 optionally may be held at a high negative potential, such as by optional power supply 822, so as to negatively "pre-charge" the molten material before it passes to the atomizing assembly 812, thereby reducing the amount of negative charge that the atomizing assembly 812 must convey to the molten material to atomize the material. This "pre-charging" feature also may be used with the other embodiments described herein to reduce the amount of negative charge that must be added to the molten material to atomize the material in the atomizing assembly.

The electron beam atomizing assembly 812 produces a spray of charged molten alloy particles 814. An electromagnetic field 816 is produced by a magnetic coil 818 (shown sectioned). The charged molten alloy particles 814 interact with the field 816 and are thereby directed toward a collector 820. The molten alloy particles 814 solidify and form solid alloy particles 815 while traveling from the atomizing assembly 812 to the collector 820. The directional control of the alloy particles 814/815 exerted by field 816 can reduce over-spray, thereby enhancing yield of the solid-spray-forming process, and also can enhance the density of the solid preform 822. The sold alloy particles 815 impact the collector 820 and the developing preform 822, deform upon impact, and metallurgically bond together to form the solid preform 822.

As shown in FIG. 8A, non-equilibrium plasma 842 optionally may be produced in the path of the alloy particles 814/815 between two heat sink electrodes 844, which are thermally connected to an outside thermal mass 846 by a dielectric liquid that is circulated through conduits 848 by pumps 850. The thermal communication maintained between the heat sink electrodes 844 and the outside thermal mass 846 allows heat to be removed from or added to the alloy particles 814/815. The non-equilibrium plasma 842 between the heat sink electrodes 844 may be produced, for example, by an AC glow discharge or a corona discharge.

The non-equilibrium plasma 842 may also extend from the heat sink electrodes 844 to the solid preform 822 and the collector 820, providing for heat removal from or heat addition to the preform 822 and the collector 820. Accordingly, in apparatus 800, heat may transferred from the molten alloy particles 814, solid alloy particles 815, the solid preform 822, and the collector 820 by the non-equilibrium plasma 842 to the heat sink electrodes 844, and then to the outside thermal mass 846. The removal of heat from the molten alloy particles 814 allows the particles to solidify and form the solid alloy particles 815.

FIG. 9 schematically illustrates various elements of a non-limiting embodiment of an apparatus 900 configured to perform a solid-spray-forming process. Melting assembly 910 provides at least one of a stream and a series of droplets of a molten alloy to an electron beam atomizing assembly 912. Atomizing assembly 912 produces charged molten alloy particles 914. Electromagnetic field 916 produced by a magnetic coil 918 (shown sectioned) interacts with the charged molten alloy particles 914 to spread out the particles 914 and reduce the probability of their collision, thereby inhibiting formation of larger molten particles and, consequently, larger solid alloy particles 942. A second electromagnetic field 940 produced by a magnetic coil 943 (shown sectioned) interacts with and directs the solidified particles 942 toward a collector 944. A solid preform 946 is formed on the collector 944 by impacting the solid alloy particles 942 onto the collector 944 and into the preform 946, wherein the solid alloy particles 942 deform upon impact and metallurgically bond together to form the solid preform 946.

As shown in FIG. 9A, a non-limiting embodiment of an apparatus 900 may be configured so that non-equilibrium plasma 922 is created in the path of the molten particles 914, between two heat sink electrodes 924 that thermally communicate with an outside thermal mass 926 by a dielectric fluid that circulates through conduit 928 by way of the pumps 930. The arrangement of the heat sink electrodes 924 thermally communicating with outside thermal mass 926 allows heat to be removed from the molten alloy particles 914 to solidify the molten alloy particles and form the solid alloy particles 942.

In various non-limiting embodiments, an apparatus or system configured to perform a solid-spray-forming process may include a chamber or the like that encloses or contains all or a portion of the melting assembly, atomizing assembly, field producing assembly, plasma producing assembly, collector, and/or workpiece (e.g., preform). If, for example, a heat transfer device employing non-equilibrium plasma is incorporated in an apparatus or system, all or a portion of the heat transfer device and its associated electrodes, as well as the non-equilibrium plasma, also may be encompassed within the chamber. Such a chamber can be provided to allow for regulating the atmosphere within the chamber, including the species and partial pressures of gases present and/or the overall gas pressure within the chamber.

For example, the chamber may be evacuated to provide a vacuum (as used herein, "vacuum" refers to a complete or partial vacuum) and/or may be completely or partially filled with an inert gas (e.g., argon and/or nitrogen) to limit oxidation of the materials being processed and/or to inhibit other undesired chemical reactions, such as nitridation. In a non-limiting embodiment of an apparatus incorporating a chamber, the pressure within the chamber may be maintained at less than atmospheric pressure, such as from 0.1 to 0.0001 torr, or any sub-range subsumed therein, such as, for example from 0.01 to 0.001 torr.

Molten alloy particles produced by impinging electrons on molten material, as described in this specification, generally are highly negatively charged. Various non-limiting embodiments described herein also include devices to pre-charge molten material with a negative charge, before impinging electrons on and atomizing the molten material. There may exist a tendency for the negatively charged particles/material to accelerate toward nearby structures held at ground potential. Such structures may include chamber walls and other apparatus components adjacent the molten material's path of travel downstream of the melting assembly. In various non-limiting embodiments, the atomizing assembly of the apparatus includes plates or other suitably-shaped structures held at negative potential and disposed so as to deflect negatively charged particles/material and inhibit undesirable acceleration of the particles/material toward the chamber walls and/or other structures held at ground potential.

Various non-limiting embodiments of an apparatus or system configured to perform a solid-spray-forming process may include a melting assembly substantially free from ceramic in regions that would contact, and therefore could contaminate, molten alloy produced by the melting assembly during operation of the apparatus. Each such apparatus may also include an electron beam atomizing assembly to atomize the molten material and produce molten alloy particles. Each such apparatus may also include a field producing assembly, which produces one or more electromagnetic and/or electrostatic fields between the atomizing assembly and a collector and influences at least one of the acceleration, speed, and direction of the particles as they traverse all or a portion of the distance between the atomizing assembly and the collector.

Various non-limiting embodiments of an apparatus or system configured to perform a solid-spray-forming process may include one or more non-equilibrium plasma producing assemblies that produce non-equilibrium plasma for transferring heat to or from the molten and/or solid alloy particles after they are produced by an atomizing assembly, but before the solid particles impact a collector/developing workpiece to form a solid preform. Alternatively, or in addition, non-limiting embodiments of an apparatus configured to perform a solid-spray-forming process may produce one or more non-equilibrium plasmas to transfer heat to or from solid alloy material after it impacts a collector and may be applied to a preform developing on or in the collector.

FIGS. 10-13 schematically illustrate various non-limiting embodiments of melting assemblies that may be included as a component of an apparatus or system configured to perform a solid-spray-forming process. Each such melting assembly embodiment may be used to produce at least one of a stream and a series of droplets of molten alloy from a consumable electrode or other alloy feedstock. Each such melting assembly embodiment below may be constructed so that it lacks ceramic in regions of the assembly that would be contacted by the molten alloy produced in the assembly.

Figure 10:
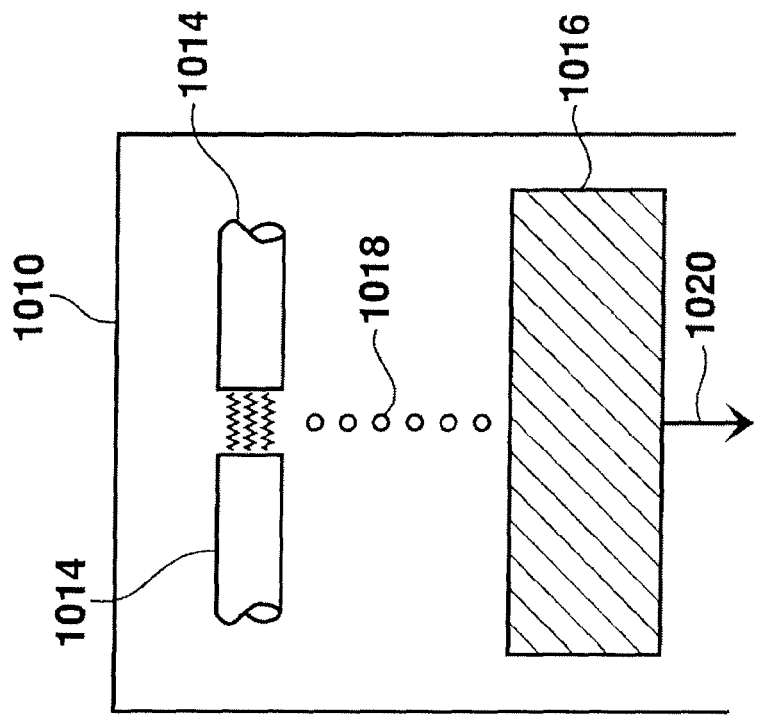

FIG. 10 illustrates the use of a vacuum double-electrode remelting device as a component of a melting assembly producing molten alloy that is fed to an electron beam atomizing assembly. The vacuum double-electrode remelting, or "VADER," technique is described, for example, in U.S. Pat. No. 4,261,412, which is hereby incorporated by reference into this specification. In a VADER apparatus, molten material is produced by striking an arc in a vacuum between two consumable electrodes, which melt. An advantage of the VADER technique over conventional vacuum arc remelting (VAR) is that the VADER technique allows for tighter control of temperature and melting rate.

With reference to FIG. 10, vacuum chamber wall 1010 surrounds the opposed consumable electrodes 1014 and an atomizing assembly 1016. Electric current passes between and through the opposed electrodes 1014, melting the electrodes to produce droplets 1018 (or, alternatively, a stream) of molten alloy. The molten alloy droplets 1018 fall from the electrodes 1014 to the atomizing assembly 1016. Alternatively, a melt pool in fluid communication with a cold induction guide or like dispensing device (not shown) may be positioned between the electrodes 1014 and the atomizing assembly 1016. The atomized molten alloy particles produced by the atomizing assembly 1016 pass through and are influenced by one or more electromagnetic and/or electrostatic fields produced by a field producing assembly (not shown), solidify, impact onto a collector or a developing workpiece (not shown), metallurgically bond together, and form a solid preform.

Figure 11:
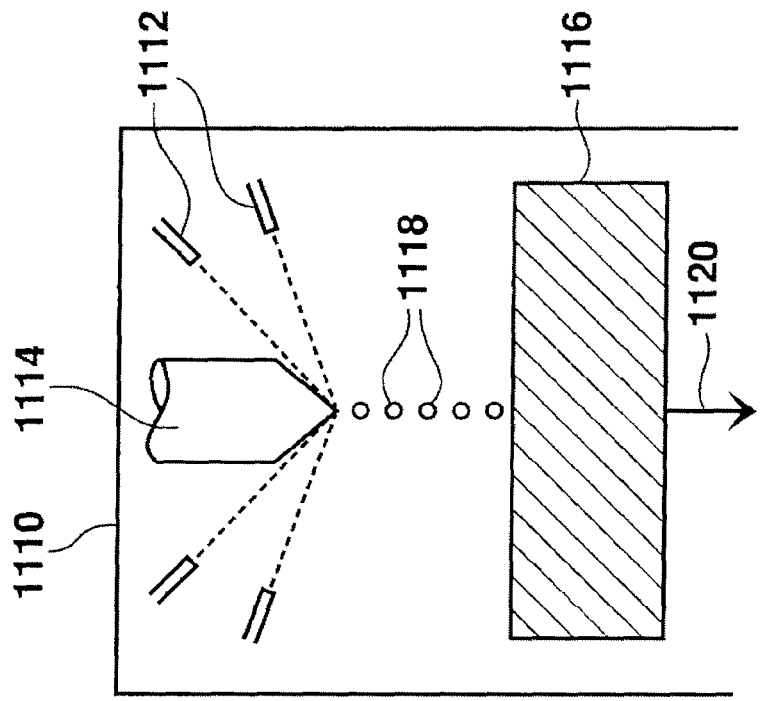
FIGS. 10-13 are schematic diagrams of melting assemblies that produce molten alloy.

FIG. 11 illustrates use of an electron beam melting device as a component of a melting assembly producing molten alloy that is fed to an electron beam atomizing assembly. In electron beam melting, a feedstock is melted by impinging high-energy electrons on the feedstock. Contamination of the molten product may be reduced or eliminated by melting in a controlled vacuum. The energy efficiency of electron beam melting can exceed that of competing processes because of the available control of the electron beam spot dwell time and distribution to the areas to be melted. Also, power losses of the electron beam inside the gun and between the gun nozzle and the target material are relatively small.

As discussed above, the melting devices described herein, including the melting device shown in FIG. 11, for example, may be configured to be maintained at a high negative potential and thereby impart a negative charge to the molten material before it passes downstream to the atomizing assembly of the apparatus. As an example, the melting device shown in FIG. 11 may be configured to include a melt chamber that is electrically conductive and maintained at a high negative potential, and which the molten material contacts before passing to the atomizing assembly.

Referring to FIG. 11, vacuum chamber 1110 surrounds the melting device's electron beam sources 1112, the consumable electrode 1114 that is being melted, an electron beam atomizing assembly 1116, and a collector (not shown). The electron beams impact the electrode 1114, heating and melting the electrode to produce droplets 1118 (or, alternatively, a stream) of molten alloy. The droplets 1118 fall from the electrode 1114 to the atomizing assembly 1116. The atomized molten alloy particles produced by the atomizing assembly 1116 pass through and are influenced by one or more electromagnetic and/or electrostatic fields produced by a field producing assembly (not shown), solidify, impact onto a collector or a developing workpiece (not shown), metallurgically bond together, and form a solid preform.

Figure 12:
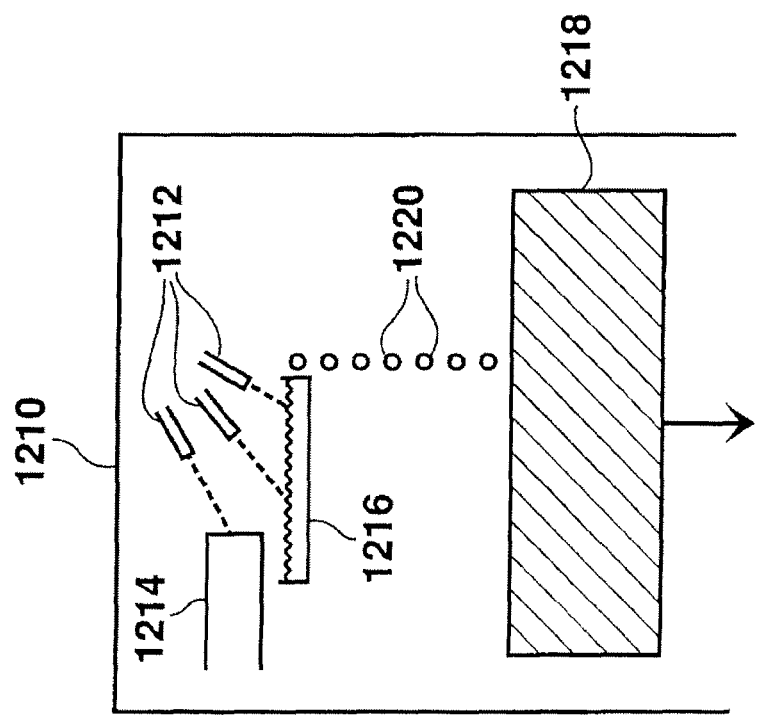

FIG. 12 illustrates use of an electron beam cold hearth melting device as a component of a melting assembly producing molten alloy that is fed to an electron beam atomizing assembly. In a typical electron beam cold hearth melting technique, a first electron beam gun melts the charge, which can have a variety of forms (e.g., ingot, sponge, or scrap). The molten material flows into a shallow water-cooled crucible (the cold hearth), where one or more electron guns maintain the temperature of the molten material. A major function of the cold hearth is to separate inclusions lighter or heavier than the liquid material, while at the same time increasing the residence time of lower density particles that have a high melting point in order to ensure their complete dissolution. All of the operations may be conducted in a vacuum environment to ensure proper operation of the electron guns and to avoid alloy contamination by the ambient environment. An advantage of the electron beam cold hearth melting technique is that it may effectively eliminate volatile elements, such as chloride and hydrogen (due in part to the optional vacuum), and inclusions in the melt. The technique is also flexible with respect to the form of the feed materials.

Referring to FIG. 12, vacuum chamber 1210 surrounds the electron beam sources 1212 and a water-cooled copper cold hearth 1216 of the melting assembly, the consumable electrode 1214 that is being melted, an electron beam atomizing assembly 1218, and a collector (not shown). Molten material 1220, in the form of a stream and/or a series of droplets, falls from the water-cooled copper cold hearth 1216 to the atomizing assembly 1218. The atomized molten alloy particles produced by the atomizing assembly 1218 pass through and are influenced by one or more electromagnetic and/or electrostatic fields produced by a field producing assembly (not shown), solidify, impact onto a collector or a developing workpiece (not shown), metallurgically bond together, and form a solid preform.

Figure 13:
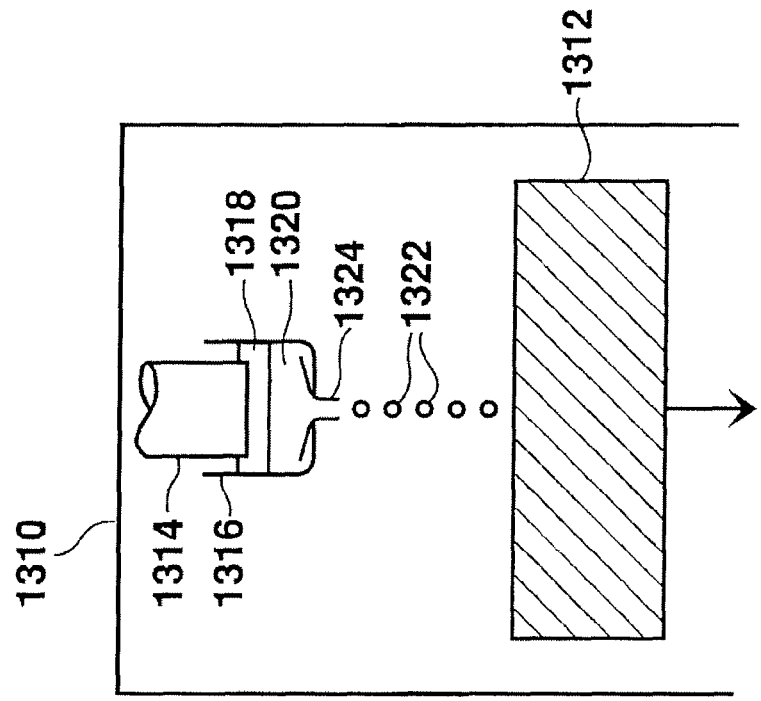

FIG. 13 illustrates use of a melting assembly comprising a combination of an electroslag refining/remelting (ESR) device and a cold induction guide (CIG) to produce molten alloy that is fed to an electron beam atomizing assembly. Alternatively, a melting device combining vacuum arc remelting (VAR) and a CIG may be used in place of an ESR/CIG combination. Devices combining ESR or VAR devices and a CIG are described, for example, in U.S. Pat. No. 5,325,906, which is hereby incorporated by reference into this specification.

In a typical ESR technique, electric current is passed through a consumable electrode and an electrically conductive slag disposed within a refining vessel and in contact with the electrode. Droplets melted from the electrode pass through and are refined by the conductive slag, and may then be passed to a downstream apparatus. The basic components of an ESR apparatus include a power supply, an electrode feed mechanism, a water cooled copper refining vessel, and the slag. The specific slag type used will depend on the particular material being refined. The VAR process involves the melting of a consumable electrode composed of the alloy by striking an arc with the electrode in a vacuum. In addition to reducing dissolved nitrogen and hydrogen, the VAR process removes many oxide inclusions in the arc-plasma.

In the ESR/CIG and VAR/CIG combinations, the CIG, which is also variously referred to a "cold finger" or "cold wall induction guide," can maintain the molten material in molten form as the material passes from the VAR or ESR apparatus downstream to the atomizing assembly. The CIG also protects the molten material from contact with the atmosphere. The CIG may be directly coupled upstream to the ESR or VAR apparatus and downstream to the atomizing assembly to protect the refined molten material from the atmosphere, preventing oxides from forming in and contaminating the melt. A CIG also may be used to control the flow of molten material from an ESR or VAR apparatus to a downstream atomizing assembly.

The construction and manner of operation of CIG devices is described, for example, in U.S. Pat. Nos. 5,272,718; 5,310,165; 5,348,566; and 5,769,151, which are hereby incorporated by reference into this specification. A CIG generally includes a melt container for receiving molten material. The melt container includes a bottom wall containing an aperture. A transfer region of the CIG is configured to include a passage (which may be, for example, generally funnel-shaped) constructed to receive molten material from the aperture in the melt container. In one conventional design of a CIG, the wall of the funnel-shaped passage is defined by a number of fluid-cooled metallic segments, and the fluid-cooled segments define an inner contour of the passage that may generally decrease in cross-sectional area from an inlet end to an outlet end of the region. One or more electrically conductive coils are associated with the wall of the funnel-shaped passage, and a source of electrical current is in selective electrical connection with the conductive coils. During the time that the molten material is flowing from the melt container of the CIG through the passage of the CIG, electrical current is passed through the conductive coils at an intensity sufficient to inductively heat the molten material and maintain it in molten form.

A portion of the molten material contacts the cooled wall of the funnel-shaped passage of the CIG and may solidify to form a skull that insulates the remainder of the molten material flowing through the CIG from contacting the wall. The cooling of the wall and the formation of the skull assures that the molten material passing through the CIG is not contaminated by the metals or other constituents from which the inner walls of the CIG are formed. As disclosed, for example, in U.S. Pat. No. 5,649,992, the thickness of the skull at a region of the funnel-shaped portion of the CIG may be controlled by appropriately adjusting the temperature of the coolant, the flow rate of the coolant, and/or the intensity of the current in the induction coils to control or entirely shut off the flow of the melt though the CIG; as the thickness of the skull increases, the flow through the transfer region is correspondingly reduced. Although a CIG apparatus may be provided in various forms, each typically includes: (1) a passage utilizing gravity to guide a melt; (2) cooling means in at least a region of the wall to promote skull formation on the wall; and (3) electrically conductive coils associated with at least a portion of the passage, for inductively heating molten material within the passage.

Referring to FIG. 13, vacuum chamber 1310 surrounds an ESR/CIG melting assembly, an electron beam atomizing assembly 1312, and a collector (not shown). The ESR/CIG melt source includes a consumable electrode 1314 of the desired alloy and a water-cooled copper crucible 1316. A heated molten slag 1318 acts to melt the electrode 1314 to form a molten alloy pool 1320. The molten alloy from the molten pool 1320 flows through the CIG nozzle 1324, in the form of a molten stream and/or a series of droplets 1322, and passes to the atomizing assembly 1312. The atomized molten alloy particles produced by the atomizing assembly 1312 pass through and are influenced by one or more electromagnetic and/or electrostatic fields produced by a field producing assembly (not shown), solidify, impact onto a collector or a developing workpiece (not shown), metallurgically bond together, and form a solid preform.

Alternative techniques for melting feedstock in a melting assembly of an apparatus or system configured to perform a solid-spray-forming process include, but are not limited to, induction melting, plasma arc melting, and the like. For example, in induction melting, a coiled primary electrical conductor may surround a bar of metallic feed material. By passing electrical current through the primary conductor a secondary electric current is induced within the bar through electromagnetic induction. The secondary current heats the bar to a temperature greater than its melting temperature.

FIGS. 14-17 illustrate various non-limiting embodiments of systems and apparatus configured to perform a solid-spray-forming process.

Figure 14:
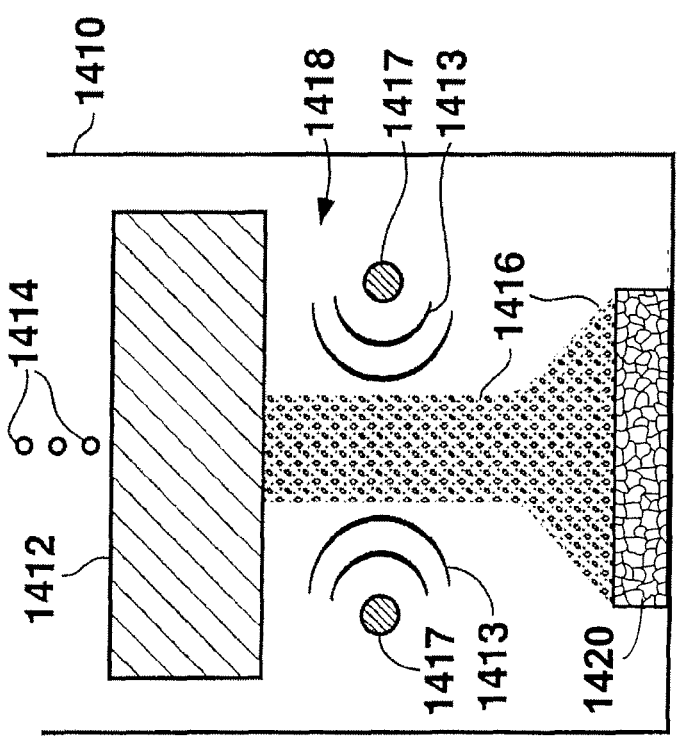

FIG. 14 schematically illustrates atomized and solidified alloy particles being impacted and metallurgically bonded onto a developing workpiece to form a solid preform. A vacuum chamber 1410 encloses an electron beam atomizing assembly 1412. A series of droplets of molten alloy 1414 produced by a melting assembly (not shown), which may be, for example, one of the various melting assemblies discussed above, passes into the atomizing assembly 1412. The atomizing assembly 1412 produces atomized alloy particles 1416, which pass through, interact with, and are influenced by the electromagnetic and/or electrostatic field(s) 1413 produced by electromagnetic coil 1417 (shown sectioned) of a field producing assembly. The coil 1417 is positioned to produce the field(s) in the region 1418 downstream of the atomizing assembly 1412. The atomized alloy particles 1416 solidify while traveling from the atomizing assembly 1412, impact, and metallurgically bond to the developing workpiece to form a solid preform.

Figure 15:
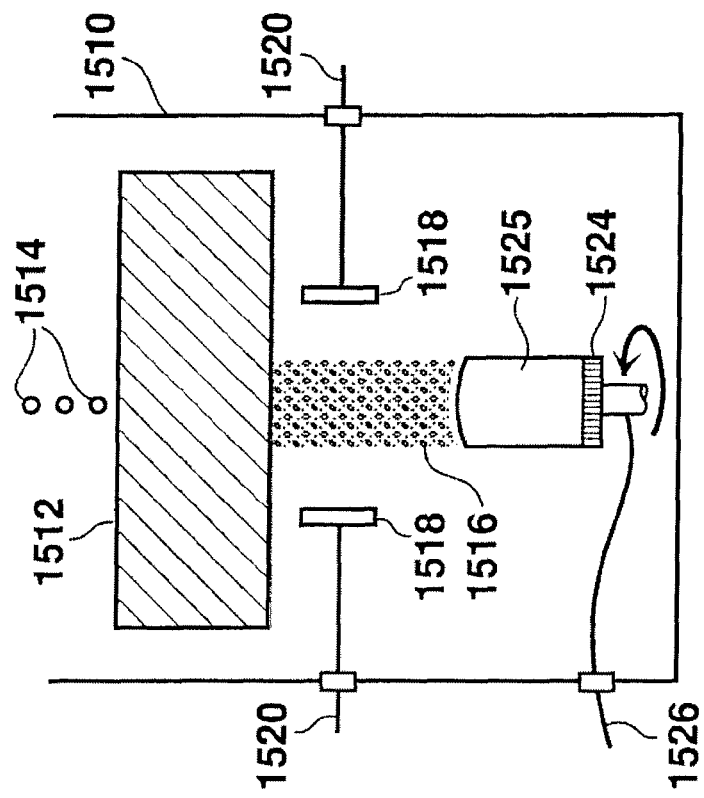
FIGS. 14-17 and 17A are schematic diagrams of systems and apparatus configured to form an alloy preform by a solid-spray-forming process.

FIG. 15 schematically illustrates the production of a solid-spray-formed ingot from an atomized molten and solidified alloy produced by electron beam atomization. Vacuum chamber 1510 encloses a melting assembly (not shown) and an electron beam atomizing assembly 1512. The melting assembly may be, for example, one of the various melting assemblies discussed above. Droplets of molten alloy 1514 produced by the melting assembly (not shown) pass into the atomizing assembly 1512. The droplets of molten alloy 1514 are atomized within the atomizing assembly 1512 to form a spray of atomized alloy particles 1516.

The atomized alloy particles 1516 pass through, interact with, and are influenced by one or more electromagnetic and/or electrostatic fields (not indicated) produced by plates 1518 of a field producing assembly. The plates 1518 are connected to a power source (not shown) by wires 1520 passing through the walls of the chamber 1510. The atomized alloy particles 1516 solidify and are impacted onto a rotating collector plate 1524 under influence of the field(s) produced by the field producing assembly to form a solid preform 1525. The rotating collector plate 1524 can be withdrawn downwardly at a rate that maintains the deposition interface at a substantially constant distance from the atomizing assembly. To enhance yield and improve deposition density, the collector plate 1524 may be charged to a high positive potential by connecting the plate 1524 to a power supply (not shown) by wires 1526 passing through the wall of the chamber 1510.

Figure 16:
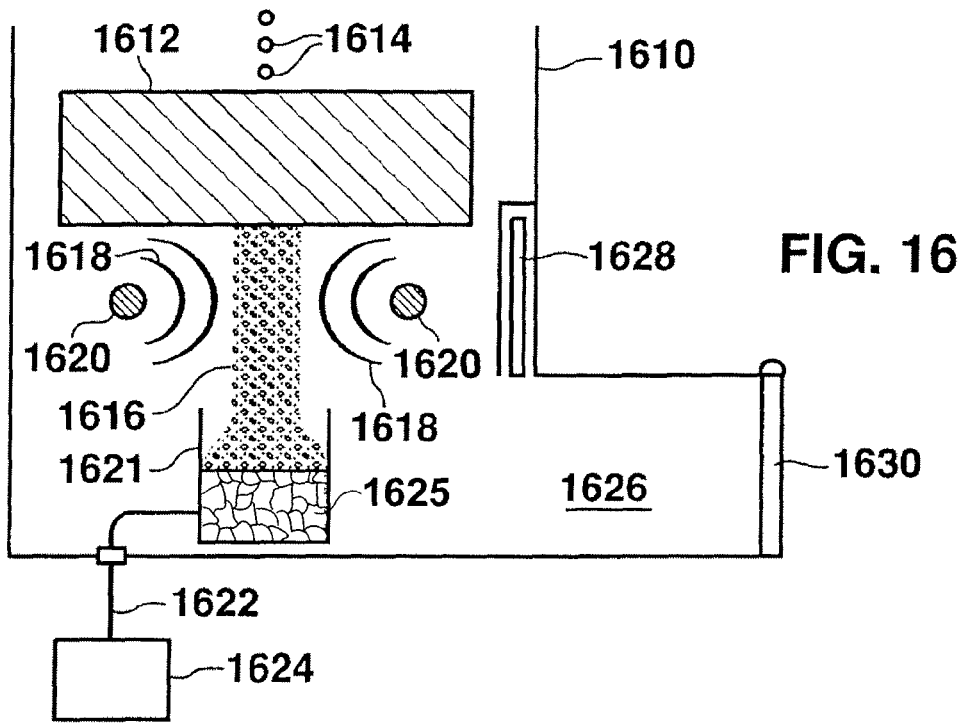

FIG. 16 schematically illustrates an embodiment of an apparatus or system configured to perform a solid-spray-forming process wherein atomized molten alloy particles are solidified and impact a collector/workpiece in a first chamber of the apparatus. Vacuum chamber 1610 encloses a melting assembly (not shown) and an electron beam atomizing assembly 1612. The melting assembly may be, for example, one of the various melting assemblies discussed above. A series of droplets of molten alloy 1614 produced by the melting assembly (not shown) pass into the atomizing assembly 1612. The droplets of molten alloy 1614 are atomized within the atomizing assembly 1612 to form alloy particles 1616. The alloy particles 1616 pass through, interact with, and are influenced by one or more electromagnetic and/or electrostatic fields 1618 produced by electromagnetic coil 1620 (shown sectioned) of a field producing assembly. The atomized particles 1616 solidify and are directed into a collector in the form of a container 1621 under influence of the field 1618.

The solid alloy particles impact a workpiece 1625 forming in the container 1621, deform, and metallurgically bond to the workpiece 1625 to form a solid preform. When the solid preform is formed, it may transferred into a chamber 1626, which may be sealed by vacuum lock 1628. The container 1621 and preform may be released to the atmosphere via a second vacuum lock 1630 for thermomechanical processing according to known techniques. Optionally, the apparatus of FIG. 16 may include a heat transfer device, such as is generally described above, configured to remove heat from the atomized molten alloy particles to form solid alloy particles. Also, optionally, the container 1621 may be electrically connected to a power supply 1624 by wire 1622 and is held at a positive potential while the negatively charged solid particles 1616 are impacting in the container 1621. The wire 1622 may be remotely disconnected from the container 1621 before the container is moved into chamber 1626.

Figure 17:
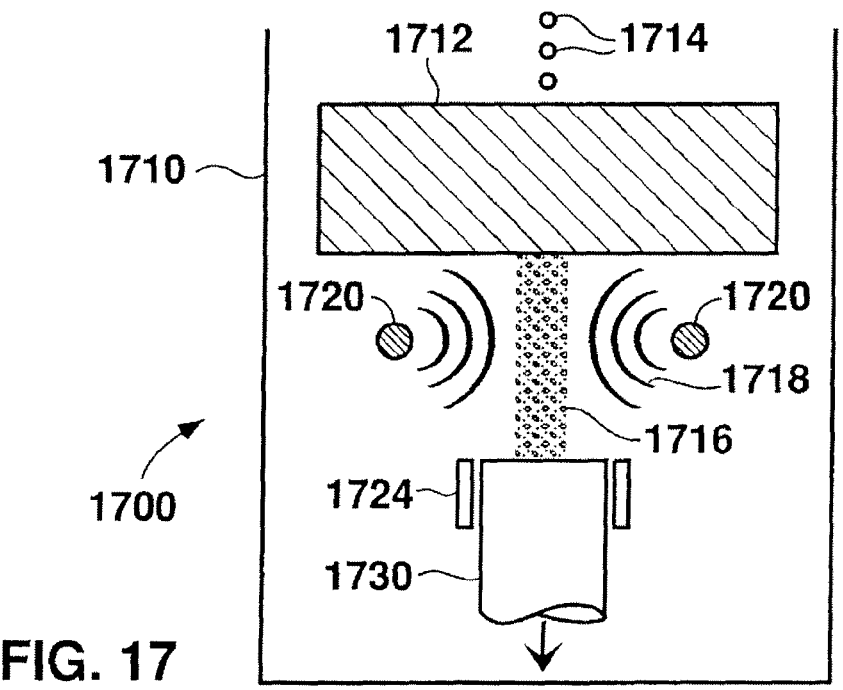

FIG. 17 schematically illustrates a non-limiting embodiment of an apparatus or system 1700 configured to perform a solid-spray-forming process. In FIG. 17 a solid-spray-formed article is produced in a mold by spraying solid alloy particles produced by solidifying molten alloy particles provided by electron beam atomization. Vacuum chamber 1710 encloses elements including a melting assembly (not shown) and an electron beam atomizing assembly 1712. The melting assembly may be, for example, one of the various melting assemblies discussed above. A series of droplets of molten alloy 1714 produced by the melting assembly pass into the atomizing assembly 1712. The droplets of molten alloy 1714 are atomized within the atomizing assembly 1712 to form a spray of atomized alloy particles 1716. The atomized alloy particles 1716 pass through, interact with, and are influenced by the one or more electromagnetic and/or electrostatic fields 1718 produced by the electrically energized coil 1720 (shown sectioned) of a field producing assembly. The atomized material 1716 solidifies and is directed into mold 1724 under influence of the field 1718 produced by the field producing assembly, and the resulting solid-spray-formed article 1730 is withdrawn from the mold 1724 by downward movement of the mold base (not shown). Optionally, the mold base may be configured to rotate or otherwise translate.

Figure 17A:
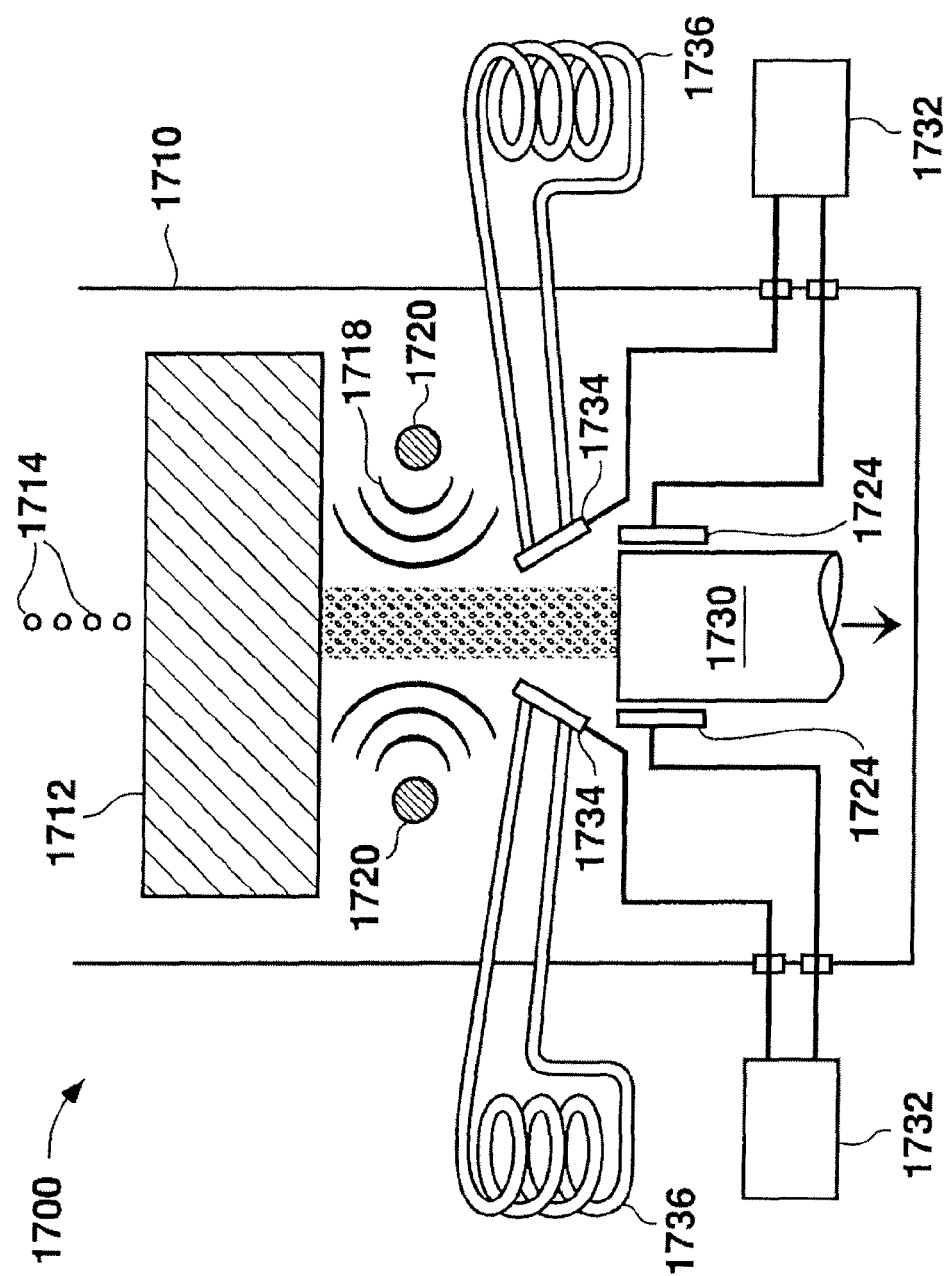

In an alternative non-limiting embodiment of apparatus 1700 shown in FIG. 17A, power supplies 1732 are provided and create a potential difference so as to form a non-equilibrium plasma between the electrodes 1734. Heat is conducted by the plasma from the solidifying alloy particles and/or the surface of the solid article 1730 to the electrodes 1734, which are cooled with a dielectric liquid that circulates through heat exchangers 1736 and the electrodes 1734.

Figure 18:
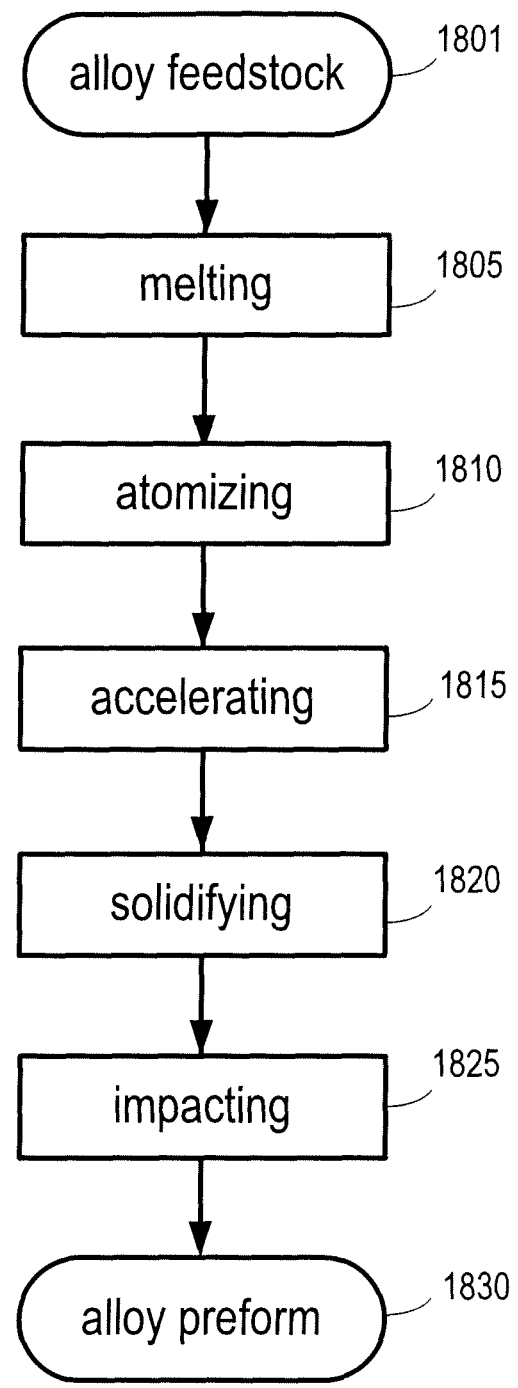
FIG. 18 is a flow diagram of a solid-spray-forming process.

FIG. 18 illustrates a non-limiting embodiment of a solid-spray-forming process that may be performed using the systems and apparatus described herein. An alloy feedstock 1801 is melted in a melting step 1805 to produce at least one of a stream of molten alloy and a series of droplets of molten alloy. The melting step 1805 may include multiple successive melting, refining, and re-melting sub-steps. For example, the alloy feedstock may comprise scrap, sponge, recycled, and/or virgin sources of base metal and alloying elements, as applicable, which are melted down to form an initial melt. The initial melt may be produced using VAR, plasma arc melting, electron beam melting, or any other suitable melting technique.

The initial melt chemistry may be analyzed and modified as necessary to achieve a predetermined chemistry. Once acceptable melt chemistry is achieved, the melt may be cast into a consumable electrode for further refining and/or remelting operations or used to produce at least one of a stream of molten alloy and a series of droplets of molten alloy. In various embodiments, the alloy feedstock may comprise a consumable electrode or other consumable article of acceptable alloy chemistry that is melted to produce at least one of a stream of molten alloy and a series of droplets of molten alloy.

As noted above, as used herein, the term "alloy" refers both to pure metals and to alloys and includes, for example, iron, cobalt, nickel, aluminum, titanium, niobium, zirconium, and alloys based on any of these metals, such as stainless steels, nickel-base superalloys, cobalt-base superalloys, titanium aluminides, nickel-titanium alloys, and the like. Non-limiting examples of nickel-base superalloys that may be processed according to embodiments described herein include, but are not limited to, IN 100 alloy (UNS 13100), Rene 88™ alloy, Alloy 720, Alloy 718 (UNS N07718), and 718Plus™ alloy (UNS N07818) (available from ATI Allvac, Monroe, N.C., USA). Non-limiting examples of titanium alloys that may be processed according to embodiments described herein include, but are not limited to, Ti-6Al-4V alloy, T-17 alloy, Ti-5-5-5-3 alloy, Ti—Ni alloys, and Ti—Al alloys.

At least one of a stream of molten alloy and a series of droplets of molten alloy is atomized in step 1810 using electron beam atomization. During step 1810, electrons produced from an electron source, such as, for example, a thermo-ionic electron beam emitter and/or a wire-discharge ion plasma electron emitter, are impinged on the least one of a stream of molten alloy and a series of droplets of molten alloy. The impinging electrons rapidly electrostatically charge the stream of molten alloy and/or the series of droplets of molten alloy until the electrostatic repulsion forces exceed the surface tension of the molten alloy and physically break the stream and/or droplets into smaller molten alloy particles, thereby atomizing the molten alloy. The impinging electrons also produce electrically-charged atomized particles of molten alloy. The size and charge of the atomized molten alloy particles may be controlled, for example, by controlling the size, shape, and density of the field of electrons that impinge on the molten alloy.

The atomized and electrically-charged particles of molten alloy are accelerated in step 1815 through interaction with at least one of an electrostatic field and an electromagnetic field. In various embodiments, an electrostatic field established between an atomizing assembly and a collector interacts with the atomized and electrically-charged and alloy particles to accelerate the particles away from the atomizing assembly and toward a collector. The magnitude of the acceleration may be controlled, for example, by controlling the magnitude of a voltage difference between an atomizing assembly and a collector, which directly affects the electrostatic field intensity.

The accelerating molten alloy particles are solidified in step 1820 by cooling the molten alloy particles to a temperature no greater than the solidus temperature of the alloy. As used herein, the term "solidus temperature" refers to the maximum temperature of an alloy at which the alloy is in a completely solid state. In contrast, the "liquidus temperature" of an alloy is the maximum temperature at which solid crystals of the alloy coexist in thermodynamic equilibrium with liquid alloy. At temperatures above the liquidus temperature, an alloy is completely liquid, and at temperatures equal to or below the solidus temperature, an alloy is completely solid. At temperatures greater than the solid temperature and up to and including the liquidus temperature, an alloy exists in a two-phase state.

The cooling of the accelerating alloy particles to a temperature no greater than the solidus temperature of the alloy ensures that the alloy changes from the molten state to the solid state before coming into contact with a collector. For example, Alloy 718, a nickel-base superalloy, has a liquidus temperature of approximately 1358° C., and a solidus temperature of approximately 1214° C. See Wei-Di Cao, "Solidification and solid state phase transformation of Allvac® 718Plus™ alloy," *Journal of the Minerals, Metals & Materials Society*, 2005, which is incorporated by reference into this specification. Therefore, in non-limiting embodiments wherein Alloy 718 is solid-spray-formed, the accelerating molten Alloy 718 particles may be cooled to a temperature no greater than 1214° C. to solidify the particles before coming into contact with a collector.

In various embodiments, accelerating molten alloy particles are cooled to a temperature no greater than the solidus temperature ($T_S$) of the alloy and greater than 0.50 times the solidus temperature ($0.50*T_S$). Cooling molten alloy particles to a temperature in the range of $0.50*T_S$ to $T_S$ may ensure that the particles are substantially solidified but sufficiently soft to deform upon impact with a substrate and metallurgically bond in the solid state (i.e., solid state weld) to form a unitary and monolithic solid preform. For example, the ultimate strength, 2% yield strength, and hardness of Alloy 718 decreases (i.e., the alloy softens) at a higher rate at temperatures above approximately 600° C., which is approximately 0.50 times the solidus temperature of the alloy.

In various embodiments, accelerating molten alloy particles are cooled to a temperature in the range of $0.50*T_S$ to $T_S$, or any sub-range subsumed therein, such as, for example, $0.50*T_S$ to $0.99*T_S$, $0.50*T_S$ to $0.95*T_S$, $0.60*T_S$ to $0.95*T_S$, $0.70*T_S$ to $0.95*T_S$, $0.80*T_S$ to $0.95*T_S$, or $0.90*T_S$ to $0.99*T_S$.

In various embodiments, the distance between an atomizing assembly and a collector, through which molten alloy particles are accelerated, is predetermined so that the molten alloy particles lose sufficient heat energy through conduction, convention, and/or radiation to solidify the particles before contacting a collector. In various embodiments, a non-equilibrium plasma is produced in the pathway of accelerating molten alloy particles to actively transfer heat energy from the molten particles to solidify the particles before contacting a collector.

In various embodiments, accelerating molten alloy particles travel through a thermal control zone in an apparatus or system configured to perform a solid-spray-forming process. A thermal control zone may comprise heat transfer devices to actively remove heat from alloy particles or to increase the rate of heat loss by way of conduction, convention, and/or radiation to the surrounding environment in the thermal control zone. For example, a thermal control zone may comprise devices such as cooling coils to maintain a sub-ambient temperature in the thermal control zone, which establishes a greater temperature differential between the molten alloy particles and the surrounding environment. A greater temperature differential may correlate with a higher rate of heat loss from the molten alloy particles, which allows for more effective and/or efficient solidification before contacting a collector.

The solid alloy particles are impacted onto a substrate at step 1825 to solid-spray-form an alloy preform 1830. In various embodiments, the substrate may comprise a collector such as, for example, a platen, a cylinder, a mandrel, a container, a chamber, a mold, or other surface. In various embodiments, the substrate may comprise a developing workpiece or preform that was formed from solid alloy particles that impacted onto an initial collector surface. In this manner, the impacting solid alloy particles further develop the workpiece and form the preform.

In various embodiments, solid alloy particles impact a substrate after being cooled to a temperature no greater than the solidus temperature of the alloy, such as, for example, a temperature in the range of $0.50*T_S$ to $T_S$, or any sub-range subsumed therein. Impacting solid alloy particles having a temperature no greater than the solidus temperature of the alloy, for example, a temperature in the range of $0.50*T_S$ to $T_S$, may ensure that the particles are substantially solidified but sufficiently soft to deform upon impact with the substrate and metallurgically bond in the solid state (i.e., solid state weld) to form a unitary and monolithic solid preform.

In various embodiments, the initial collector may comprise a solid article formed from the same or a similar alloy as the alloy forming the atomized and solidified particles. This may ensure that the impacting solid alloy particles are metallurgically compatible with the initial collector so that the solid alloy particles metallurgically bond (i.e., solid state weld) to the substrate, and to each other, to form a unitary and monolithic preform. In various embodiments, the material forming the initial collector may be removed from a solid-spray-formed alloy preform by cutting, grinding, or the like.

Figure 19A:
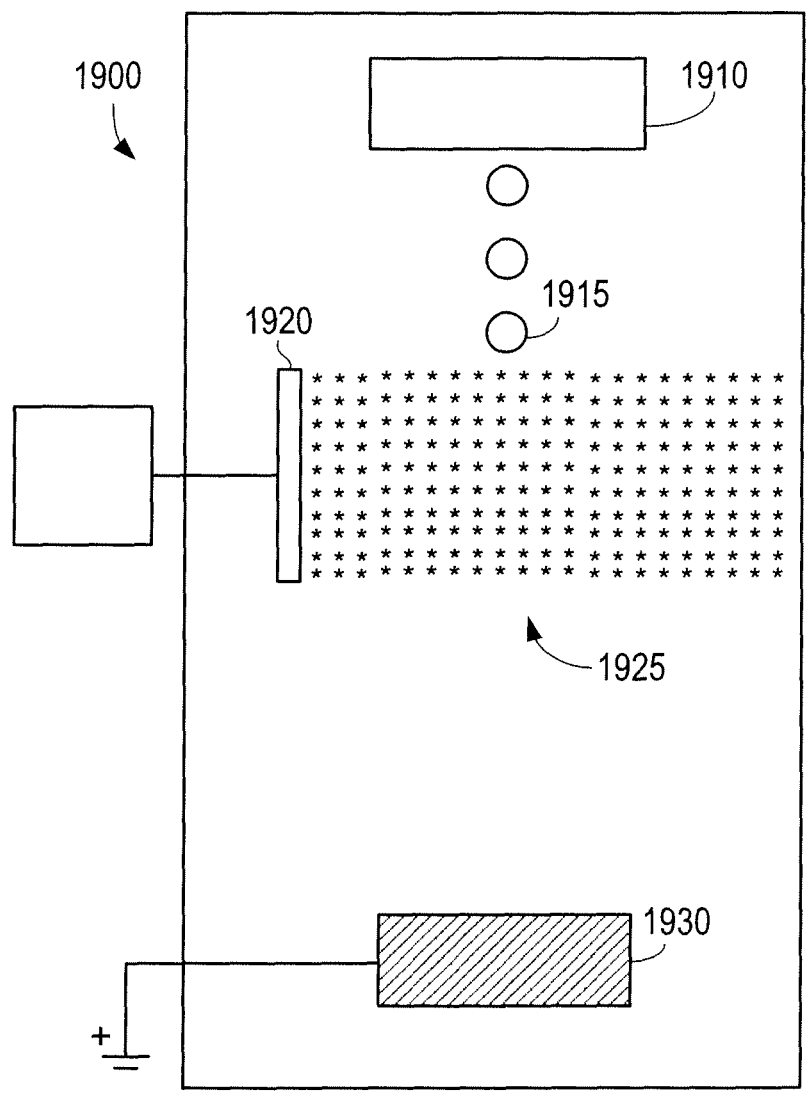
FIGS. 19A-19F are schematic diagrams that collectively show a solid-spray-forming system implementing a solid-spray-forming process.

FIGS. 19A-19F collectively illustrate a non-limiting embodiment of a solid-spray-forming process and system 1900. Referring to FIG. 19A, an alloy melting apparatus 1910 produces a series of droplets 1915 of molten alloy, however, it is understood that the alloy melting apparatus 1910 may produce a stream of molten alloy and/or a series of droplets of molten alloy. An atomizing apparatus 1920 produces a field of electrons 1925 that intersects the pathway of the molten alloy droplets 1915 traveling through the solid-spray-forming system 1900 from the melting apparatus 1910 toward a substrate 1930.

Figure 19B:
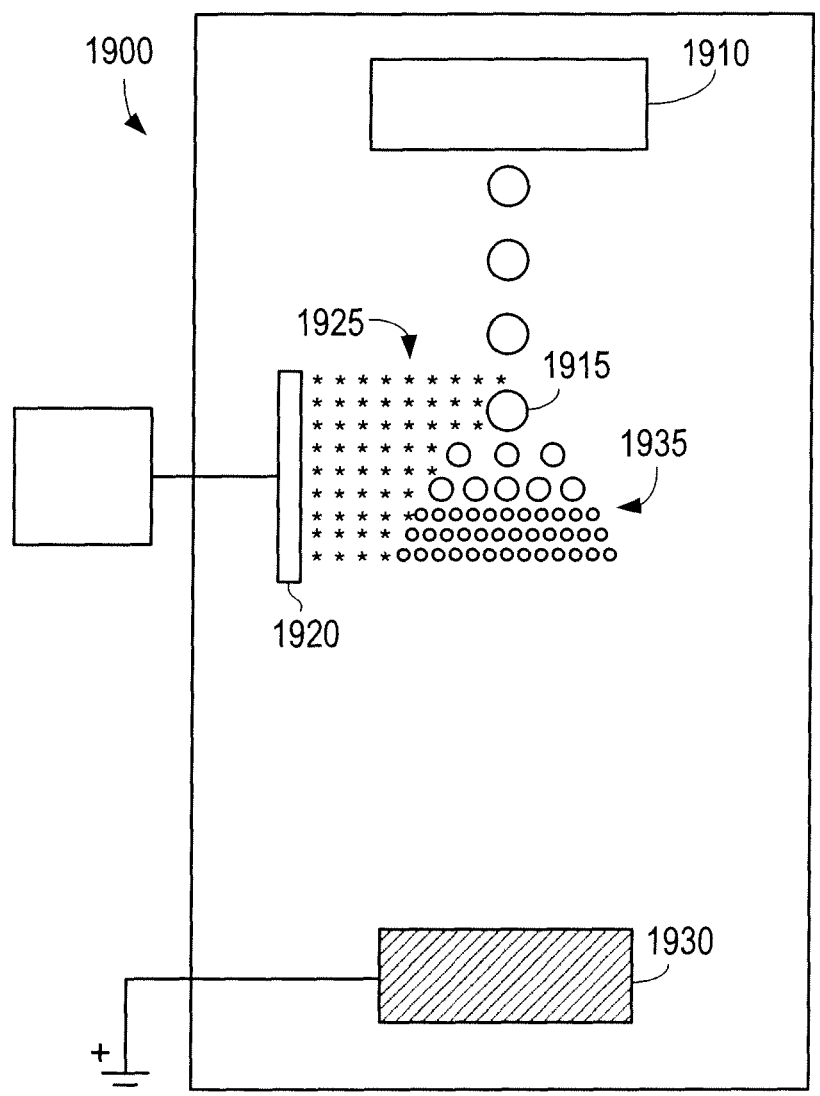

Referring to FIG. 19B, the electrons comprising the field of electrons 1925 impinge on the molten alloy droplets 1915 and rapidly electrostatically charge the droplets 1915 beyond the Rayleigh limit and the droplets atomize into smaller molten alloy particles 1935. The atomized molten alloy particles 1935 have a net negative electrical charged due to the impinging electrons. The atomized molten alloy particles 1935 may be formed by a cascading effect in which the molten alloy droplets 1915 break up into smaller particles, the smaller particles are recharged to negative potential by impinging electrons and break up into yet smaller particles, and the process repeats during the time in which electrons are added to the successively smaller atomized particles. Alternatively, or in addition, the atomized molten alloy particles 1935 may be sequentially stripped from the surface of the molten alloy droplets 1915. Regardless of the physical atomization mechanism, molten alloy droplet 1915 is exposed to the impinging electron field 1925 for a sufficient time so that sufficient negative charge accumulates in and disrupts the alloy into atomized molten alloy particles 1935.

Figure 19C:
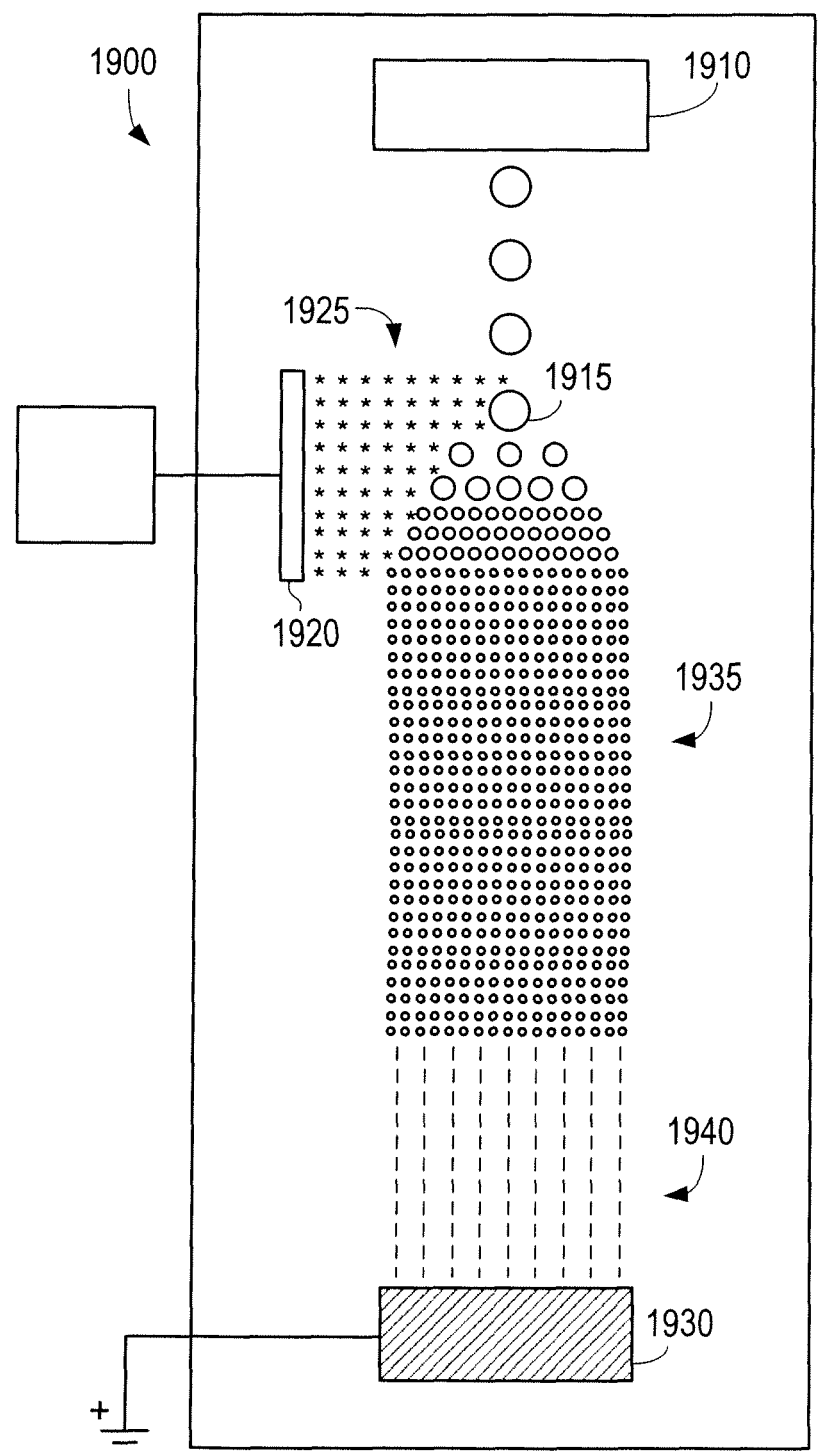

Referring to FIG. 19C, the atomized and electrically-charged molten alloy particles 1935 are accelerated with at least one of an electrostatic field and an electromagnetic field 1940. The field 1940 is configured to control the acceleration, speed, and/or direction of the atomized and electrically-charged molten alloy particles 1935 so that the particles travel through the solid-spray-forming system 1900 from the atomizing apparatus 1920 toward the substrate 1930 in a controlled manner.

Figure 19D:
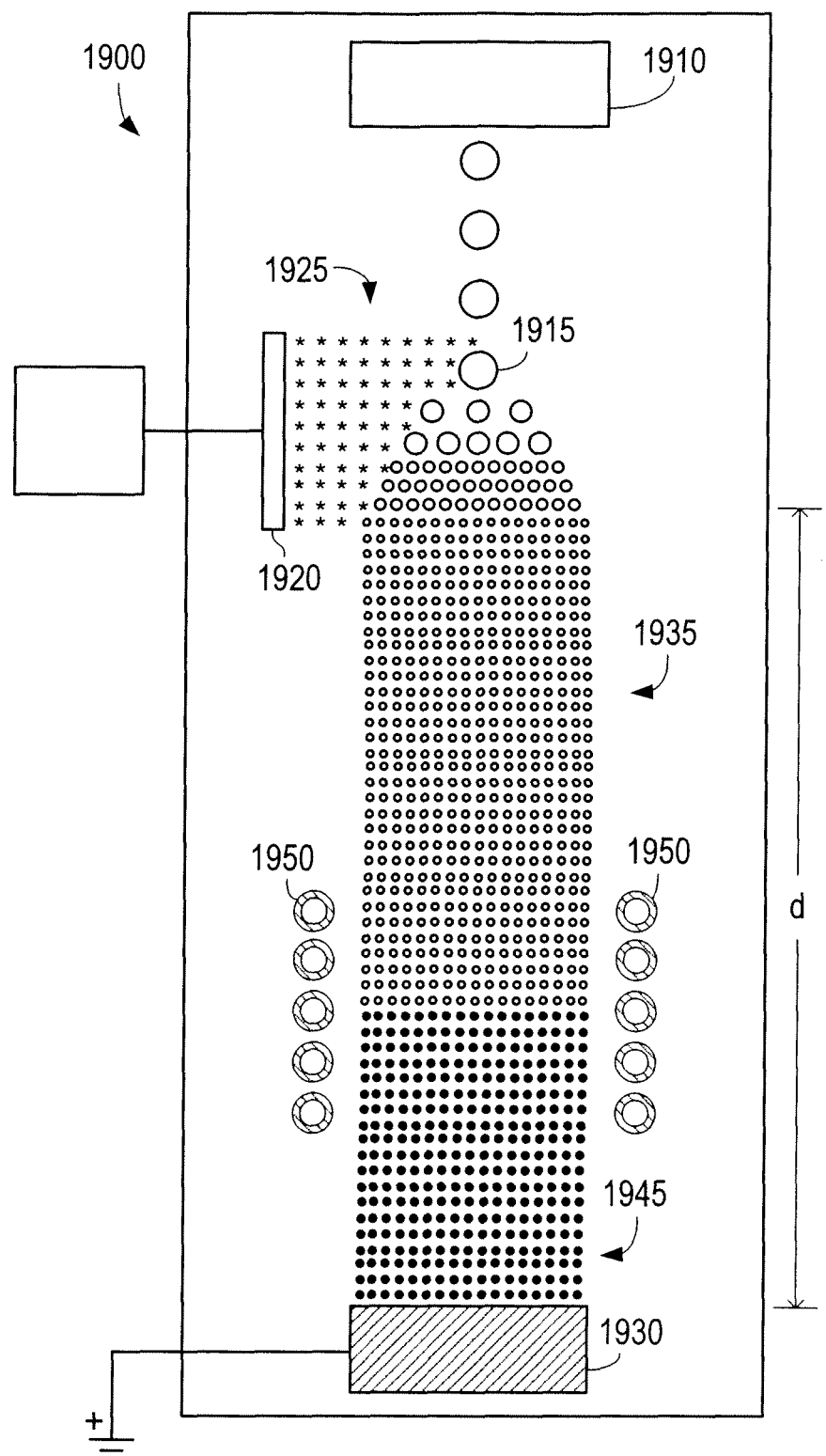

Referring to FIG. 19D, the atomized and electrically-charged molten alloy particles 1935 are cooled to a temperature no greater than the solidus temperature of the alloy so that the molten alloy particles 1935 solidify while accelerating and form solid alloy particles 1945. The alloy particles 1935/1945 are cooled and solidified before contacting substrate 1930. FIG. 19D shows a thermal control zone comprising a cooling coil 1950. A coolant fluid flows through the cooling coil to maintain a lower temperature in the thermal control zone, which establishes a greater temperature differential between the molten alloy particles 1935 and the surrounding environment. A greater temperature differential may correlate with a higher rate of heat loss from the molten alloy particles 1935, which allows for more effective and/or efficient solidification into solid alloy particles 1945 before contacting the substrate 1930.

It is understood, however, that different cooling means may be utilized in a thermal control zone in the solid-spray-forming system 1900. For example, a non-equilibrium plasma producing assembly (not shown), as described herein, may be used to cool and solidify the molten alloy particles 1935. Alternatively, or in addition, the distance (d) between the atomizing apparatus 1920 and the substrate 1930 may be configured with controlled atomized particle sizes and controlled particle acceleration to cause solidification without variable heating or cooling in a thermal control zone.

Figure 19E:
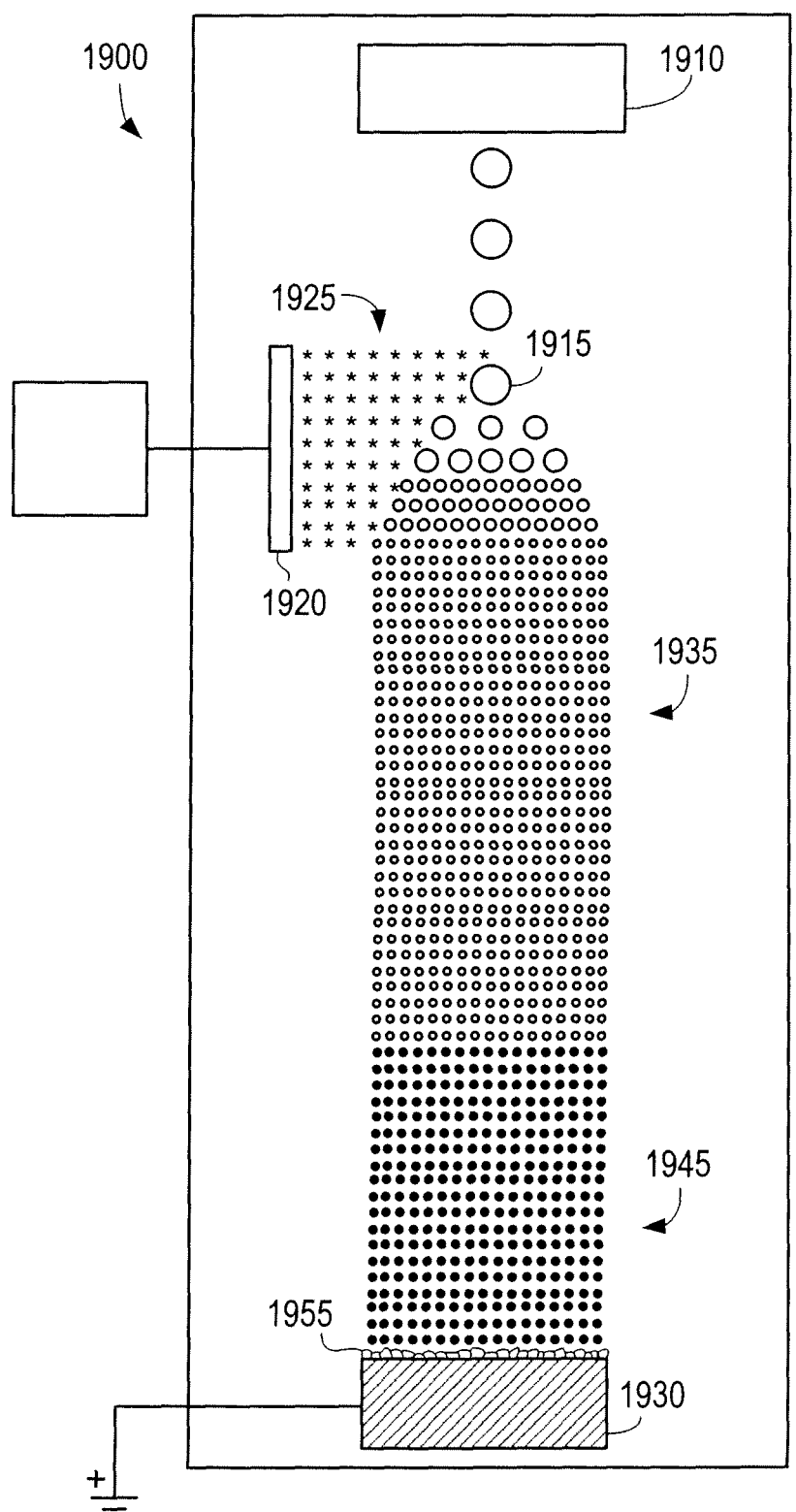
Figure 19F:
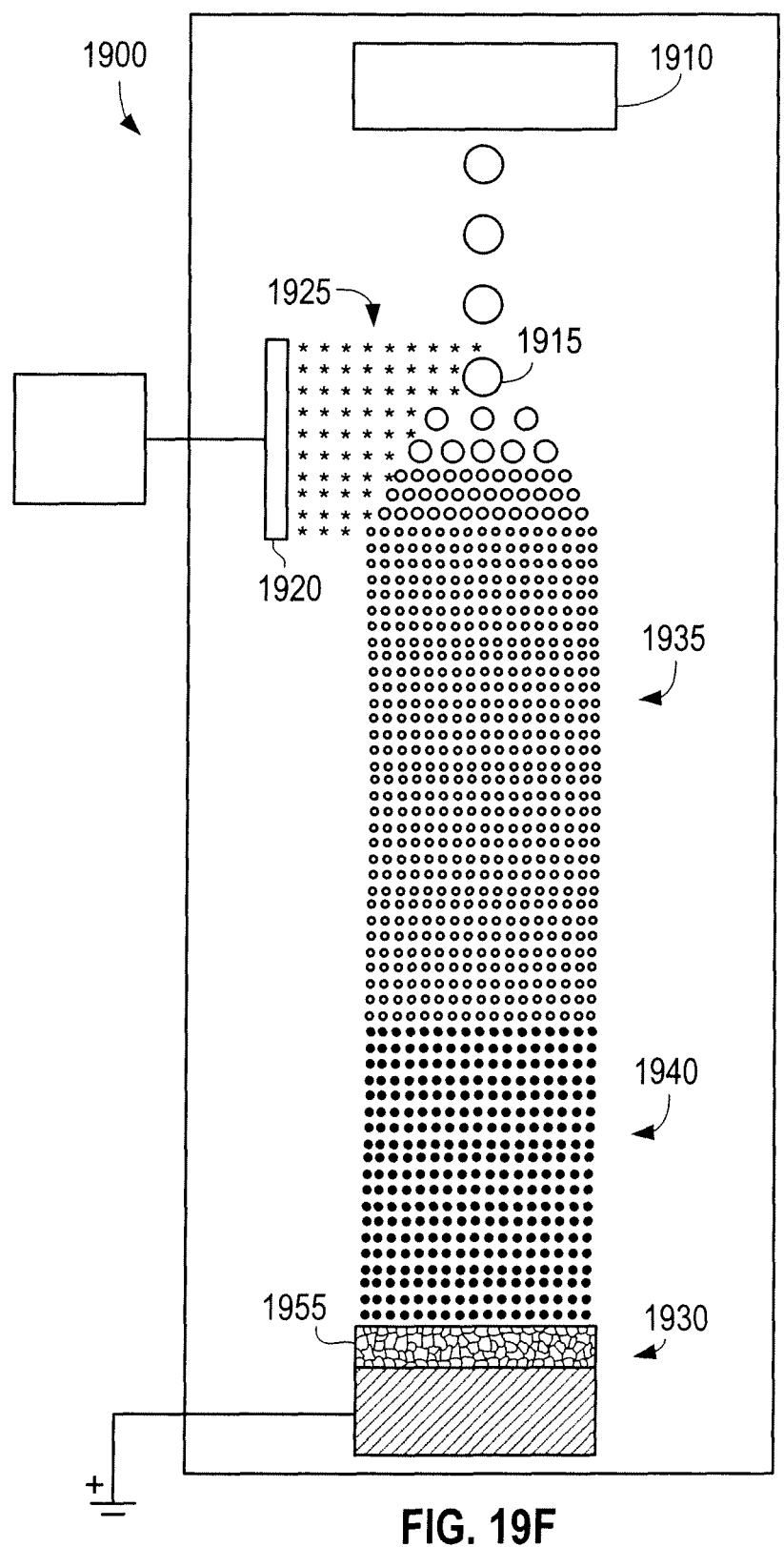

Referring to FIG. 19E, the solid alloy particles 1945 impact onto the substrate 1930, which comprise a collector having a positive electrical polarity as described herein. The impacting solid alloy particles 1945 deform and metallurgically bond to the substrate 1930 and produce a developing workpiece 1955. Referring to FIG. 19F, the solid alloy particles 1945 continue to impact onto the substrate 1930, which comprise the developing workpiece 1955, deform and metallurgically bond to the substrate 1930 and to each other to form a unitary and monolithic solid alloy preform.

One or more of the various components of the solid-spray-forming system 1900 shown in FIGS. 19A-19F may be enclosed in a vacuum vessel or multiple operatively connected vacuum vessels. In various non-limiting embodiments, a large voltage difference may be established between a positively biased substrate and a negatively biased atomizing apparatus, which may facilitate the acceleration of atomized molten alloy particles and the cooled solid alloy particles. The magnitude of the voltage difference may correlate with the resulting acceleration and impact velocity of the alloy particles.

In various embodiments, the temperature of the solid alloy particles at impact and the impact velocity of the solid alloy particles are important operating parameters that affect the developing workpiece/preform. Control of these operating parameters may be accomplished by controlling the atomized particle size, electrostatic accelerating voltage, atomizing apparatus-substrate distance, and/or variable heating or cooling the a thermal control zone between the atomizing apparatus and the substrate.

In addition, aspects of the initial alloy melting operation may present various disadvantages to an overall solid-spray-forming process. An initial alloy melting operation involves preparing a charge of suitable materials and then melting the charge. The molten charge or "melt" may then be refined and/or treated to modify melt chemistry and/or remove undesirable components from the melt. Melting furnaces may be powered by means including electricity and the combustion of fossil fuels, and selection of a suitable apparatus is largely influenced by the relative costs and applicable environmental regulations, as well as by the identity of the material being prepared. General classes of melting techniques include, for example, induction melting (including vacuum induction melting), arc melting (including vacuum arc skull melting), crucible melting, and electron beam melting.

Melts produced in ceramic-lined furnaces may become contaminated with oxides. Various melting techniques have been developed that employ a vacuum environment and do not use a ceramic-lined furnace. These techniques result in significantly less oxide contamination in the melt relative to forming the melt in a conventional ceramic-lined furnace. Examples of such techniques include, for example, electron beam (EB) melting, vacuum arc remelting (VAR), vacuum double-electrode remelting (VADER), and electroslag refining/remelting (ESR). VAR, VADER, and ESR techniques are described, for example, in U.S. Pat. Nos. 4,261,412; 5,325,906; and 5,348,566; which are incorporated by reference into this specification.

Electron beam melting involves utilizing thermo-ionic electron beam guns to produce high energy, substantially linear streams of electrons which are used to heat the target materials. Thermo-ionic electron beam guns operate by passing current to a filament, thereby heating the filament to high temperature and "boiling" electrons away from the filament. The electrons produced from the filament are then focused and accelerated toward the target in the form of a very narrow (nearly two-dimensional), substantially linear electron beam. A type of ion plasma electron beam gun also has been used for preparing alloy melts. Specifically, a "glow discharge" electron beam gun described in V. A. Chernov, "Powerful High-Voltage Glow Discharge Electron Gun and Power Unit on Its Base," 1994 Intern. Conf. on Electron Beam Melting (Reno, Nev.), pp. 259-267, has been incorporated in certain melting furnaces available from Antares, Kiev, Ukraine. Such devices operate by producing a cold plasma including cations that bombard a cathode and produce electrons that are focused to form a substantially two-dimensional, linear electron beam.

The substantially linear electron beams produced by the foregoing types of electron beam guns may be directed into an evacuated melting chamber of an electron beam melting furnace and impinged on the materials to be melted and/or maintained in a molten state. The conduction of electrons through the electrically conductive materials quickly heats them to a temperature in excess of the particular melting temperature. Given the high energy of the substantially linear electron beams, which can be, for example, about 100 kW/cm$^2$, linear electron beam guns are very high temperature heat sources and are readily able to exceed the melting temperatures and, in some cases, the vaporization temperatures of the materials on which the substantially linear beams impinge. Using magnetic deflection or similar directional means, the substantially linear electron beams may be rastered at high frequency across target materials within a melting chamber, allowing the beam to be directed across a wide area and across targets having multiple and complex shapes.

An electron beam cold hearth melting technique may be used in the solid-spray-forming processes, systems, and apparatus described herein. A feedstock may be drip melted by impinging a substantially linear electron beam on an end of a feedstock bar. The melted feedstock drips into an end region of a water-cooled copper hearth, forming a protective skull. As the molten material collects in the hearth, it overflows and falls by gravity into an atomizing assembly. During the molten alloy material's dwell time within the hearth, substantially linear electron beams may be quickly rastered across the surface of the material, retaining it in a molten form. This also has the effects of degassing and refining the molten alloy material through evaporation of high vapor pressure components. The hearth also may be sized to promote gravity separation between high-density and low-density solid inclusions, in which case oxide and other relatively low-density inclusions remain in the molten metal for a time sufficient to allow dissolution, while high density particles sink to the bottom and become entrapped in the skull.

Melting techniques that are suitable for use in the solid-spray-forming processes, systems, and apparatus described herein also include electron beam cold hearth melting techniques that incorporate wire-discharge ion plasma electron emitters. These techniques are described, for example, in U.S. Pat. No. 7,803,211 and in U.S. Patent Publication Nos. 2008/0237200 and 2010/0012629, which are incorporated by reference into this specification.

As used herein, the term "wire-discharge ion plasma electron emitter" refers to an apparatus that produces a relatively wide, three-dimensional field of electrons by impinging positively charged ions onto a cathode and thereby releasing electrons from the cathode. The electron beam produced by a wire-discharge ion plasma electron emitter is not a two-dimensional beam, but instead is a three-dimensional field or "flood" of electrons that, when impinged on the target, covers a two-dimensional surface region on the target that is very large relative to the small point covered by impinging a substantially linear electron beam onto the target. As such, the electron field produced by wire-discharge ion plasma electron emitters is referred to herein as a "wide-area" electron field, with reference to the relatively much smaller point of contact produced by conventional electron guns used in electron beam melting furnaces. Wire-discharge ion plasma electron emitters have been used for unrelated applications are variously referred to, for example, as "wire ion plasma (WIP) electron" guns or emitters, "WIP electron" guns or emitters and, somewhat confusingly, as "linear electron beam emitters" (referring to the linear nature of the plasma-producing wire electrode(s) in various embodiments of the devices).

Wire-discharge ion plasma electron emitters are available in a variety of designs, but all such emitters share certain fundamental design attributes. Each such emitter includes a plasma or ionization region including a positive ion source in the form of an elongate wire anode to produce plasma including cations, and a cathode that is spaced from and positioned to intercept positive ions generated by the wire. A large negative voltage is applied to the cathode, causing a fraction of the positive ions in the plasma generated by the wire positive ion source to be accelerated toward and to collide with the cathode surface such that secondary electrons are emitted from the cathode (the "primary" electrons being present within the plasma along with the positive ions). The secondary electrons produced from the cathode surface form an electron field that typically has the three-dimensional shape of the positive ion plasma impacting the cathode. The secondary electrons are then accelerated from the vicinity of the cathode back toward the anode, experiencing few collisions in the process of passing through the low-pressure gas within the emitter.

Figure 20:
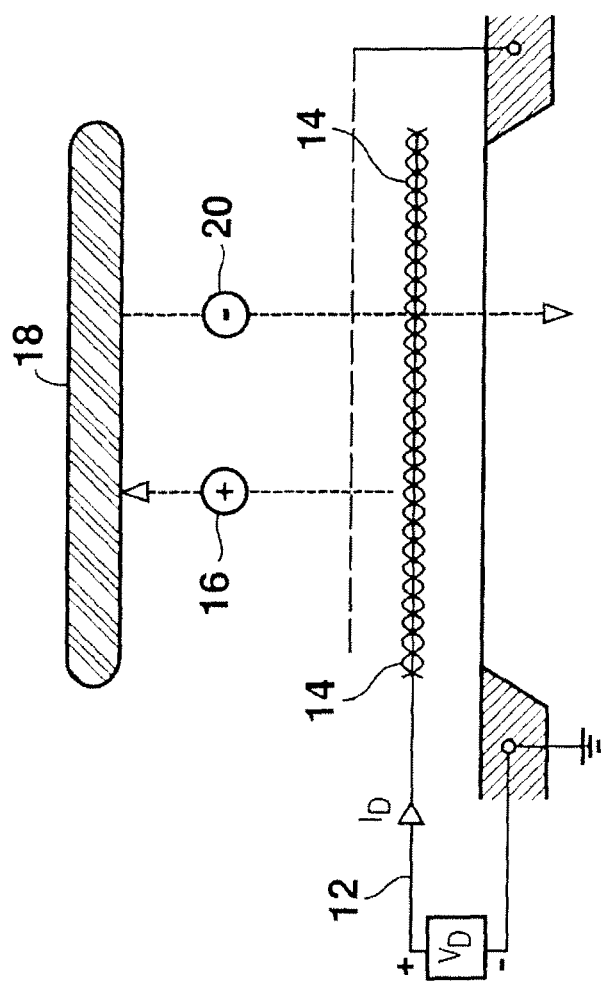
FIG. 20 is a schematic diagram of various components of a wire-discharge ion plasma emitter.

By properly configuring the various components of a wire-discharge ion plasma electron emitter, a wide field of energetic secondary electrons can be formed 4at the cathode and accelerated from the emitter and toward a target. FIG. 20 is a simplified depiction of components of a wire-discharge plasma ion electron emitter, wherein a current is applied to a thin wire anode 12 to generate plasma 14. Positive ions 16 within plasma 14 accelerate toward and collide with negatively-charged cathode 18, liberating wide-area secondary electron cloud 20, which is accelerated in the direction of anode 12 by action of the electric field between the electrodes and toward the target.

In various non-limiting embodiments, a system or apparatus configured to perform a solid-spray-forming process may comprise a melting assembly for melting an alloy that includes a pressure-regulated chamber (melting chamber) and a hearth disposed in the melting chamber and configured to hold molten alloy. At least one wire-discharge ion plasma electron emitter may be disposed in or adjacent to the melting chamber and may be positioned to direct a three-dimensional, wide-area field of electrons generated by the emitter into the chamber. The wire-discharge ion plasma electron emitter produces a three-dimensional field of electrons having sufficient energy to heat the electrically conductive alloy to its melting temperature.

In various non-limiting embodiments, an atomizing assembly is configured to receive at least one of a stream and a series of droplets of molten alloy from the hearth. The melting assembly may be used to melt any alloy that may be melted using a conventional electron beam melting furnace, such as, for example, alloys based on aluminum, tantalum, titanium, tungsten, niobium, zirconium, nickel, iron, and cobalt. In various non-limiting embodiments, a melting assembly is configured to melt a charge comprising materials that make up the chemistry of cobalt-base superalloys or nickel-base superalloys. In various other non-limiting embodiments, the melting assembly is configured to melt a preformed alloy ingot or other structure, which may have previously been produced and processed by one or more of VIM, VAR, and ESR, for example.

A melting assembly may include one or more material feeders adapted to introduce electrically conductive metals or other alloying additives into a melting chamber. Feeder types may include, for example, bar feeders and wire feeders, and the feeder type selected will depend upon the particular design requirements for a furnace. A material feeder and at least one wire-discharge ion plasma electron emitter of a melting assembly may be configured so that the electron field emitted by the wire-discharge ion plasma electron emitter at least partially impinges on the material introduced into the chamber by the feeder. If the material that is introduced into the melting chamber by the feeder is electrically conductive, then the electron field may heat and melt the material.

A hearth incorporated in a melting assembly may be selected from the various hearth types known in the art. For example, a melting assembly may be in the nature of an electron beam cold hearth melting furnace by incorporating a cold hearth or, more specifically, for example, a water-cooled copper cold hearth in the melting chamber. As is known to those of ordinary skill, a cold hearth includes cooling means causing molten material within the hearth to freeze to the hearth surface and form a protective layer or skull. As another non-limiting example, a hearth may comprise an "autogenous" hearth, which is a hearth that is plated with or fabricated from the alloy that is being melted in the furnace, in which case the bottom surface of the hearth also may be water-cooled to prevent burn-through.

The particular hearth included in a melting chamber may include a molten material holding region, in which the molten material resides for a certain dwell time before passing to a downstream atomizing device in fluid communication with the melting chamber. A hearth and at least one wire-discharge ion plasma electron emitter may be positioned in a melting assembly so that the electron field emitted by the wire-discharge ion plasma electron emitter at least partially impinges on the molten material holding region. In this manner, the electron field may be applied to maintain the alloy material within the molten material holding region in a molten state.

In various embodiments, a melting assembly includes a pressure-regulated melting chamber and a hearth disposed in the pressure-regulated melting chamber, wherein the hearth includes a molten material holding region. The melting assembly may further include one or more wire-discharge ion plasma electron emitters disposed in or adjacent the pressure-regulated melting chamber. The hearth and the at least one wire-discharge ion plasma electron emitter are positioned so that an electron field produced by the emitter at least partially impinges on the molten material holding region. An atomizing assembly in fluid communication with the pressure-regulated melting chamber may be positioned to receive molten material from the hearth. A least one feeder may be included in the furnace and may be configured to introduce material into the pressure-regulated melting chamber in a position over at least a region of the hearth.

Any suitable wire-discharge ion plasma electron emitter may be used in systems and apparatus configured to perform a solid-spray-forming process. Suitable embodiments of wire-discharge ion plasma electron emitters are described, for example, in U.S. Pat. Nos. 4,025,818; 4,642,522; 4,694,222; 4,755,722; and 4,786,844, which are incorporated by reference into this specification. Suitable emitters include those capable of producing a three-dimensional, wide-area electron field that may be directed into a melting chamber of a furnace and that will heat electrically conductive feed materials placed into the melting chamber to the desired temperature. Suitable emitters also include those capable of producing a three-dimensional, wide-area electron field that may be directed into an atomizing chamber and atomize molten alloy material as discussed above.

In various non-limiting embodiments of a wire-discharge ion plasma electron emitter, the emitter includes a plasma region and a cathode region. The plasma region includes at least one elongate wire anode adapted to produce a plasma including positive ions. The cathode region includes a cathode which is electrically connected to a high voltage power supply adapted to negatively charge the cathode. In the wire-discharge ion plasma electron emitter, the electrode used to produce the plasma may be one wire or multiple wires positioned along a length of the plasma region. At least a portion of the cathode impacted by the positive ions is composed of a material suitable for generating electrons. Various non-limiting embodiments of the cathode disposed in the cathode region of the emitter also may include an insert, such as, for example, a molybdenum insert, having a high melting temperature and a low work function so as to facilitate generation of electrons. The cathode and the anode are positioned relative to one another so that the positive ions in the plasma generated by the wire anode accelerate toward and impinge on the cathode under influence of the electric field between the electrodes, liberating the wide-area field of secondary electrons from the cathode.

Various non-limiting embodiments of a wire-discharge ion plasma electron emitter include at least one suitably electron transmissive window, such as a thin electron transmissive titanium or aluminum foil, that opens through a wall of a melting chamber and/or an atomizing chamber. Suitable electron transmissive windows may also include, for example, windows comprising boron nitride or carbon (e.g., diamond) materials. Electron transmissive windows may further comprise materials including low atomic number elements generally known in the art to be transmissive to electrons. Various non-limiting embodiments of a wire-discharge ion plasma electron emitter do not include an electron transmissive window, in which case the plasma region of the emitter fluidly communicates with a melting chamber and/or an atomizing chamber. In either case, a wide-area electron field enters a melting chamber and/or an atomizing chamber and may be impinged on the material within the chamber(s). In various non-limiting embodiments, a wire-discharge ion plasma electron emitter may be rastered to increase the volume of the wide area electron field produced by the emitter.

If an electron transmissive window does separate the interior of the electron emitter from a melting chamber or an atomizing chamber, then the electron field passes through the window as it is projected from the electron emitter into the chamber. In various non-liming embodiments of a wire-discharge ion plasma electron emitter, a high voltage power supply electrically coupled to the cathode powers the cathode to a negative voltage greater than 20,000 volts. The negative voltage serves the functions of accelerating the positive ions in the plasma toward the cathode, and also repelling the secondary electron field from the cathode and toward the anode.

An electron transmissive window may be necessary if the pressure within the wire-discharge ion plasma electron emitter differs significantly from the pressure within a melting chamber and/or atomizing chamber, in which case the foil window serves to isolate the two adjacent regions of differing pressure. An advantage of wire-discharge ion plasma electron emitters relative to non-gas containing electron emitters, such as thermo-ionic electron beam guns, is that wire-discharge ion plasma electron emitters must include gas within the plasma region to serve as the plasma source. Although wire-discharge ion plasma electron emitters can operate at very low gas pressures, such devices also can operate effectively at relatively high gas pressures.

Figure 21:
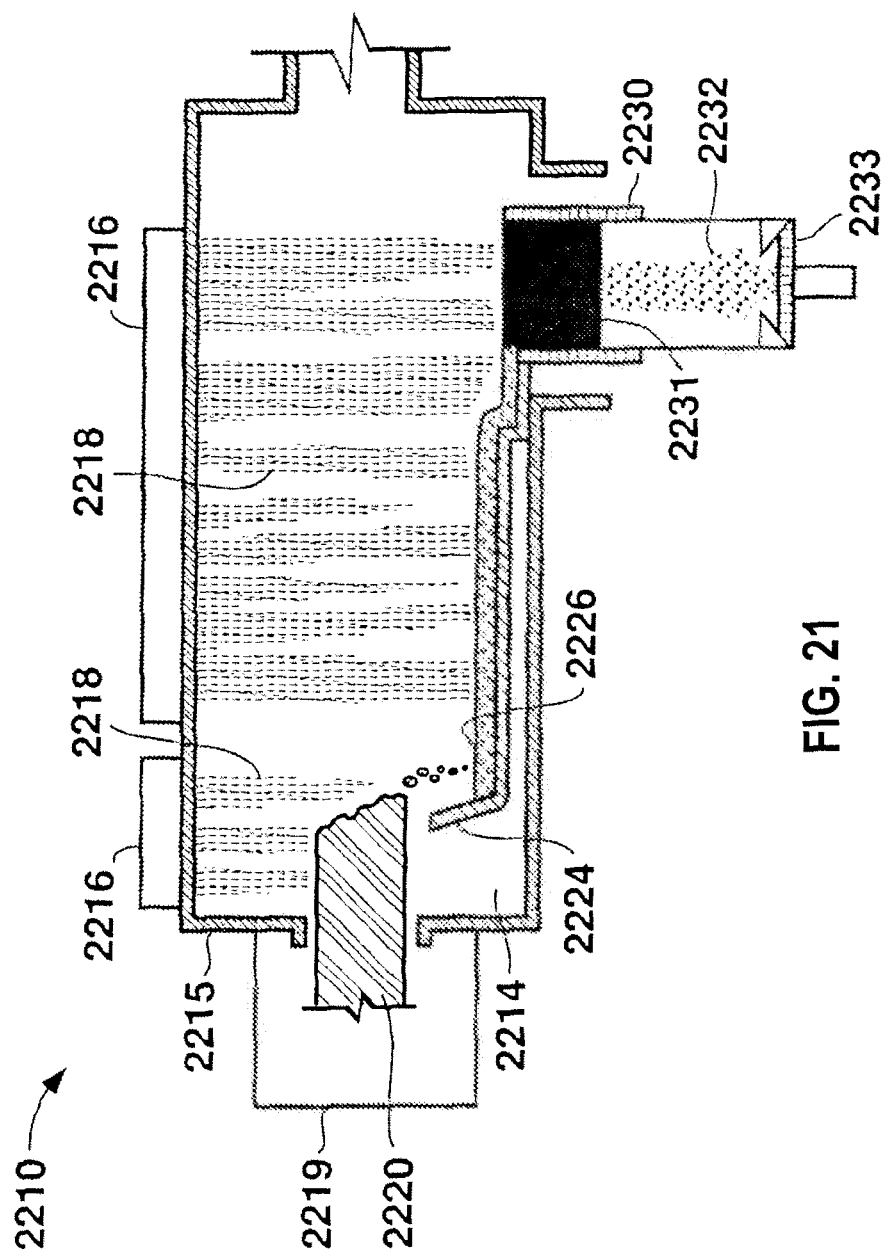
FIG. 21 is a schematic diagram of an electron beam cold hearth melting assembly including multiple wire-discharge ion plasma emitters.
Figure 23:
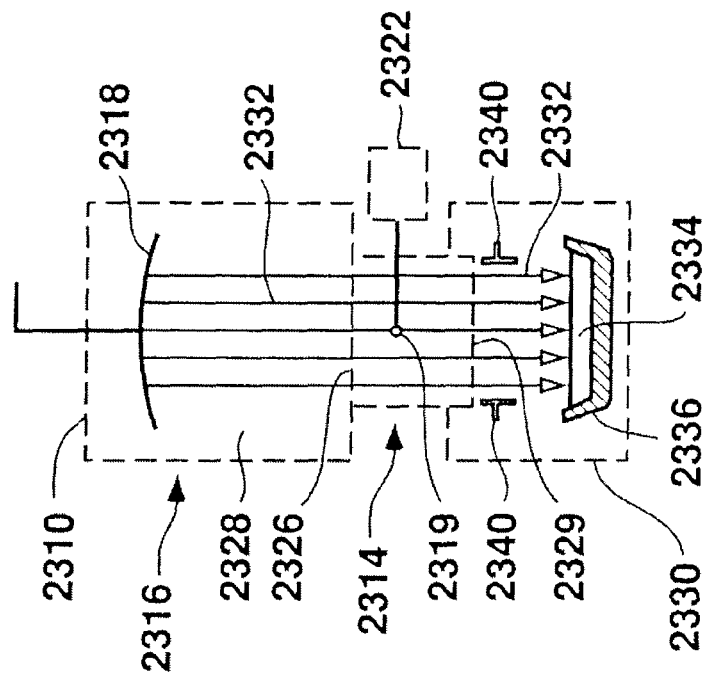
FIG. 23 is a schematic diagram of an electron beam melting apparatus including a wire-discharge ion plasma emitter.

FIG. 21 schematically illustrates a non-limiting embodiment of an electron beam melting assembly. The melting assembly 2210 includes melting chamber 2214 at least partially defined by chamber wall 2215. Wire-discharge ion plasma electron emitters 2216 are positioned outside and adjacent chamber 2214. The wire-discharge ion plasma electron emitters 2216 project wide-area electron fields 2218 into the interior of the chamber 2214. An alloy bar 2220 is introduced into the chamber 2214 by a bar feeder 2219. Molten alloy 2226 is produced by impinging the wide-area electron field 2218 of at least one wire-discharge ion plasma electron emitter 2216 onto the alloy bar 2220. The molten alloy 2226 melted from the alloy bar 2220 drops into a water-cooled copper hearth 2224 and is resident in the hearth 2224 for a dwell time, where it is heated, degassed, and refined by one or more of the wide-area electron fields 2218 produced by the emitters 2216. The molten alloy 2226 ultimately drops from the hearth 2224 into an atomizing assembly 2231 where the molten alloy is atomized to alloy particles 2232, which are influenced by a field generating assembly 2230, solidified, and impacted onto a collector 2233.

As discussed above, the wire-discharge ion plasma electron emitters 2216 of the melting assembly 2210 are configured to generate a field or "flood" of energetic electrons covering a wide area relative to the spot coverage of a substantially linear beam produced by a thermo-ionic electron beam gun. The electron field emitters 2216 spread electrons over a wide area and impinge on the materials to be melted and/or maintained in the molten state within the melting assembly 2210. Likewise, wire-discharge ion plasma electron emitters (not shown) may establish a wide-area electron field in the atomizing assembly 2231 that impinges on molten alloy received from the melting assembly 2210 and atomizes the molten alloy.

Figure 22:
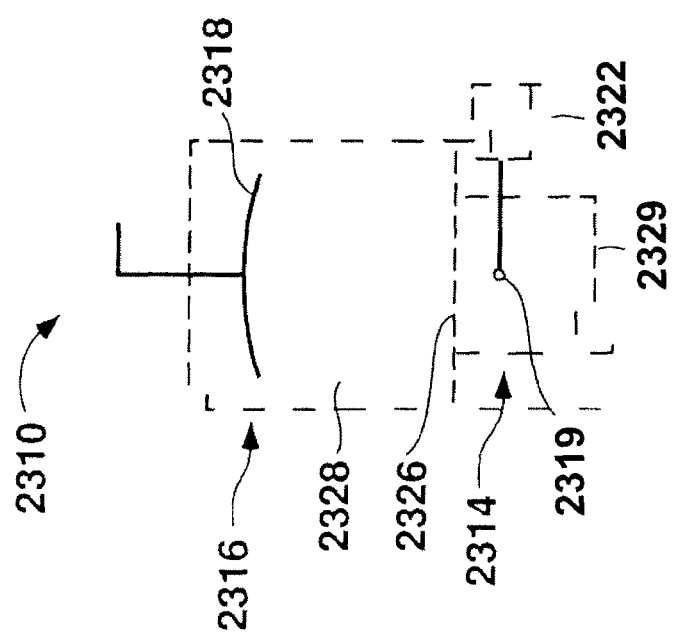
FIG. 22 is a schematic diagram of various components of a wire-discharge ion plasma emitter.

As noted above, various non-limiting embodiments of wire-discharge ion plasma electron emitter generally include one or more elongate wire anodes producing positive ion plasma, wherein the plasma is impinged upon a cathode to generate a field of secondary electrons that may be accelerated to impinge on a target to be heated. A schematic representation of one design of a wire-discharge ion plasma electron emitter is shown in FIG. 22. The emitter 2310 includes an ionization or plasma region 2314 in which a positive ion plasma is produced, and a cathode region 2316 that includes cathode 2318. The plasma region 2314 is filled with an ionizable gas at low pressure, and the gas is ionized in the plasma region to produce cation-containing plasma. For example, the ionization region 2314 may be filled with helium gas at, for example, approximately 20 mTorr.

A small diameter elongate wire anode 2319 passes through a length of the plasma chamber 2314. A positive voltage is applied to wire anode 2319 by power supply 2322, and this initiates ionization of the helium gas into a plasma comprising helium cations and free electrons (the "primary" electrons). Once ionization of the helium gas is initiated, the plasma is sustained by applying a voltage to the thin wire anode 2319. Positively charged helium ions within the plasma are extracted from the ionization chamber 2314 through an extraction grid 2326 maintained at a high negative electrical potential and accelerated through a high voltage gap into the cathode region 2316, where the cations in the plasma impact high negative voltage cathode 2318.

Cathode 2318 may be, for example, a coated or uncoated metal or alloy. Impingement of helium ions on cathode 2318 releases secondary electrons from cathode 2318. The high voltage gap 2328 accelerates the secondary electrons in a direction opposite the direction of movement of the helium cations, through the extraction grid 2326 and into the plasma region chamber 2314, and then through a thin metallic foil window 2329 made of material relatively transparent to electrons. As noted above, depending on the relative gas pressures within the electron emitter and the melting chamber and/or atomizing chamber, it may be possible to omit the foil window 2329, in which case the electrons produced by the emitter would enter the chamber directly. The wide-area three-dimensional field of energetic electrons exiting the emitter 2310 may be directed to impinge on a target positioned opposite foil window 2329 and within a melting chamber or an atomizing chamber.

One or more wire-discharge ion plasma electron emitters, such, for example, emitter 2310, may be provided to supply the electron field into a melting chamber of an electron beam melting furnace and/or into an atomizing chamber of an electron beam atomizing assembly. As shown in FIG. 6, a non-limiting embodiment of an electron beam melting apparatus includes one or more wire-discharge ion plasma electron emitters 2310 positioned adjacent a melting chamber 2330. A wide-area electron field 2332 exits the emitter 2310 through a film window 2329 and floods at least a region of the surface of a molten alloy 2334 in a hearth 2336, thereby heating the alloy to maintain it in a molten state.

The film window 2329 may be omitted if the operating pressure differential between the emitter 2310 and the melting chamber 2330 is not significant. The melting chamber 2330 may be operated at a pressure higher than is conventional in order to further reduce or eliminate undesirable elemental vaporization, and in such case the need for a film window partitioning the electron emitter from the melting chamber will, again, depend on the particular pressure differential used in the configuration. Optionally, components 2340 for electrostatically and/or electromagnetically controlling the wide-area electron field are provided to allow further improved control of the melting process within the melting chamber 2330.

Although FIG. 6 provides a simplified view of an embodiment of a wire-discharge ion plasma electron melting furnace including a single electron emitter, multiple wire-discharge ion plasma electron emitters may be employed in various non-limiting embodiments. One or more wire-discharge ion plasma electron emitters may be incorporated in such an apparatus to: (1) melt raw materials introduced into the melting chamber, in the form of, for example, an alloy ingot, slab, bar, wire, or other charge; and (2) maintain molten alloy resident in the furnace hearth at a temperature above the alloy melting temperature (and possibly degas and/or refine the molten alloy). Also, in various non-limiting embodiments, one or more wire-discharge ion plasma electron emitters may be used along with one or more electron beam guns producing substantially two-dimensional, linear electron beams.

Figure 24:
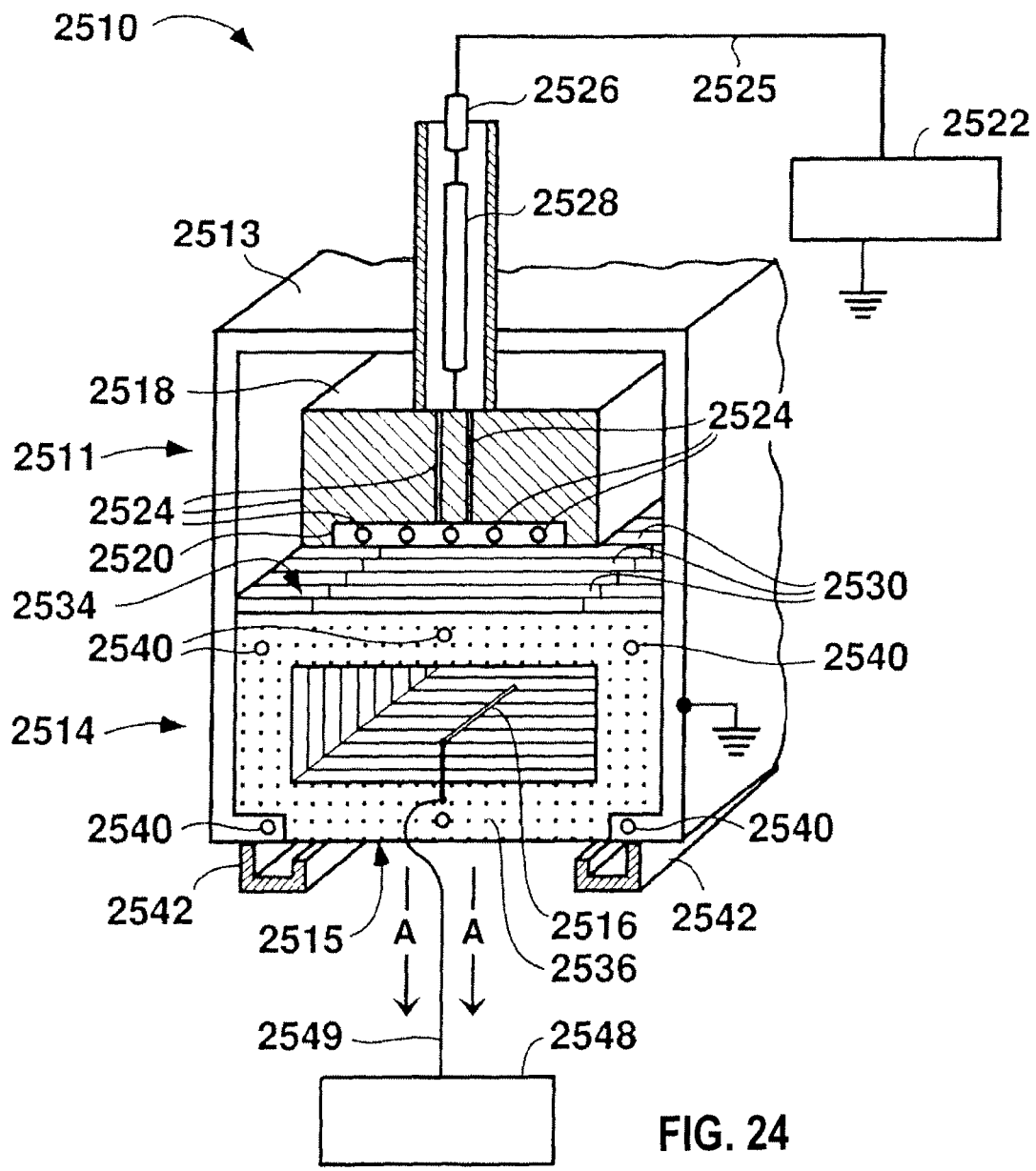
FIG. 24 is a perspective view of a wire-discharge ion plasma emitter.
Figure 25:
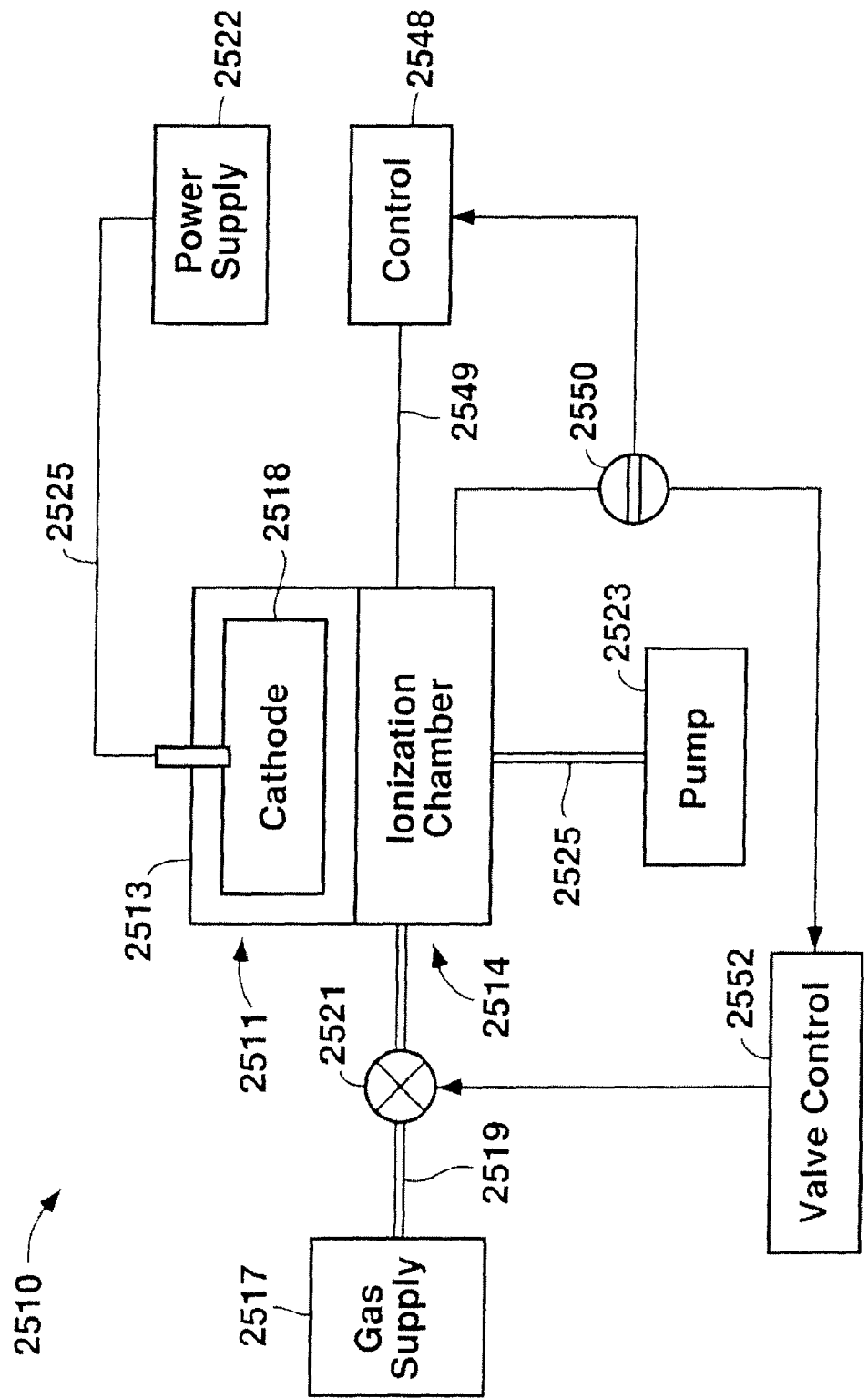
FIG. 25 is a schematic diagram illustrating the operation of the wire-discharge ion plasma emitter shown in FIG. 24.

FIGS. 24 and 25 provide additional details of a non-limiting embodiment of a wire-discharge ion plasma electron emitter that may be configured for use as the source of energetic electrons in an embodiment of an electron beam melting apparatus according to the present disclosure. FIG. 24 is a perspective view, partly in section, of a wire-discharge ion plasma electron emitter embodiment. FIG. 25 is a schematic diagram illustrating the operation of the emitter 2510 in FIG. 24. The emitter 2510 includes an electrically grounded enclosure 2513, which includes a cathode region 2511, an ionization or plasma region 2514, and an electron transmissive foil window 2515. An elongate wire electrode 2516 extends through a length of the ionization region 2514. The foil window 2515 is electrically coupled to the chamber 2513 and forms an anode that operates to accelerate electrons within the chamber 2513, which exit the chamber 2513 in the general direction of arrows "A". The chamber 2513 is filled with helium gas at low pressure, such as $1^{-10}$ mTorr, and is supplied with the gas by a gas supply 2517. The gas supply 2517 is connected to the enclosure 2513 by a conduit 2519, which passes through a valve 2521. Pressure regulation in the chamber 2513 is controlled by a pump 2523, which is connected to the chamber 2513 by the conduit 2519.

The cathode region 2511 includes a cathode 2518, which in turn includes an insert 2520 mounted on a lower surface thereof. The insert 2520 may comprise, for example, molybdenum, but may comprise any material with a suitably high secondary electron emission coefficient. The cathode 2518 is suitably uniformly spaced from the walls of enclosure 2513 to prevent Paschen breakdown. The cathode 2518 is coupled to a high voltage power supply 2522 by a cable 2525, which passes through insulator 2526 and into resistor 2528. The power supply 2522 supplies high negative potential, for example, 200-300 kV, to the cathode 2518. The cathode 2518 and the insert 2520 may be suitably cooled, such as, for example, by circulating a cooling fluid through conduits 2524.

The ionization region 2514 includes a plurality of thin metallic ribs 2530, which are coupled both electrically and mechanically. Each rib 2530 includes a central cut-out region to allow a wire electrode 2516 to pass through the ionization chamber 2514. The sides of the ribs 2530 facing the cathode 2518 form an extraction grid 2534. The opposed side of all or a portion of the ribs 2530 provide a support grid 2536 for an electron transmissive foil window 2515. Cooling channels 2540 may be provided to circulate a cooling fluid through and in the vicinity of ribs 2530 to allow for heat removal from the ionization region 2514.

The electron transmissive foil window 2515, which may comprise, for example, aluminum or titanium foil, is supported on the grid 2534 and is sealed to the enclosure 2513 by an O-ring or other structures sufficient to maintain the high vacuum helium gas environment within the enclosure 2513. An electrical control device 2548 is connected to the wire electrode 2516 through a connector 2549. On activation of the control device 2548, the wire electrode 2516 is energized to a high positive potential, and the helium within the ionization region 2514 is ionized to produce plasma including helium cations. Once the plasma is initiated in the ionization region 2514, the cathode 2518 is energized by the power supply 2522. Helium cations in the ionization region 2514 are electrically attracted to the cathode 2518 by the electric field that extends from the cathode 2518 into the plasma region 2514. The helium cations travel along the field lines, through the extraction grid 2534, and into the cathode region 2511.

In the cathode region 2511, the helium cations accelerate across the full potential of the electric field generated by the energized cathode 2518 and forcefully impinge on the cathode 2518 as a collimated beam of cations. The impacting cations free secondary electrons from the insert 2520. The secondary electron field produced by the insert 2520 is accelerated in a direction opposite the direction of travel of the helium cations, toward the wire electrode 2516 and through foil window 2515

Means may be provided to monitor the gas pressure within the chamber 2513 as changes in pressure may affect the density of the helium ion plasma and, in turn, the density of the secondary electron field generated at the cathode 2518. An initial pressure may be set within the enclosure 2513 by appropriately adjusting the valve 2521. Once the cation-containing plasma is initiated in the plasma region 2514, a voltage monitor 2550 may be provided to indirectly monitor the instantaneous quiescent pressure within the chamber 2513. A rise in voltage is indicative of a lower chamber pressure. The output signal of the voltage monitor 2550 is used to control the valve 2521 through a valve controller 2552. The current supplied to the wire electrode 2516 by the control device 2548 is also controlled by the signal of the voltage monitor 2550. Utilizing the signal generated by the voltage monitor 2550 to control the gas supply valve 2521 and to control the device 2548 allows for a stable electron field output from the emitter 2510.

The current generated by the emitter 2510 may be determined by the density of the cations impacting the cathode 2518. The density of the cations impacting the cathode 2518 may be controlled by adjusting the voltage on the wire electrode 2516 through the control device 2548. The energy of the electrons emitted from the cathode 2518 may be controlled by adjusting the voltage on the cathode 2518 through the power supply 2522. Both current and energy of the emitted electrons can be independently controlled, and the relationships between these parameters and the applied voltages are linear, rendering control of the emitter 2510 both efficient and effective.

Figure 26:
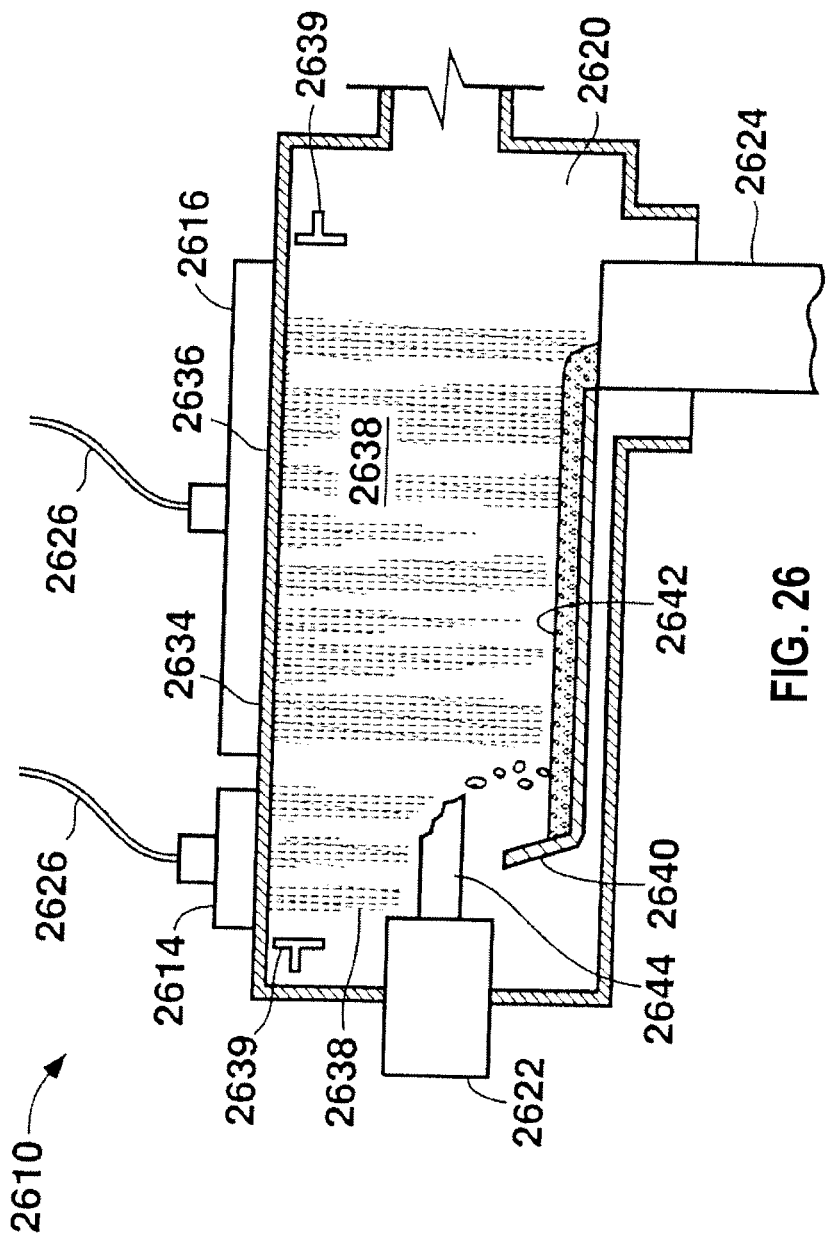
FIG. 26 is a schematic diagram of an electron beam cold hearth melting assembly including multiple wire-discharge ion plasma emitters.

FIG. 26 is a schematic illustration of an electron beam melting assembly 2610 incorporating two wire-discharge ion plasma electron emitters 2614 and 2616 having a design as shown in FIGS. 24 and 25. The melting assembly 2610 includes a melting chamber 2620, a material feeder 2622, and is operatively connected to an atomizing assembly 2624. The current required for operation of the emitters 2614 and 2616 is fed to the emitters by power lines 2626, and the interface between the emitters 2614 and 2616 and the melting chamber 2620 includes electron transmissive foil windows 2634 and 2636, which allow the electron fields 2638 produced by the emitters 2614 and 2616 to enter the melting chamber 2620. Electromagnetic control devices 2639 for magnetically steering the electron fields 2638 may be included within melting chamber 2620 to provide additional process control.

A hearth 2640, which may be, for example, a cold hearth, is positioned in the melting chamber 2620. In operation, the wire-discharge ion plasma electron emitters 2614 and 2616 are energized and produce the electron fields 2618. An alloy feed material 2644 is introduced into the melting chamber 2620 by the feeder 2622, is melted by the electron field 2638 emitted from the emitter 2614, and drops to the hearth 2640. The wide-area electron field 2638 emitted by the emitter 2616 heats, degasses, and refines the molten alloy material 2642 while resident in the hearth 2640. The molten material 2642 advances along the hearth 2640 and drops into the atomizing assembly 2624 and is solid-spray-formed into a solid preform. The atomizing assembly 2624 may comprise one or more thermo-ionic electron beam emitters and/or one or more wire-discharge ion plasma electron emitters.

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth herein. Such embodiments may be obtained, for example, by combining, modifying, or reorganizing any of the disclosed steps, components, elements, features, aspects, characteristics, limitations, and the like, of the various non-limiting embodiments described in this specification. In this manner, Applicant reserves the right to amend the claims during prosecution to add features as variously described in this specification, and such amendments comply with the requirements of 35 U.S.C. §112, first paragraph, and 35 U.S.C. §132(a).

What is claimed is:

1. A process comprising:
   producing at least one of a stream of molten alloy and a series of droplets of molten alloy;
   producing electrically-charged particles of the molten alloy by impinging electrons on at least one of the stream of molten alloy and the series of droplets of molten alloy to atomize the molten alloy;
   accelerating the electrically-charged molten alloy particles with at least one of an electrostatic field and an electromagnetic field;
   cooling the molten alloy particles to a temperature that is no greater than a solidus temperature of the alloy so that the molten alloy particles solidify while accelerating and form solid alloy particles;
   impacting the solid alloy particles onto a substrate, wherein the impacting particles deform and metallurgically bond to the substrate to produce a solid alloy preform.

2. The process of claim 1, wherein the molten alloy particles are cooled to a temperature that is no greater than the solidus temperature of the alloy and that is greater than 0.50 times the solidus temperature of the alloy.

3. The process of claim 1, wherein the molten alloy particles are cooled to a temperature that is no greater than 0.95 times the solidus temperature of the alloy and that is greater than 0.50 times the solidus temperature of the alloy.

4. The process of claim 1, wherein cooling the molten alloy particles comprises contacting the molten alloy particles with a non-equilibrium plasma.

5. The process of claim 1, wherein cooling the molten alloy particles comprises directing the alloy particles through a cooling coil.

6. The process of claim 1, wherein producing at least one of a stream of molten alloy and a series of droplets of a molten alloy comprises melting an alloy material using at least one of vacuum induction melting, vacuum arc remelting, vacuum double-electrode remelting, electroslag refining/remelting, electron beam melting, and electron beam cold hearth melting.

7. The process of claim 1, wherein the substrate is held at a positive potential to attract the electrically-charged alloy particles produced by impinging electrons on the molten alloy.

8. The process of claim 1, wherein the impinging electrons comprise a three-dimensional electron field.

9. The process of claim 8, wherein the three-dimensional electron field comprises a cylindrical spatial distribution through which a flow path of the molten alloy is directed.

10. The process of claim 9, wherein a longitudinal axis of the cylindrical spatial distribution of electrons is oriented in the direction of the flow path of the molten alloy.

11. The process of claim 8, wherein the three-dimensional electron field comprises a rectangular spatial distribution through which the flow path of the molten alloy is directed.

12. The process of claim 11, wherein an electron beam comprising a rectangular cross-section is rastered to provide a rectangular spatial distribution of electrons.

13. The process of claim 8, wherein the electrons are directed to form a diffuse spot and the diffuse spot is rastered to provide a three-dimensional spatial distribution of electrons having a controlled shape.

14. The process of claim 1, wherein the impinging electrons are produced by at least one of a thermo-ionic electron beam emitter and a wire-discharge ion plasma electron emitter.

15. The process of claim 1, wherein the impinging electrons are directed with at least one of an electrostatic field and an electromagnetic field to produce a three-dimensional electron field in a flow path of the molten alloy.

16. The process of claim 1, wherein the substrate comprises an alloy that is the same alloy as that forming the alloy particles.

17. The process of claim 1, wherein the alloy is a nickel-base superalloy.

18. The process of claim 1, wherein a negative charge is induced in the molten alloy before impinging electrons on the molten alloy.

19. A process comprising:
producing at least one of a stream of molten alloy and a series of droplets of molten alloy;
producing a three-dimensional electron field;
impinging electrons from the three-dimensional electron field on at least one of the stream of molten alloy and the series of droplets of molten alloy to atomize the molten alloy and produce electrically-charged particles of the molten alloy;
accelerating the electrically-charged molten alloy particles with an electrostatic field;
cooling the molten alloy particles to a temperature that is no greater than a solidus temperature of the molten alloy particles so that the molten alloy particles solidify while accelerating;
impacting the solid alloy particles onto a substrate, wherein the impacting particles deform and metallurgically bond to the substrate to produce a solid alloy preform.

* * * * *